US011521085B2

(12) United States Patent
Sawada et al.

(10) Patent No.: US 11,521,085 B2
(45) Date of Patent: Dec. 6, 2022

(54) NEURAL NETWORK WEIGHT DISTRIBUTION FROM A GRID OF MEMORY ELEMENTS

(71) Applicant: INTERNATIONAL BUSINESS MACHINES CORPORATION, Armonk, NY (US)

(72) Inventors: Jun Sawada, Austin, TX (US); Dharmendra S. Modha, San Jose, CA (US); Andrew S. Cassidy, San Jose, CA (US); John V. Arthur, Mountain View, CA (US); Tapan K. Nayak, San Jose, CA (US); Carlos O. Otero, San Jose, CA (US); Brian Taba, Cupertino, CA (US); Filipp A. Akopyan, New Windsor, NY (US); Pallab Datta, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 16/842,035

(22) Filed: Apr. 7, 2020

(65) Prior Publication Data
US 2021/0312305 A1      Oct. 7, 2021

(51) Int. Cl.
*G06N 5/04*      (2006.01)
*G06N 3/063*      (2006.01)
(Continued)

(52) U.S. Cl.
CPC ............. *G06N 5/04* (2013.01); *G06F 17/153* (2013.01); *G06F 17/16* (2013.01); *G06N 3/063* (2013.01)

(58) Field of Classification Search
CPC .................................. G06N 5/04; G06N 3/063
See application file for complete search history.

(56) References Cited

U.S. PATENT DOCUMENTS

2017/0193368 A1   7/2017   Le Grand et al.
2017/0337466 A1   11/2017  Bayat et al.
(Continued)

FOREIGN PATENT DOCUMENTS

EP        3035204 A1     6/2016
KR     20150016089 A     2/2015

OTHER PUBLICATIONS

Eckert et al., "Neural Cache," Computer Architecture IEEE Press, 383-396 (2018).
(Continued)

*Primary Examiner* — Brian Whipple
(74) *Attorney, Agent, or Firm* — Erik A. Huestis; Stephen J. Kenny; Foley Hoag, LLC

(57) ABSTRACT

Neural inference chips for computing neural activations are provided. In various embodiments, a neural inference chip comprises at least one neural core, a memory array, an instruction buffer, and an instruction memory. The instruction buffer has a position corresponding to each of a plurality of elements of the memory array. The instruction memory provides at least one instruction to the instruction buffer. The instruction buffer advances the at least one instruction between positions in the instruction buffer. The instruction buffer provides the at least one instruction to at least one of the plurality of elements of the memory array from its associated position in the instruction buffer when the memory of the at least one of the plurality of elements contains data associated with the at least one instruction. Each element of the memory array provides a data block from its memory to its horizontal buffer in response to the arrival of an associated instruction from the instruction buffer. The horizontal buffer of each element of the memory array provides a data block to the horizontal buffer of
(Continued)

another of the elements of the memory array or to the at least one neural core.

24 Claims, 60 Drawing Sheets

(51) Int. Cl.
*G06F 17/15* (2006.01)
*G06F 17/16* (2006.01)

(56) References Cited

U.S. PATENT DOCUMENTS

| | | |
|---|---|---|
| 2018/0046895 A1 | 2/2018 | Xie et al. |
| 2018/0075344 A1 | 3/2018 | Ma et al. |
| 2018/0157967 A1 | 6/2018 | Henry et al. |
| 2018/0189645 A1 | 7/2018 | Chen et al. |
| 2019/0180170 A1 | 6/2019 | Huang et al. |
| 2020/0012929 A1 | 1/2020 | Penner et al. |

OTHER PUBLICATIONS

International Search Report and Written Opinion for International Application No. PCT/EP2021/051906 dated May 3, 2021.
Jouppi et al., "In-Datacenter Performance Analysis of a Tensor Processing Unit," Proceedings of the 44th Annual International Symposium on Computer Architecture, 1-12 (2017).
Liu et al., "A Uniform Architecture Design for Accelerating 2D and 3D CNNs on FPGAs," Electronics, 8(1): 65 (2019).

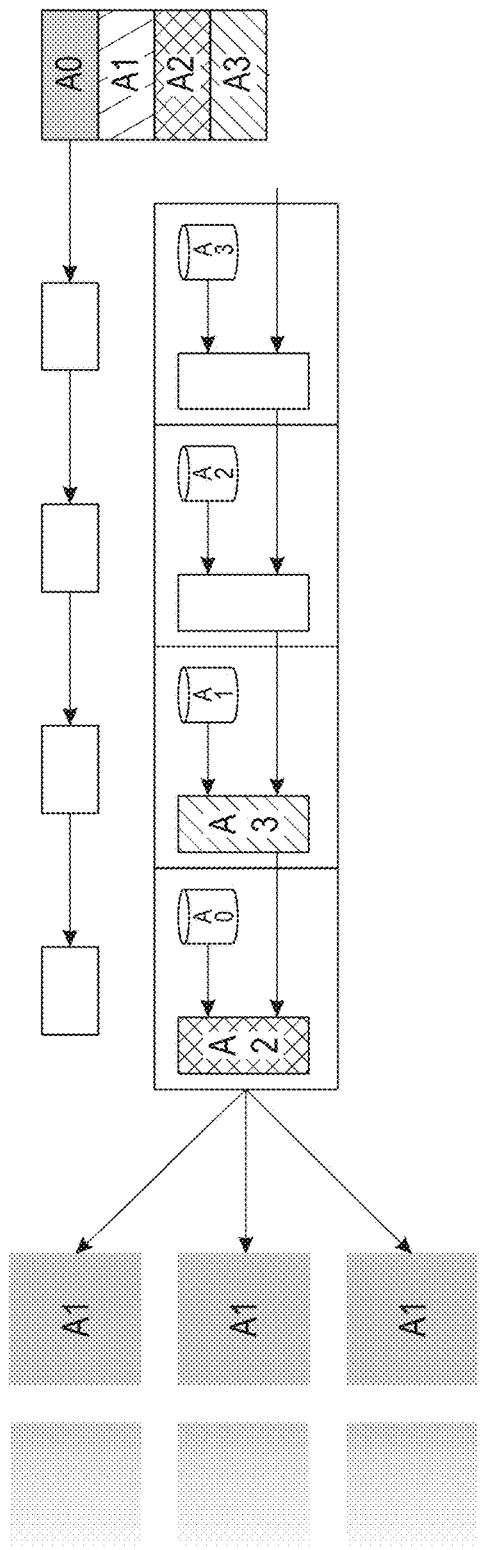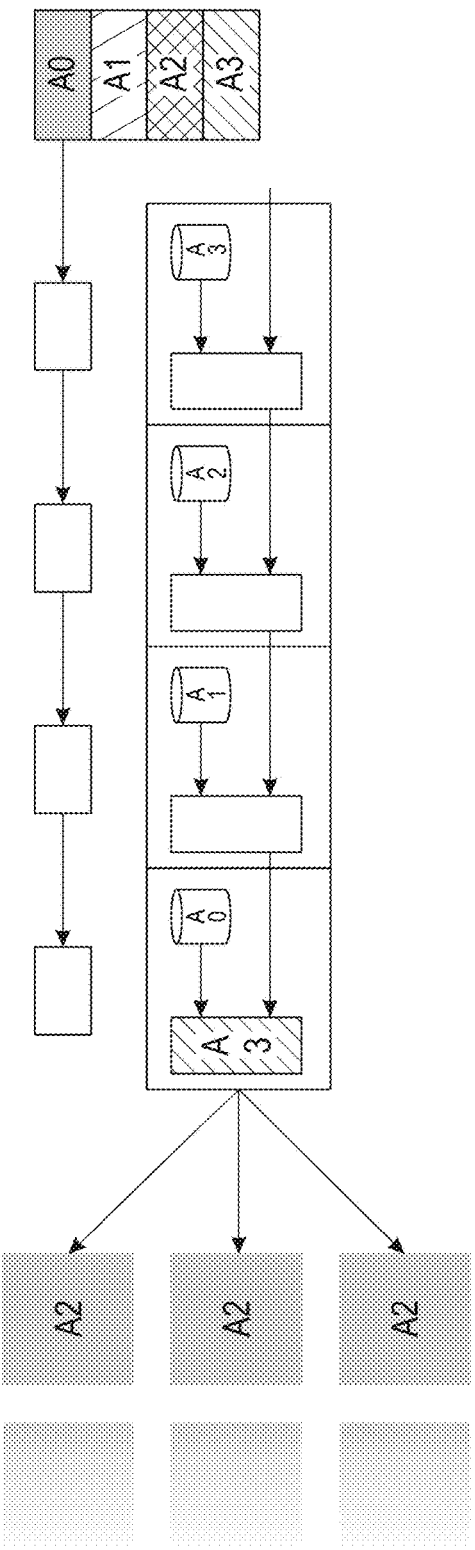

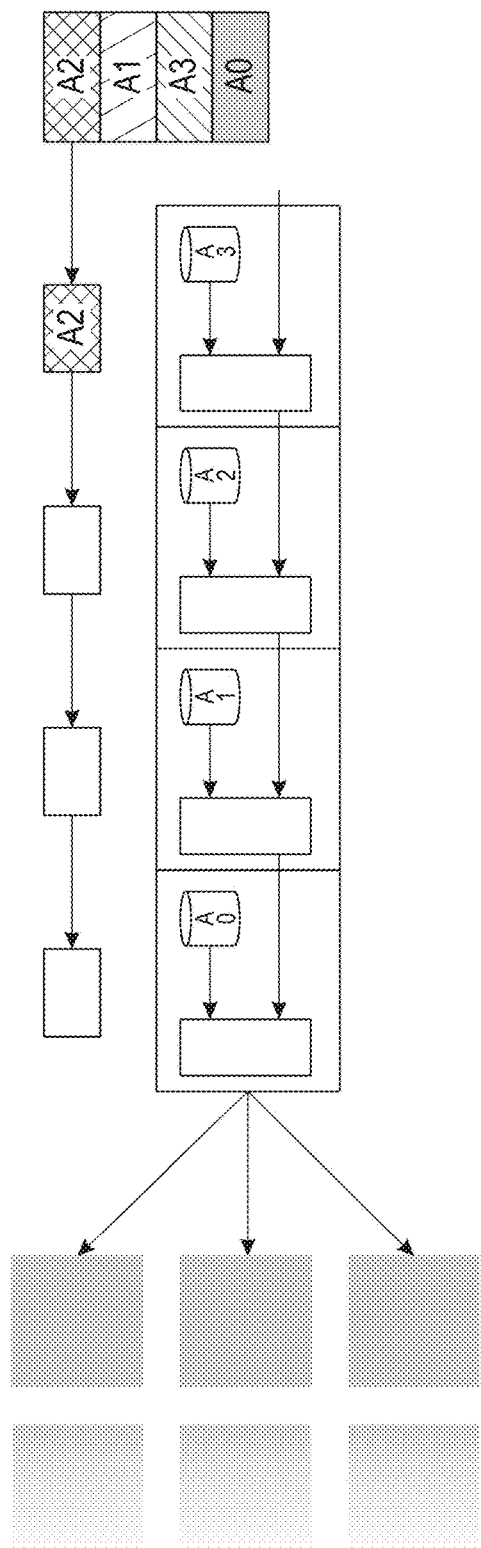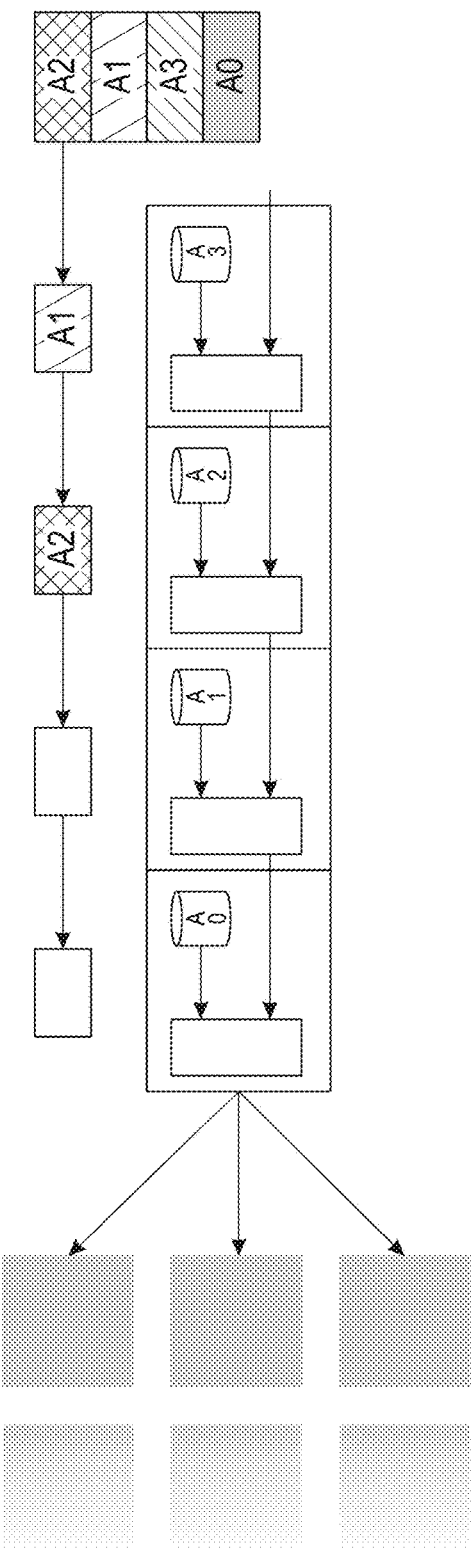
FIG. 13A
FIG. 13B

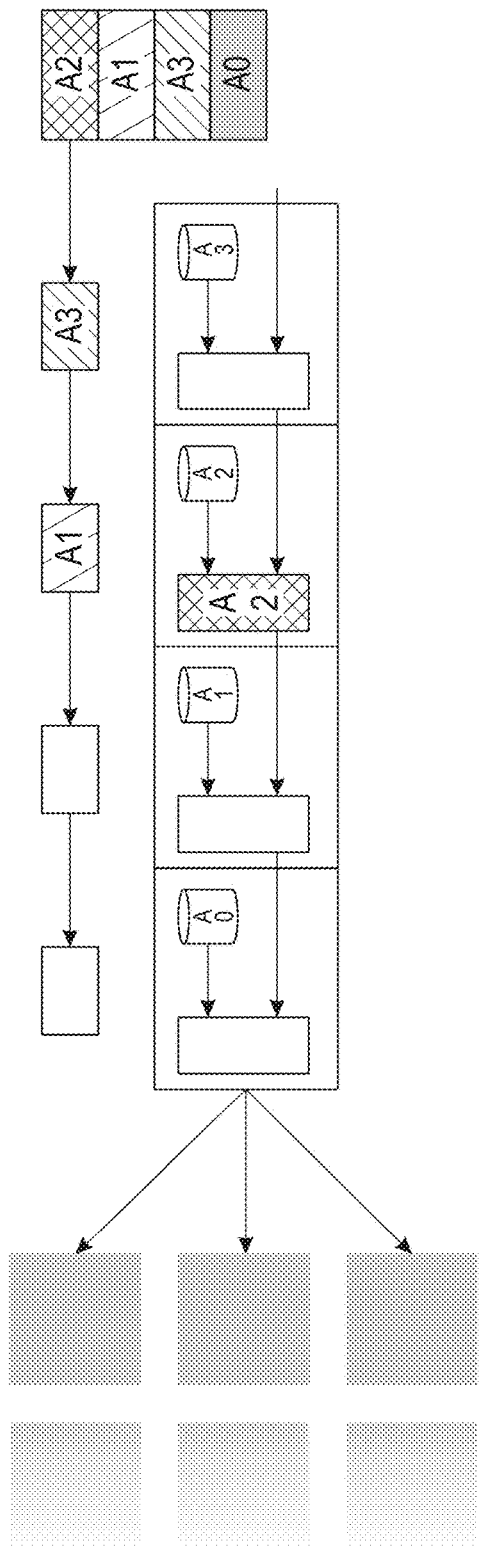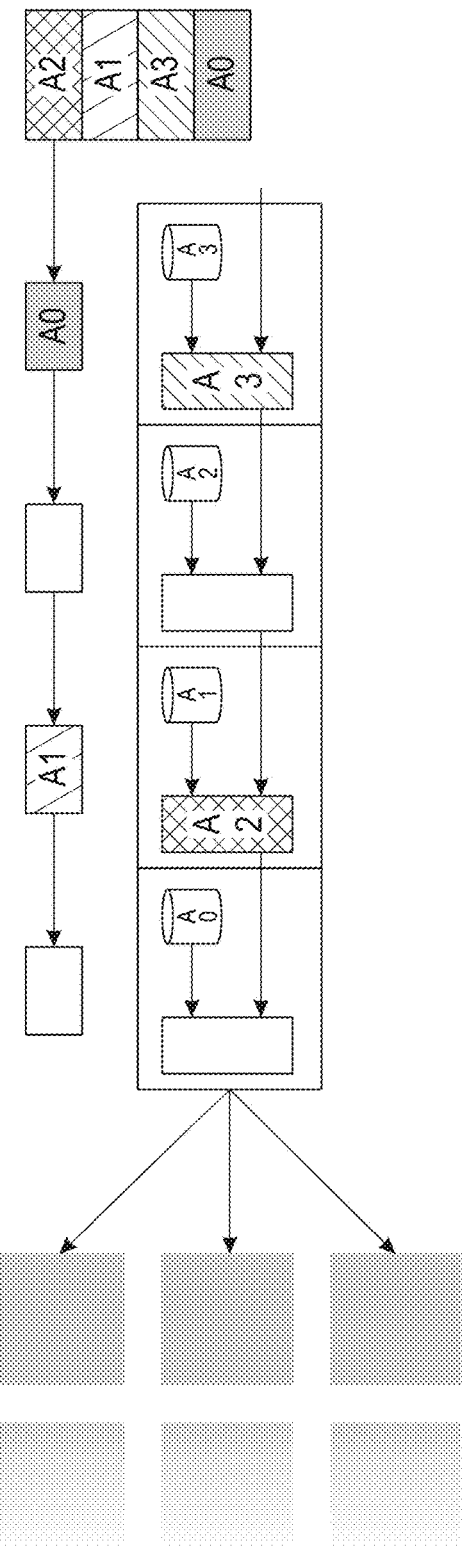
FIG. 13C
FIG. 13D

NEURAL NETWORK WEIGHT DISTRIBUTION FROM A GRID OF MEMORY ELEMENTS

This invention was made with government support under FA8750-18-C-0015 awarded by U.S. Air Force, Office of Scientific Research. The government has certain rights to this invention.

BACKGROUND

Embodiments of the present disclosure relate to neural network processing, and more specifically, to neural network weight distribution from a grid of memory elements.

BRIEF SUMMARY

According to embodiments of the present disclosure, neural inference chips for computing neural activations are provided. In various embodiments, the neural inference chip comprises at least one neural core, a memory array, an instruction buffer, and an instruction memory. The memory array is operatively coupled to the at least one neural core, the memory array comprising a plurality of elements, each element comprising a memory and a horizontal buffer, the horizontal buffer of each element of the memory array being in communication with either the horizontal buffer of another of the elements of the memory array or to the at least one neural core. The instruction buffer is in communication with the memory array, the instruction buffer having a position corresponding to each of the plurality of elements of the memory array. The instruction memory is in communication with the instruction buffer. The instruction memory is adapted to provide at least one instruction to the instruction buffer. The instruction buffer is adapted to advance the at least one instruction between positions in the instruction buffer. The instruction buffer is adapted to provide the at least one instruction to at least one of the plurality of elements of the memory array from its associated position in the instruction buffer when the memory of the at least one of the plurality of elements contains data associated with the at least one instruction. Each of the plurality of elements of the memory array is adapted to provide a data block from its memory to its horizontal buffer in response to the arrival of an associated instruction from the instruction buffer. The horizontal buffer of each element of the memory array is adapted to provide a data block to the horizontal buffer of another of the elements of the memory array or to the at least one neural core.

According to embodiments of the present disclosure, neural inference chips for computing neural activations are provided. In various embodiments, the neural inference chip comprises at least one neural core, a memory array, a plurality of instruction buffers, and a plurality of instruction memories. The memory array is operatively coupled to the at least one neural core, the memory array comprising a plurality of elements, each element comprising a memory, a horizontal buffer, and a vertical buffer, the horizontal buffer of each element of the memory array being in communication with either the horizontal buffer of another of the elements of the memory array or to the at least one neural core and the vertical buffer of each element of the memory array being in communication with the vertical buffer of another element of the memory array. The plurality of instruction buffers in communication with the memory array, each of plurality of instruction buffers having a position corresponding to one of the plurality of elements of the memory array. The plurality of instruction memories are each in communication with one of the plurality of instruction buffers. Each instruction memory is adapted to provide at least one instruction to its instruction buffer. Each instruction buffer is adapted to advance the at least one instruction between positions in that instruction buffer. Each instruction buffer is adapted to provide the at least one instruction to at least one of the plurality of elements of the memory array from its associated position in that instruction buffer when the memory of the at least one of the plurality of elements contains data associated with the at least one instruction. Each of the plurality of elements of the memory array is adapted to provide a data block from its memory to its vertical buffer in response to the arrival of an associated instruction from the instruction buffer. Each of the plurality of elements of the memory array is adapted to provide the data block from its vertical buffer to its horizontal buffer. The vertical buffer of each element of the memory array is adapted to provide the data block to the vertical buffer of another of the elements of the memory array. The horizontal buffer of each element of the memory array is adapted to provide a data block to the horizontal buffer of another of the elements of the memory array or to the at least one neural core.

According to embodiments of the present disclosure, methods of and computer program products for computing neural activations are provided. At least one instruction is provided to an instruction buffer from an instruction memory. The at least one instruction is advanced between positions in the instruction buffer. The at least one instruction is provided from the instruction buffer to at least one of a plurality of elements of a memory array when the memory of the at least one of the plurality of elements contains data associated with the at least one instruction. The memory array comprises the plurality of elements, each element comprising a memory and a horizontal buffer, the horizontal buffer of each element of the memory array being in communication with either the horizontal buffer of another of the elements of the memory array or to the at least one neural core. A data block is provided from the memory to the horizontal buffer of the at least one of a plurality of elements in response to the arrival of the at least one instruction from the instruction buffer. The data block is provided from the horizontal buffer of the at least one of a plurality of elements to the horizontal buffer of another of the elements of the memory array or to at least one neural core.

BRIEF DESCRIPTION OF THE SEVERAL VIEWS OF THE DRAWINGS

FIGS. 12A-I illustrate the distribution of instructions and sequential data with a linear weight memory array according to embodiments of the present disclosure.

FIGS. 13A-I illustrate the distribution of instructions and randomly-accessed data with a linear weight memory array according to embodiments of the present disclosure.

DETAILED DESCRIPTION

Figure 1:
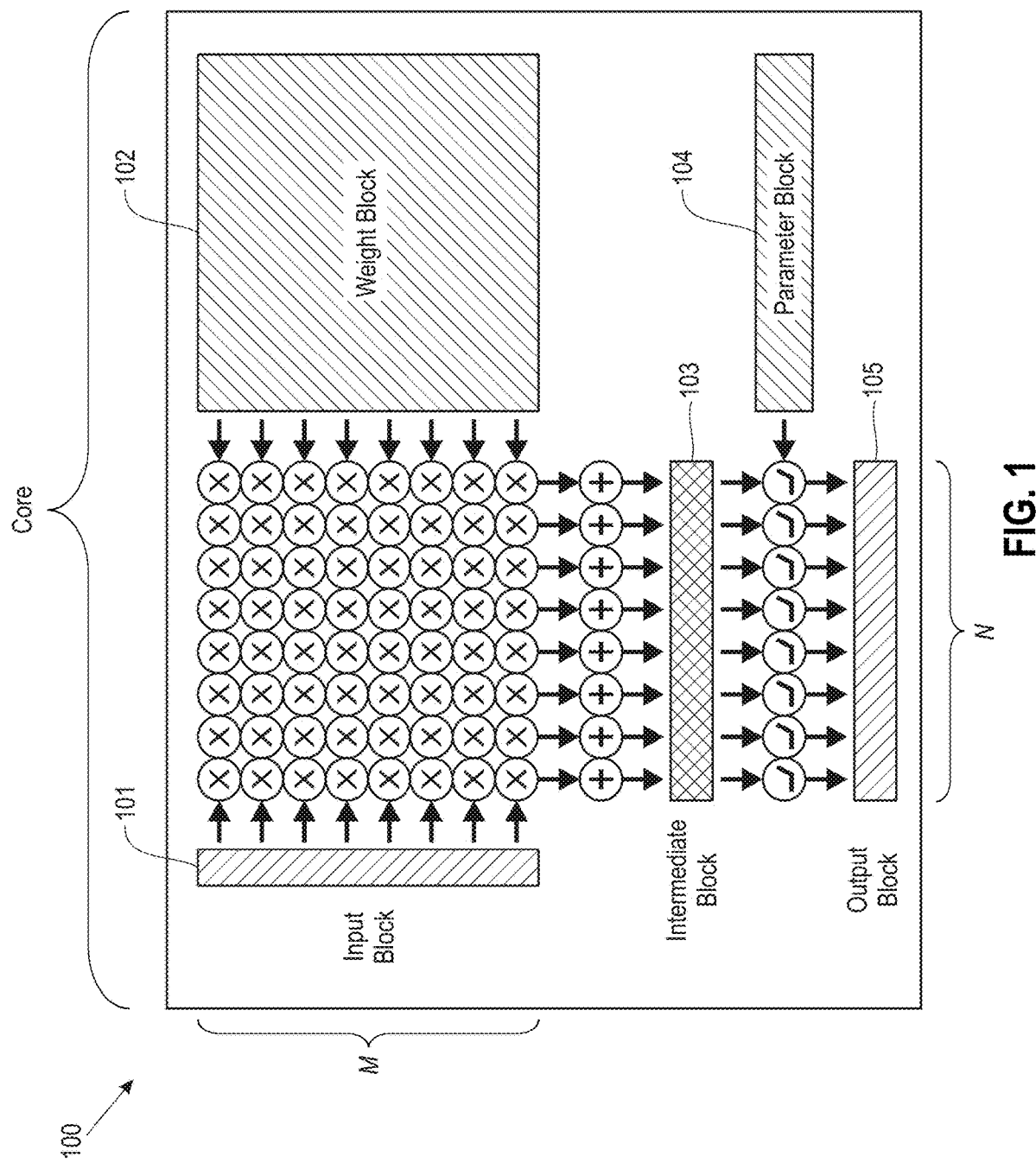
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ. In some embodiments, activation function σ requires no additional parameters, in which case the additional dimension is unnecessary. However, in some embodiments, activation function a requires at least one additional parameter, which appears in dimension o.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i, j, k]=σ(Z[i, j, k])=Z[i, j, k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, y∈Y based on the inputs and weights W with elements $w_i$. In various embodiments, the weighed sum of inputs is adjusted by a bias b, and then the result is passed to a nonlinearity F(·). For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
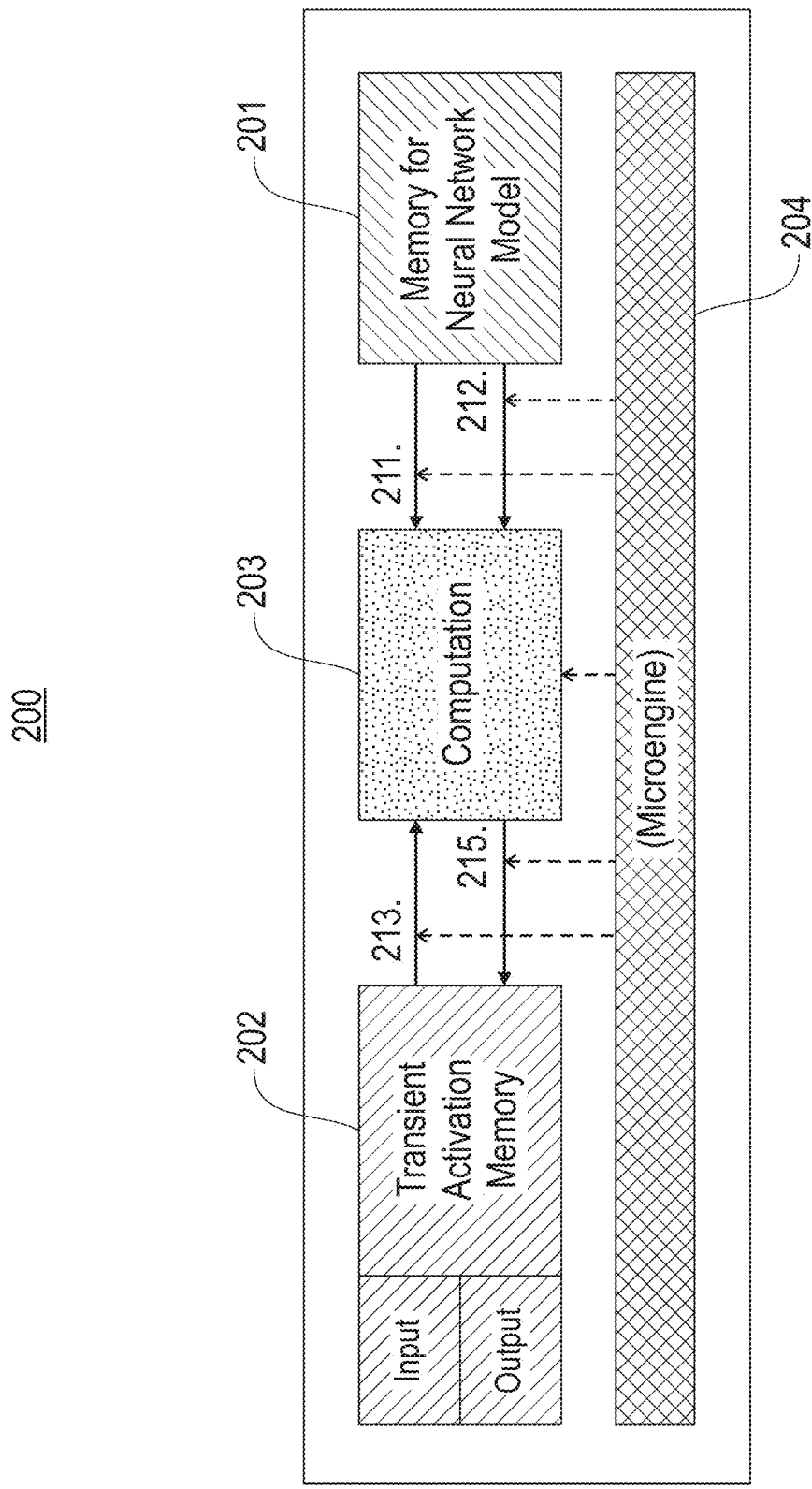
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
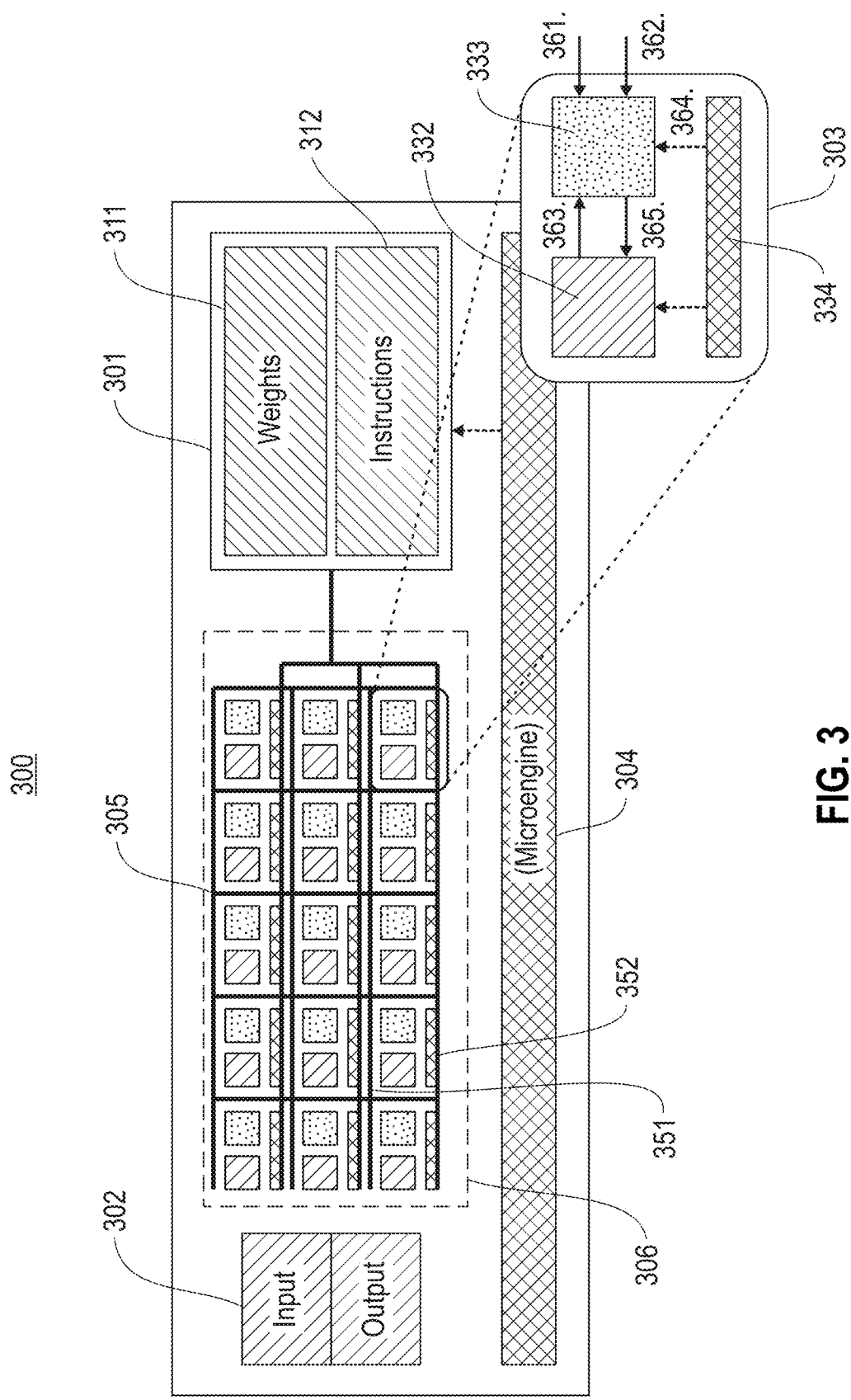
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
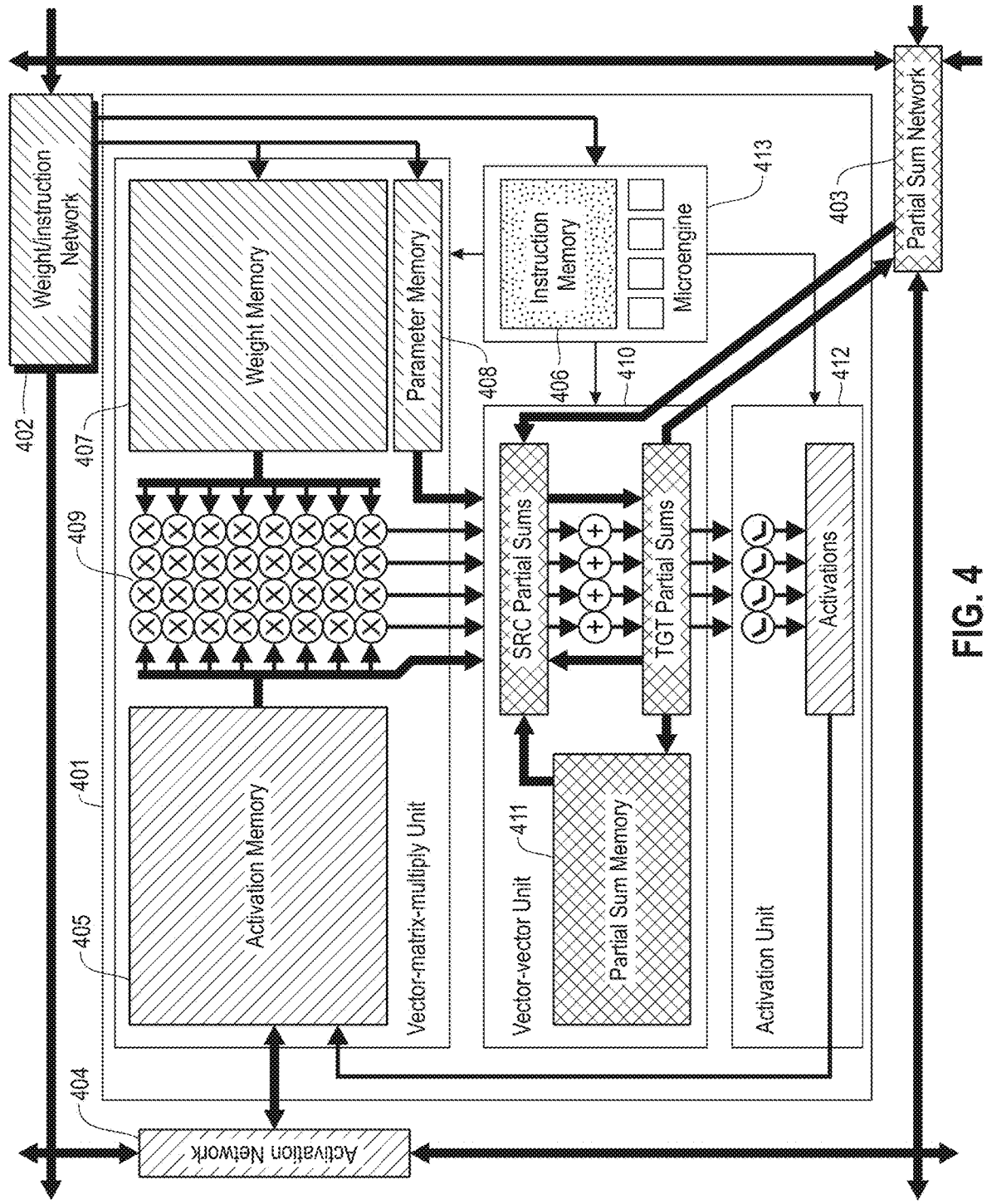
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (VMM) unit 409. The activation vector (V) is read from activation memory 405 by Vector Matrix Multiply (VMM) unit 409. Vector Matrix Multiply (VMM) unit 409 then computes vector-matrix multiplication $Z=X^T W$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

Figure 5:
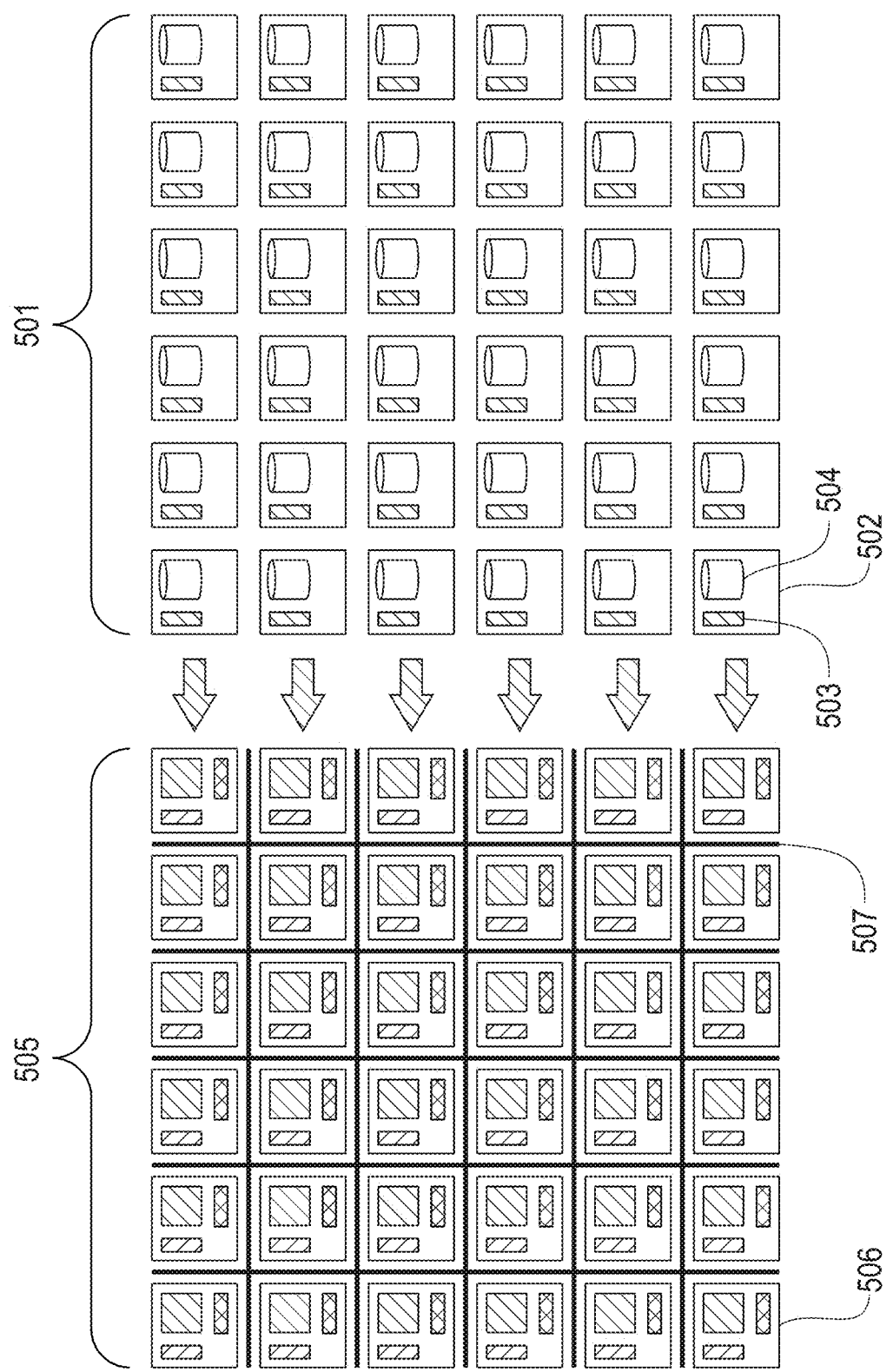
FIG. 5 is a schematic view of data distribution from a global memory array according to embodiments of the present disclosure.

Referring now to FIG. 5, a schematic view is provided of data distribution from a global memory array according to embodiments of the present disclosure. Global memory array 501 includes a plurality of elements 502, each comprising a memory element 504 and a buffer 503. Weights and instructions are provided from global array 501 to array 505 of cores 506 via network 507. An exemplary configuration of cores 303 is discussed above with regard to FIG. 3. Memory 303 in FIG. 3 may be implemented as described in connection with global memory array 501, where core array 306 corresponds to 505.

As set out above, a many core architecture for neural inference provides a significant advantage in computing power. However, if the neural network weights and parameters are not provided to computation cores on time, the cores cannot perform any useful computation. As a result, the performance of a neural chip may be limited by the capability of delivering neural network weights and parameters to computation cores on the chip. On-chip memory greatly improves the memory bandwidth compared to typical off-chip memory such as Dynamic Random-Access Memory (DRAM) or High Bandwidth Memory (HBM). Moreover, on-chip memory is more energy-efficient than off-chip memory, leading to a more power-efficient neural inference system. In various embodiments, the on-chip memory may comprise Static Random-Access Memory (SRAM) or other embedded memories. However, delivering neural network weights to cores at the rate commensurate with the processing speed remains a challenge.

Particular efficiencies may be realized with Convolutional Neural Networks (CNN). In CNNs, the same weight matrix (sometimes referred to as a convolutional filter) is repeatedly used. To minimize the amount of on-chip memory used, it is preferable to store a given weight matrix in one place with no duplication. In order to store a large neural network, some embodiments of the on-chip memory consist of a collection of many memory elements. It will also be appreciated that the many cores are the target of the memory weights. This result in a many-to-many communication problem (many memory elements to many cores). The broadcasting of weights can create network-on-chip (NoC) congestion, and may create a number of conflicts and pipeline stalls, leading to degradation of broadcasting bandwidth.

As outlined above, in various embodiments of a neural inference chip, a grid of neural inference cores is provided to accelerate neural network inference. In various embodiments, prescheduling of instructions is provided. Neural network evaluation involves a regular pattern of computation, and so instructions can be prescheduled without any stalls in order to achieve high performance. However, it is preferred that all the neural network weights are delivered to the cores just-in-time as prescheduled. If the weight delivery network is congested and weight delivery stalls, the prescheduling of neural network evaluation fails.

The present disclosure provides for a stall-less weight delivery network-on-chip to deliver weight parameters from a grid of memory elements to a grid of computation cores. The one dimensional scheme is first shown below, and then extended to a two-dimensional grid scheme. These approaches are further extended to support different various weight distribution such as striping (where different rows of cores get different weights).

The approaches described herein work without conflict even if the time to deliver instruction to the memory element and deliver data from the memory element to computing cores varies. These approaches address instruction flow that can access any column at any order. The new schemes remove the constraint that all columns start at the same time.

Figure 6:
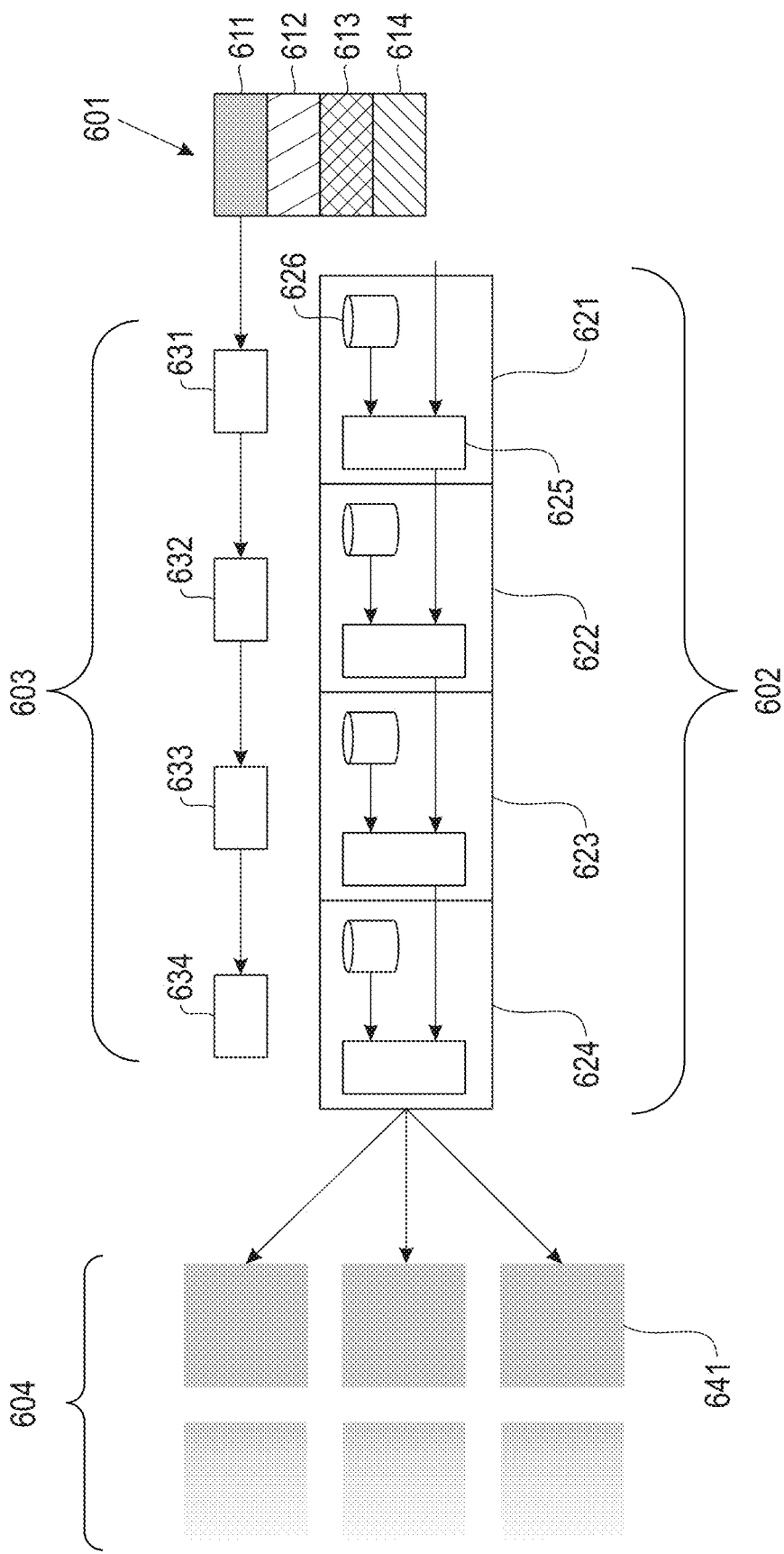
FIG. 6 illustrates an exemplary memory controller with a linear weight memory array according to embodiments of the present disclosure.

Referring now to FIG. 6, an exemplary memory controller with a linear weight memory array is illustrated according to embodiments of the present disclosure. Memory controller 601 includes an instruction memory, illustrated here with four instructions slots 611 . . . 614. Weight memory array 602 includes a plurality of elements 621 . . . 624, each including a data buffer 625 and a memory element 626. Instruction buffer 603 includes a plurality of elements 631 . . . 634, each corresponding to one of weight memory elements 621 . . . 624. Core grid 604 comprises a plurality of cores 641, as described above with regard to FIG. 5.

Figure 7:
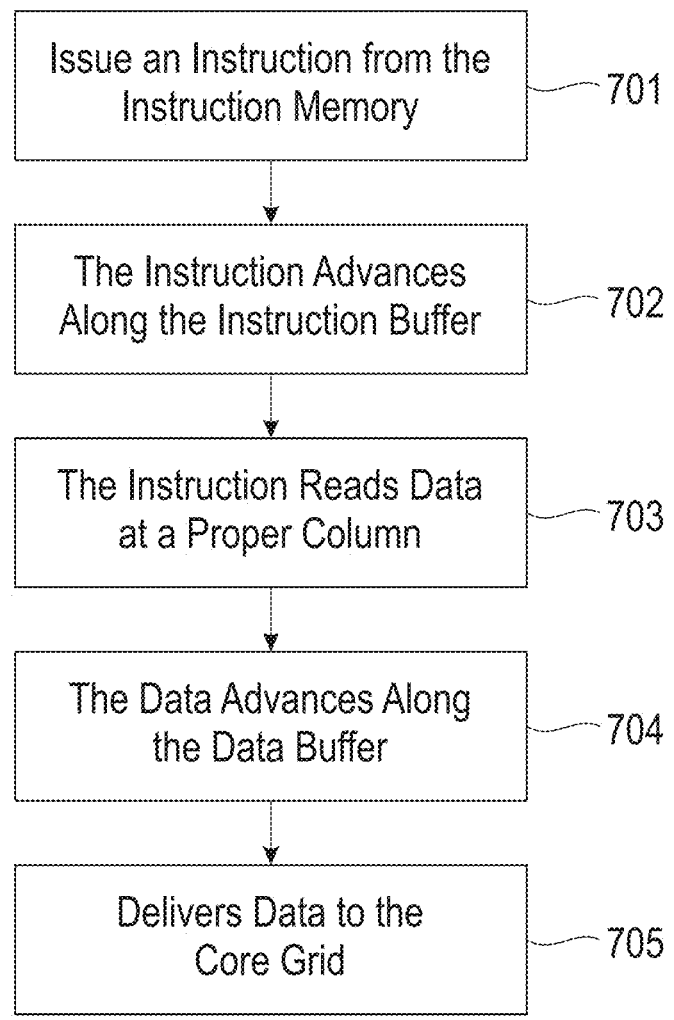
FIG. 7 illustrates a method of memory distribution using the controller of FIG. 6 according to embodiments of the present disclosure.

Referring to FIG. 7, a method of memory distribution using the controller of FIG. 6 is illustrated. At 701, an instruction is issued from the instruction memory 601. The instruction advances along the instruction buffer 603 between elements 631 . . . 634. When the instruction reaches the column where the applicable data is stored (e.g., memory element 621), the data is read from memory (e.g., memory 626 in this example) to data buffer (e.g., buffer 625 in this example). Once read, the data propagates along the data buffers, e.g., from memory element 621 through 622 . . . 624. After arriving at the final element 624, the values are delivered to the core grid 604.

It will be appreciated that sequential instructions may be issued from controller 601, for example one per cycle. The sum of the number of cycles for each instruction to advance along the instruction buffer 603 and the number of cycles for the data to advance along the data buffers (in memory elements 621 . . . 624) is constant, regardless of the location of the data. In particular, the overall delay of instruction distribution plus the overall delay of data distribution is constant. This remains the case even in random access cases.

Figure 8:
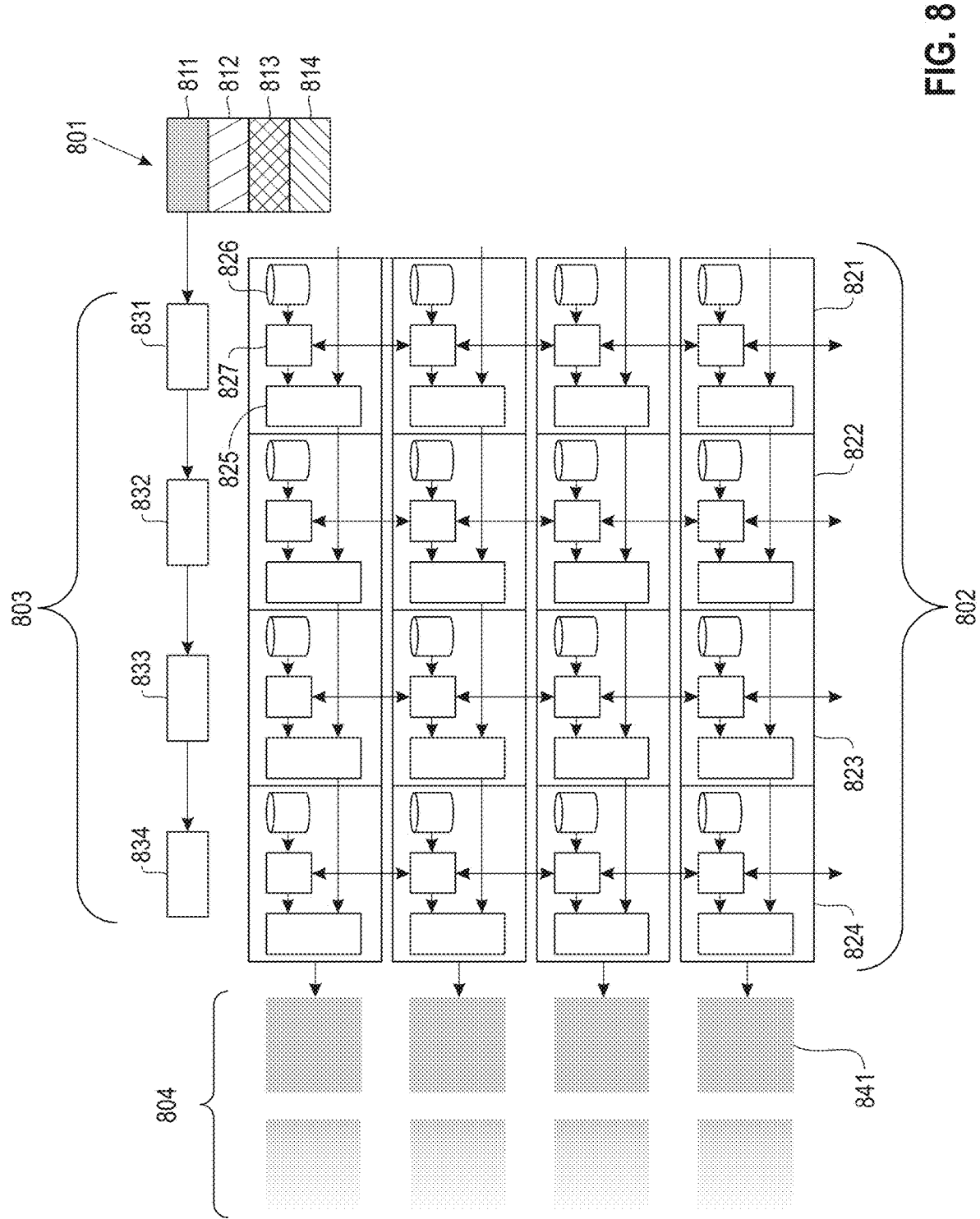
FIG. 8 illustrates an exemplary memory controller with a two-dimensional weight memory array according to embodiments of the present disclosure.

Referring to FIG. 8, an exemplary memory controller with a two-dimensional weight memory array is illustrated according to embodiments of the present disclosure. Memory controller 801 includes an instruction memory, illustrated here with four instructions slots 811 . . . 814. Weight memory array 802 includes a plurality of elements, arranged in rows and columns 821 . . . 824, each element including a data buffer 825 and a memory element 826. In addition to data buffer 825, the two-dimensional case includes a second buffer 827 to accommodate communication of data within a column. Instruction buffer 803 includes a plurality of elements 831 . . . 834, each corresponding to one column of weight memory elements 821 . . . 824. Core grid 804 comprises a plurality of cores 841, as described above with regard to FIG. 5.

Figure 9:
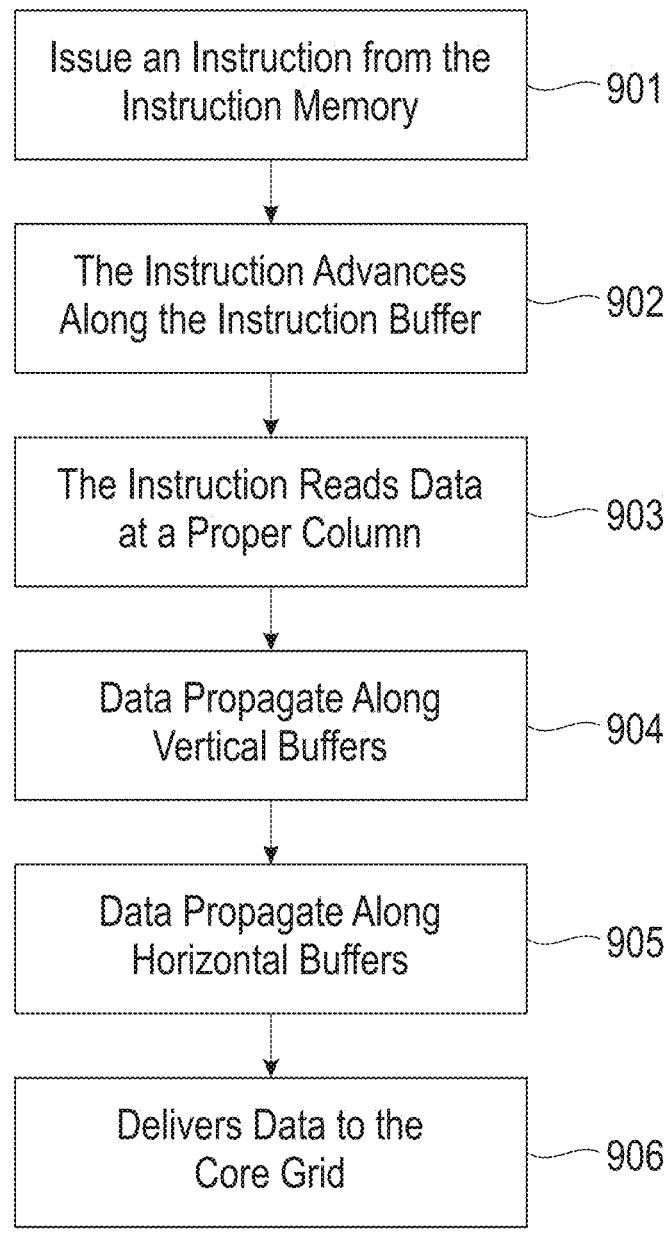
FIG. 9 illustrates a method of memory distribution using the controller of FIG. 8 according to embodiments of the present disclosure.

Referring to FIG. 9, a method of memory distribution using the controller of FIG. 8 is illustrated. At 901, an instruction is issued from the instruction memory 801. At 902, the instruction advances along the instruction buffer 803 between elements 831 . . . 834. At 903, when the instruction reaches the column where the applicable data is stored (e.g., column 821), the data is read from memory (e.g., memory 826 in this example) to data buffer (e.g., buffer 825 in this example). At 904, once read, the data propagates along the buffers vertically (e.g., down column 821). At 905, the data propagates along each row, e.g., from column 821 through 822 . . . 824. At 906, after arriving at the final column 824, the values are delivered to the core grid 804.

As in the one-dimensional case, the total delay among the steps of instruction distribution, vertical distribution, and horizontal distribution is constant. In particular, the sum of the cycles of delay for instruction distribution plus the cycles for vertical distribution plus the cycles for horizontal distribution are constant. In addition, it will be appreciated that when multiple columns are accessed out of order, the delay of instruction and data delivery match each other.

Figure 10:
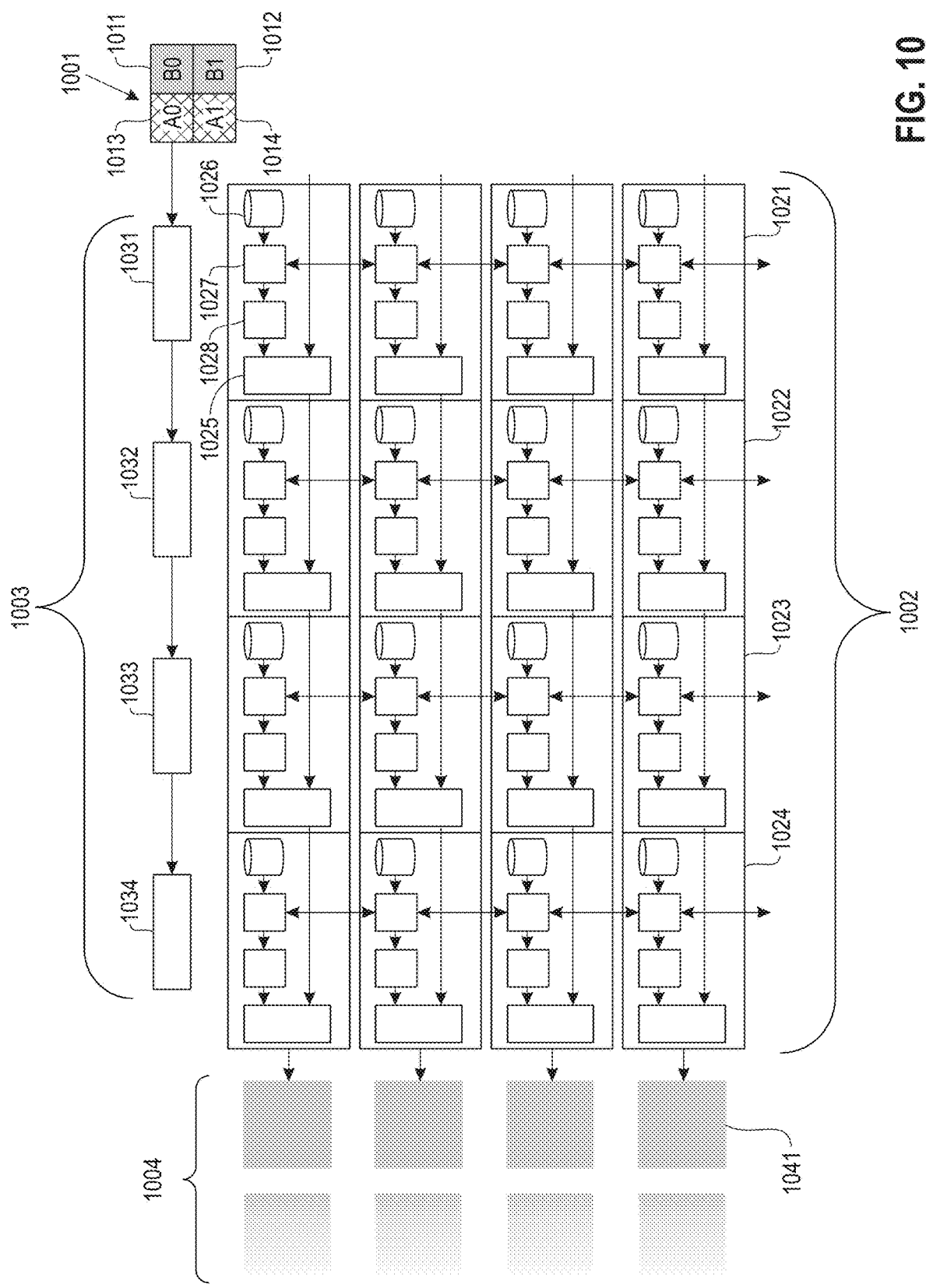
FIG. 10 illustrates an exemplary memory controller with a two-dimensional weight memory array and a layover buffer according to embodiments of the present disclosure.

Referring to FIG. 10, an exemplary memory controller with a two-dimensional weight memory array and a layover buffer is illustrated according to embodiments of the present disclosure. Memory controller 1001 includes an instruction memory, illustrated here with four instructions slots 1011 . . . 1014. These instructions slots are arranged in multiple columns to allow multiple instructions to issue simultaneously within a cycle. In this example, slots 1011 and 1013 store the instructions to be issued in the first cycle, and slots 1012 and 1014 store the instructions for the second cycle. Weight memory array 1002 includes a plurality of elements, arranged in rows and columns 1021 . . . 1024, each element including a data buffer 1025 and a memory element 1026. In addition to data buffer 1025, the two-dimensional case includes a second (vertical) buffer 1027 to accommodate communication of data within a column. In this example, a layover buffer 1028 is also included between vertical buffer 1027 and horizontal buffer 1025. Instruction buffer 1003 includes a plurality of elements 1031 ... 1034, each corresponding to one column of weight memory elements 1021 ... 1024. Each of elements 1031 ... 1034 can store multiple instructions issued during the same cycle. Core grid 1004 comprises a plurality of cores 1041, as described above with regard to FIG. 5.

In this exemplary embodiment, striping is supported. In particular, reading multiple data on the same columns is enabled. A layover buffer 1028 is added to support reading multiple data and sending stripes of data. Sending out different data to different rows is useful in a variety of cases—collaborating neural inference cores effectively multiply the bandwidth to receive the memory array.

The total time of instruction distribution, vertical distribution, time waiting in the layover buffer, and the horizontal distribution is constant regardless of where the source data is stored and which row the data is distributed. The maximal number of cycles to distribute data through vertical buffers is determined as the combined time of vertical distribution and waiting in the layover buffer. That way, all data come out of the layover buffers to the horizontal buffers at the same time. A counter may be allocated on each vertically distributed packet, which is counted down each clock cycle. That is one way to make sure all data transfers from the layover buffers to the horizontal buffers in the same cycle.

Figure 11:
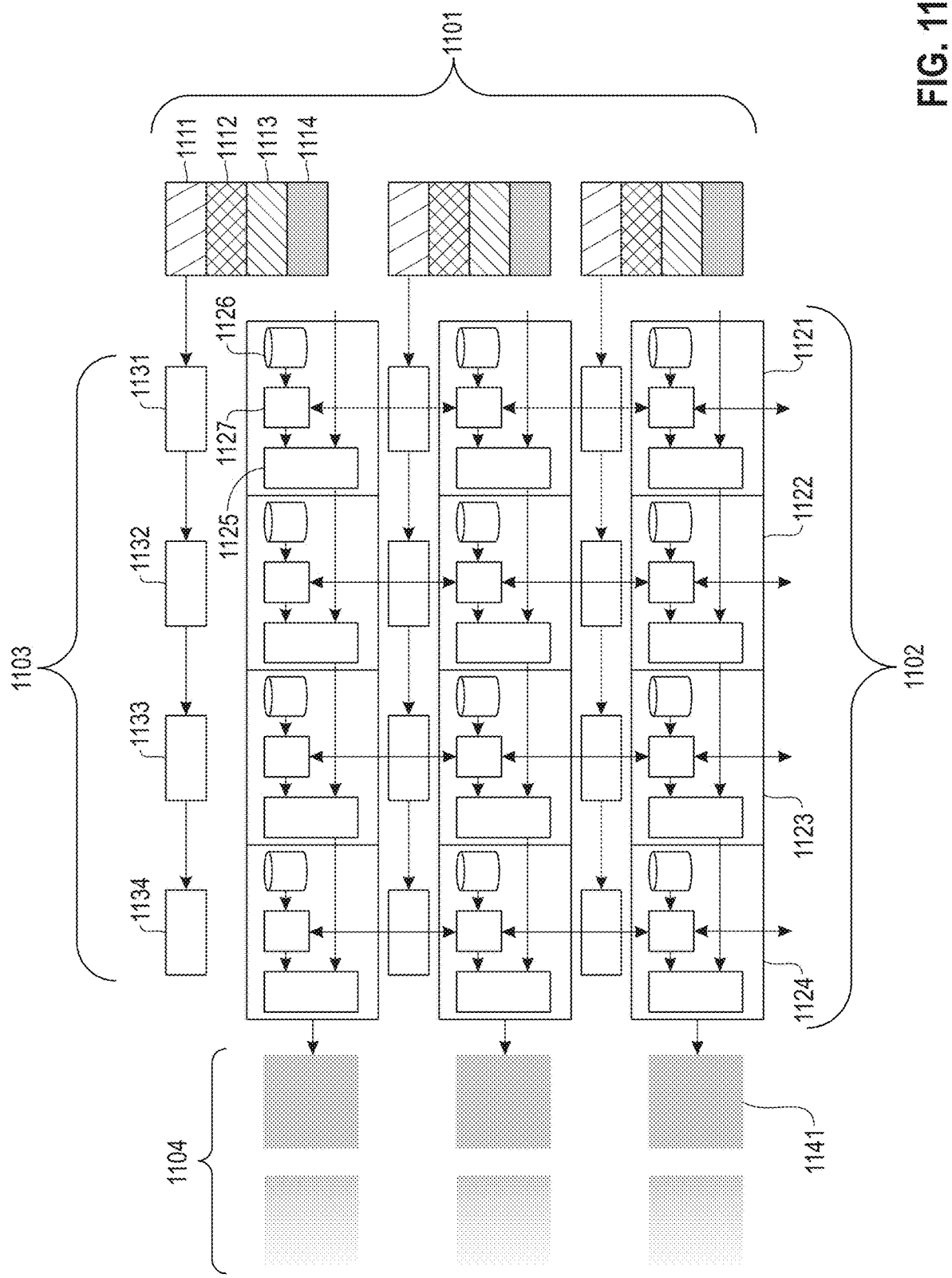
FIG. 11 illustrates an exemplary configuration including multiple memory controllers with a two-dimensional weight memory array according to embodiments of the present disclosure.

Referring to FIG. 11, an exemplary configuration including multiple memory controllers with a two-dimensional weight memory array is illustrated according to embodiments of the present disclosure. Memory controllers 1101 each include an instruction memory, illustrated here with four instructions slots 1111 ... 1114. Weight memory array 1102 includes a plurality of elements, arranged in rows and columns 1121 ... 1124, each element including a data buffer 1125 and a memory element 1126. In addition to data buffer 1125, the two-dimensional case includes a second (vertical) buffer 1127 to accommodate communication of data within a column. Each row of memory array 1102 has a corresponding instruction buffer 1103, which includes a plurality of elements 1131 ... 1134, each corresponding to one column of weight memory elements 1121 ... 1124. Core grid 1104 comprises a plurality of cores 1141, as described above with regard to FIG. 5.

In this example, each row has a separate memory controller with an instruction memory and instruction buffers. Using this approach, each memory element is physically located close to its corresponding instruction buffer. This enables the instruction buffer to control the memory element without additional pipeline delays.

Figure 12A:
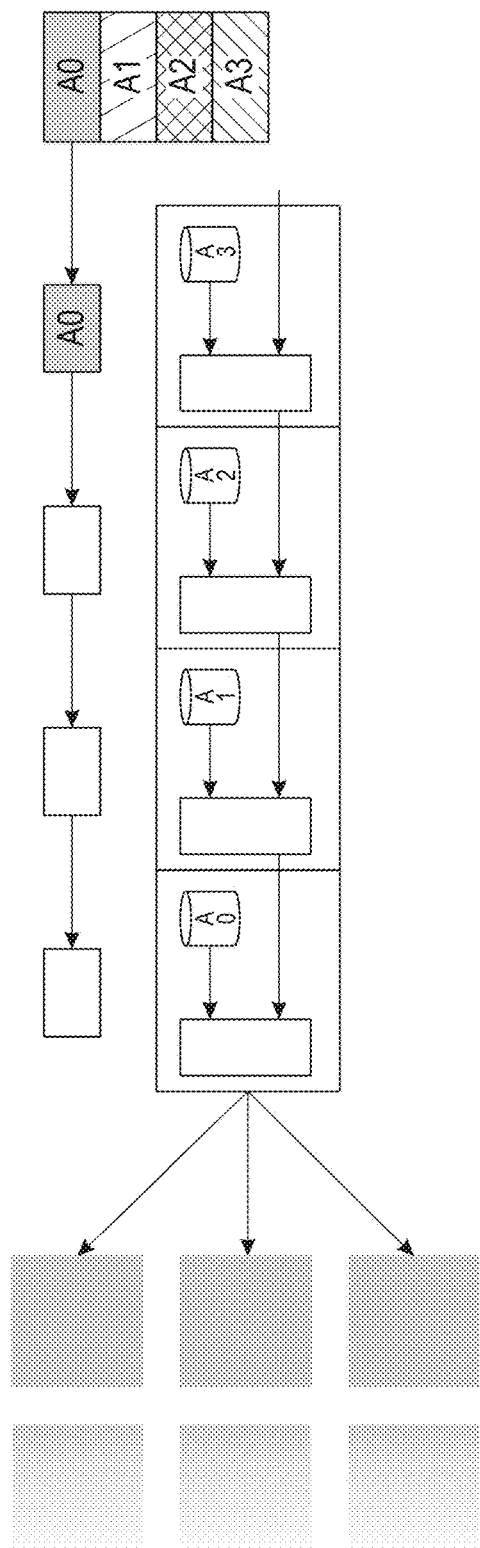
Figure 12B:
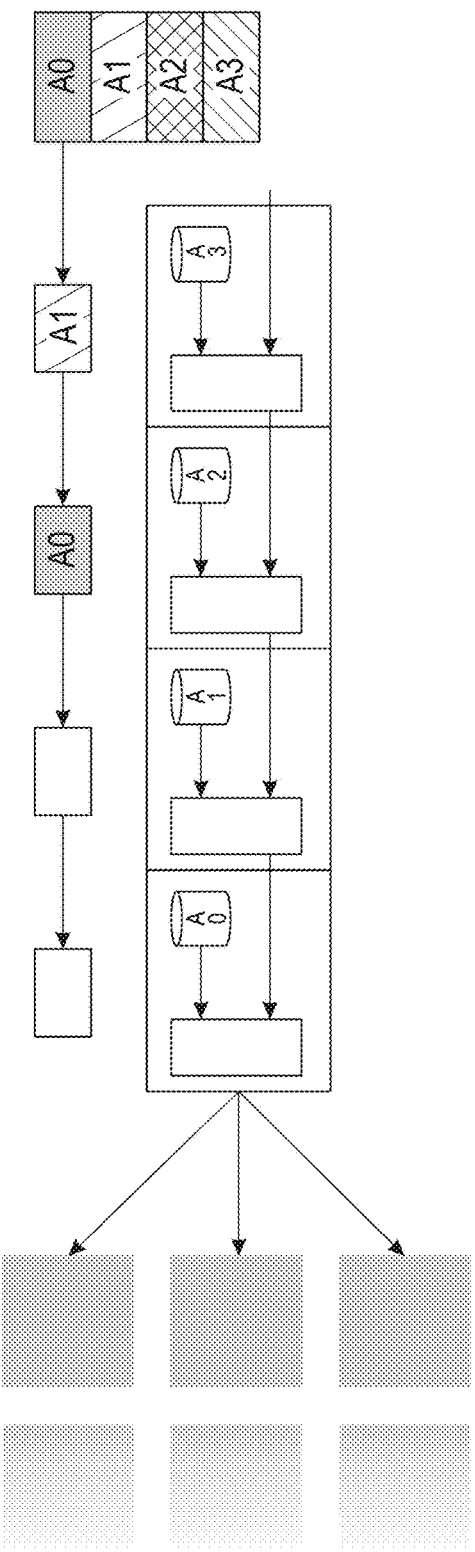
Figure 12C:
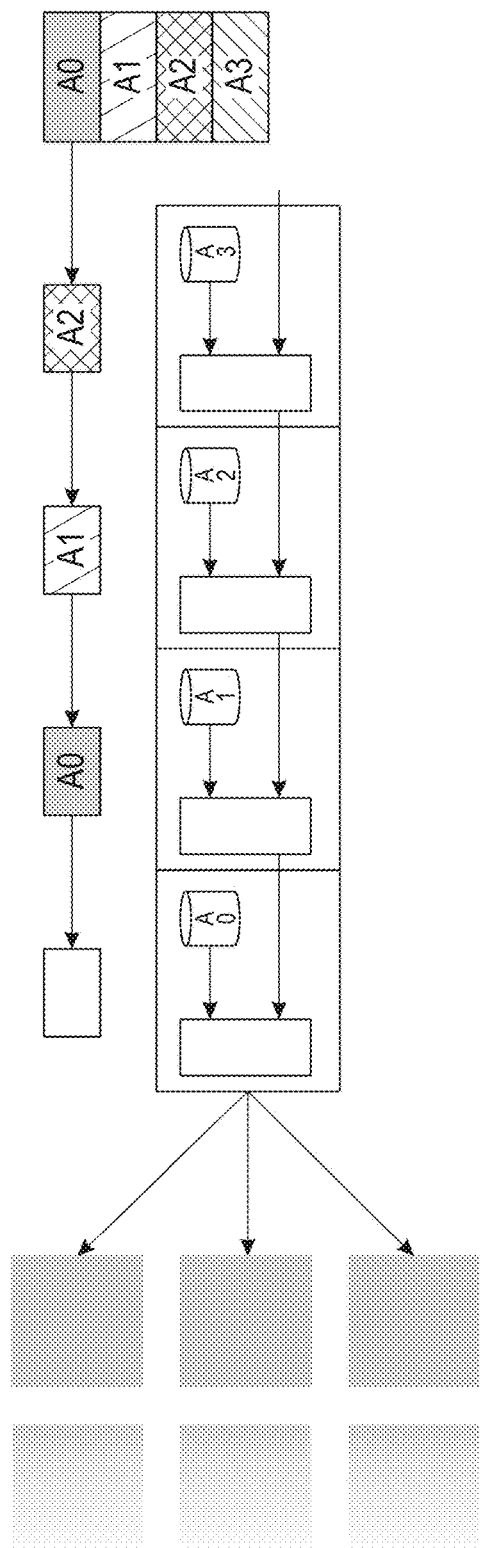
Figure 12D:
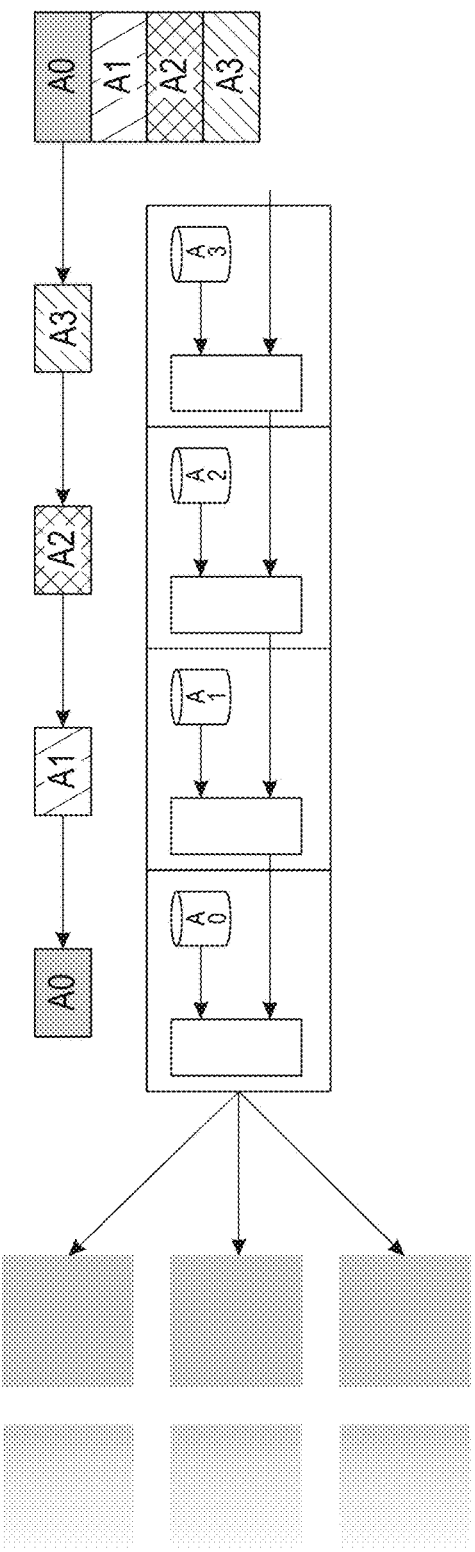
Figure 12E:
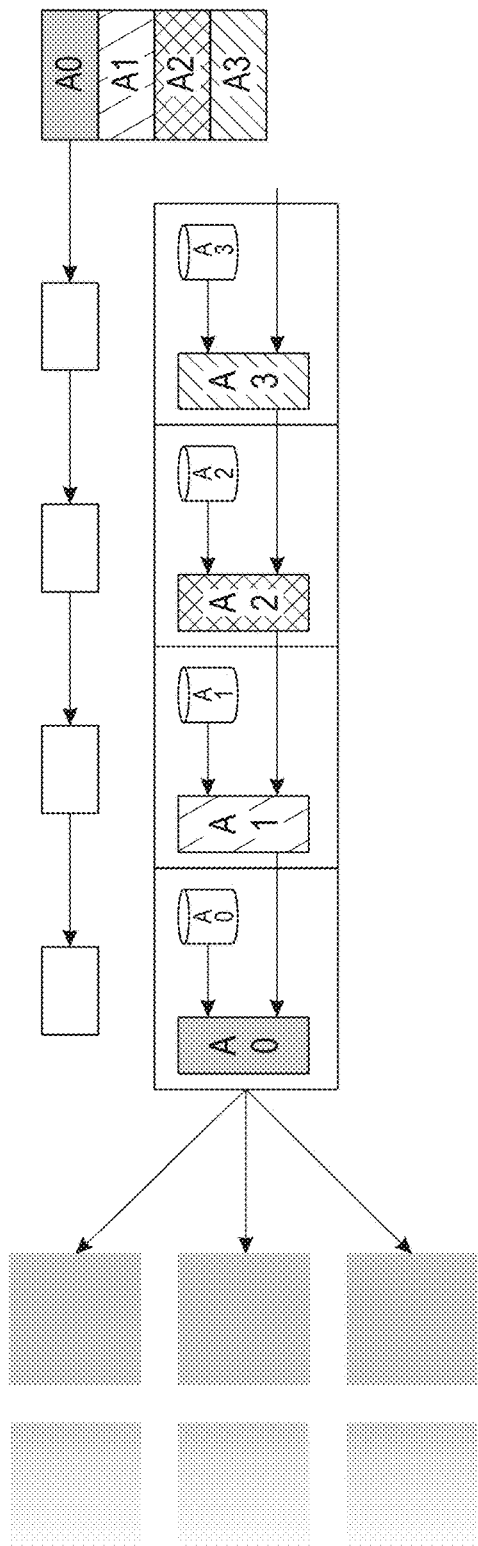
Figure 12F:
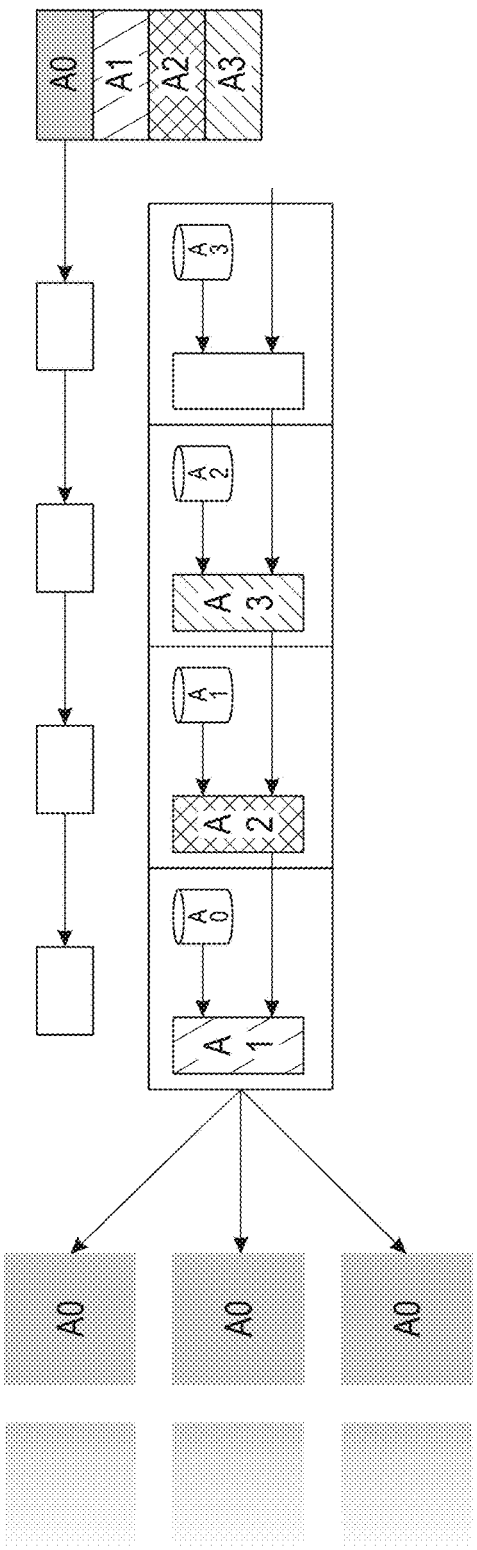
Figure 12I:
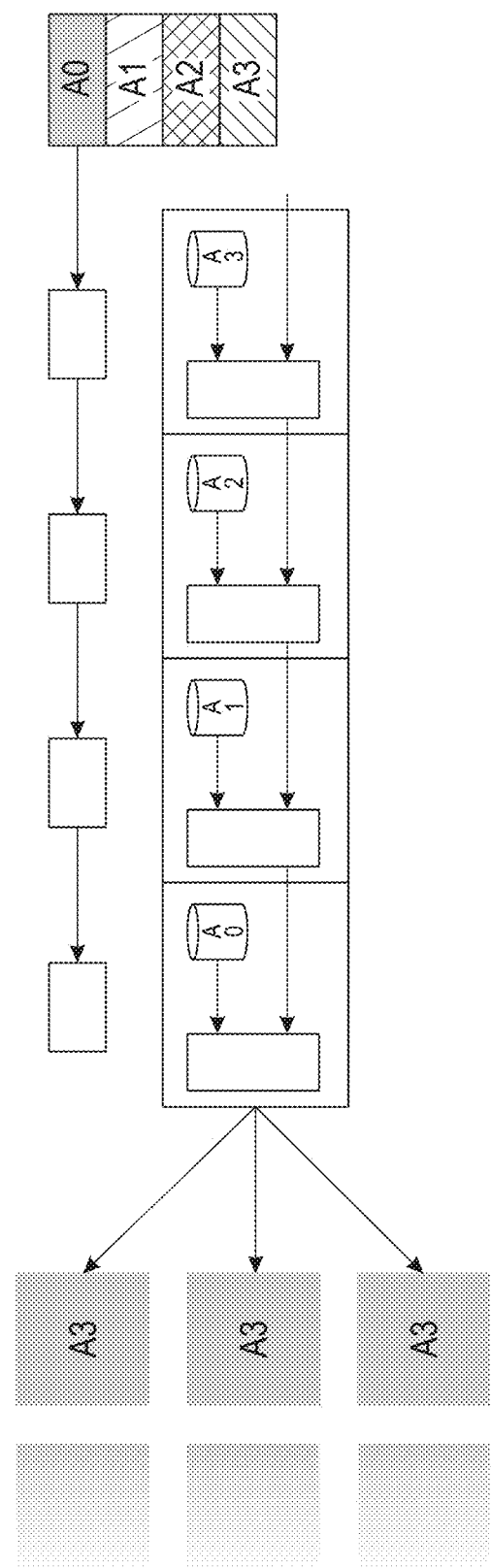

Referring to FIGS. 12A-I, the distribution of instructions and data is illustrated according to embodiments of the present disclosure. In this example, data is read from left to right, with each image depicting a consecutive cycle. Memory controlling instructions in the instruction memory and the data to be read by the instruction are labeled with the same symbol. For example, the first instruction A0 in the instruction memory is going to read data A0 stored in the memory element in the left most column of the memory array. In FIG. 12A, instruction A0 is shown in the instruction buffer. In FIG. 12B, the second instruction is issued, and both A0 and A1 are in instruction buffers. In FIG. 12C, the third instruction issued, and A0, A1, and A2 are in the instruction buffers. In FIG. 12D, the fourth instruction issued, and A0, A1, A2, and A3 are in the instruction buffers, arriving at their destination memory array elements. In FIG. 12E, the instructions A0, A1, A2, and A3 are executed, reading from the corresponding memory to its data buffer. In FIG. 12F, the data advances through the data buffers, with data A0 arriving at the core grid. In FIG. 12G, the data advances through the data buffers, with data A1 arriving at the core grid. In FIG. 12H, the data advances through the data buffers, with data A2 arriving at the core grid. In FIG. 12I, the data advances through the data buffers, with data A3 arriving at the core grid.

Figure 13E:
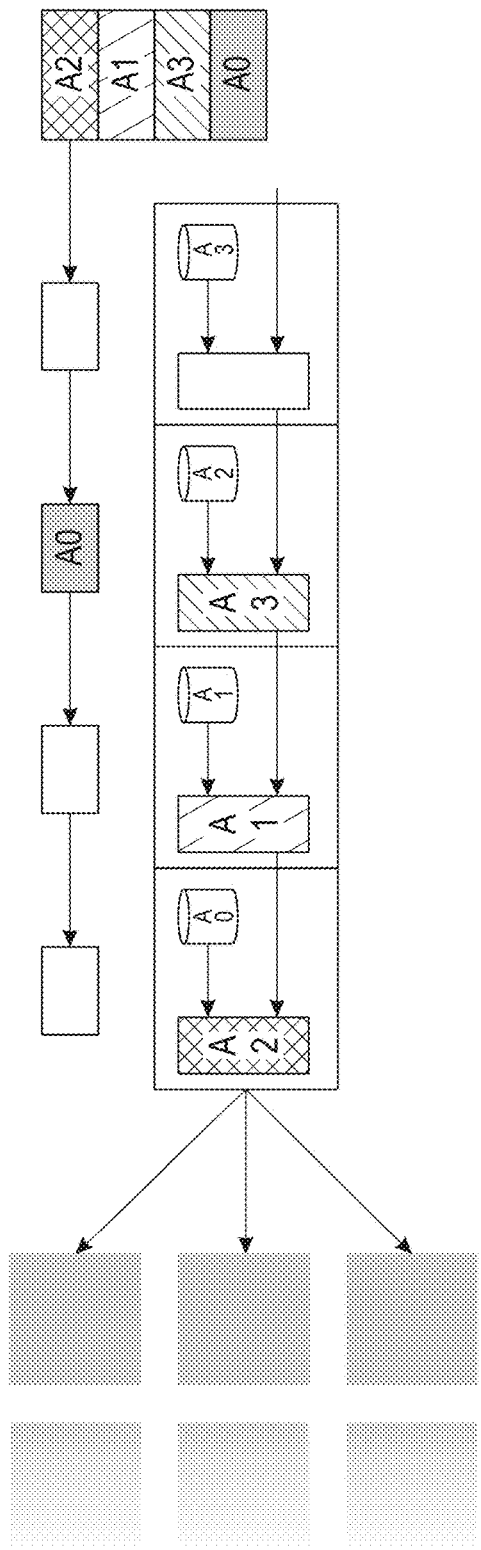
Figure 13F:
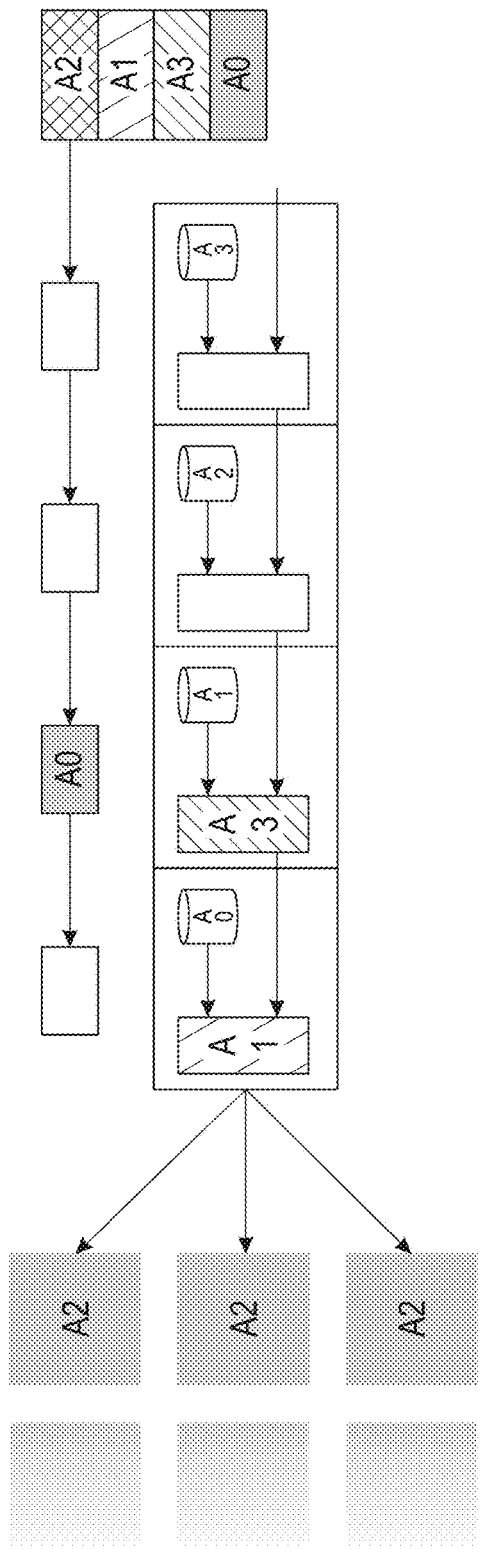
Figure 13G:
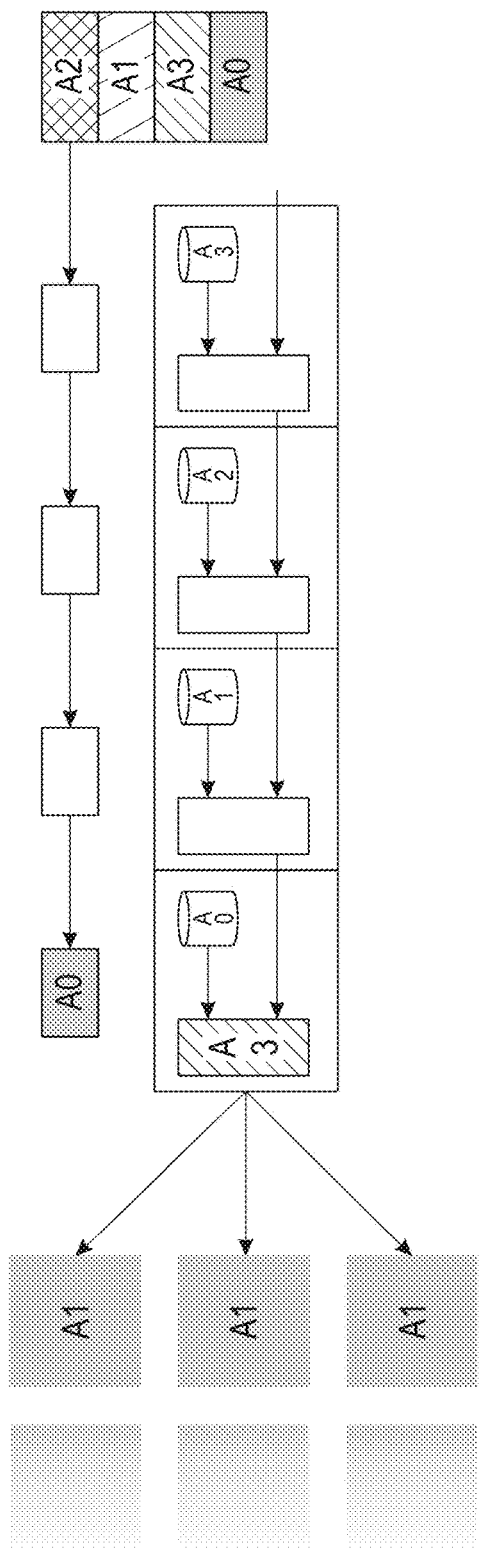
Figure 13H:
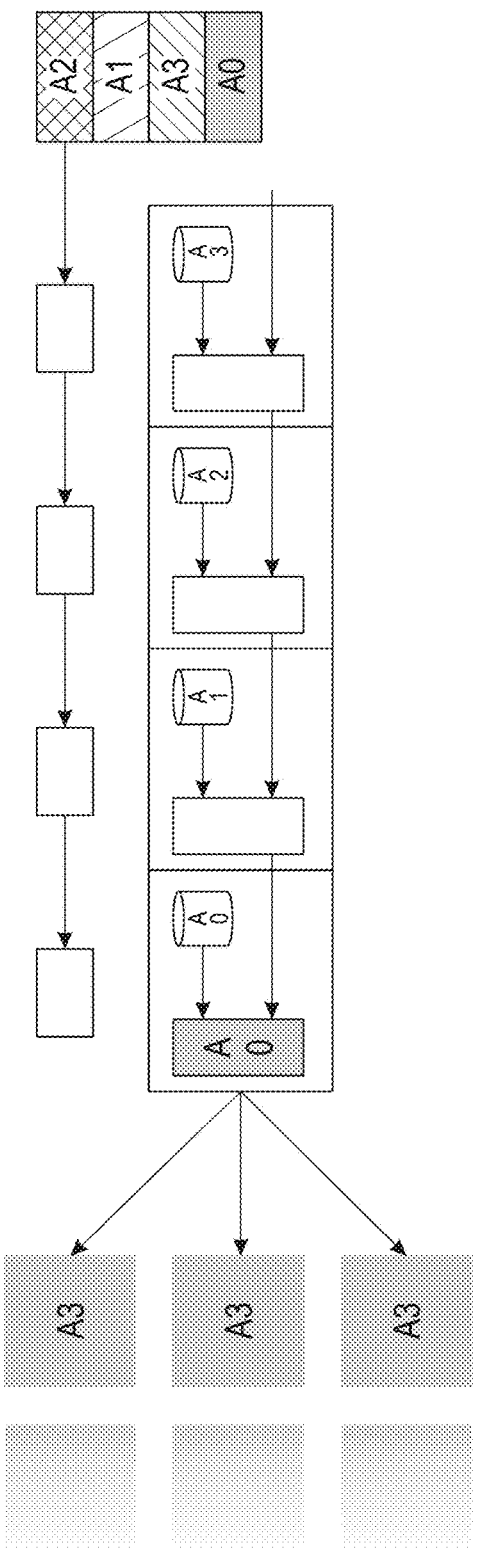
Figure 13I:
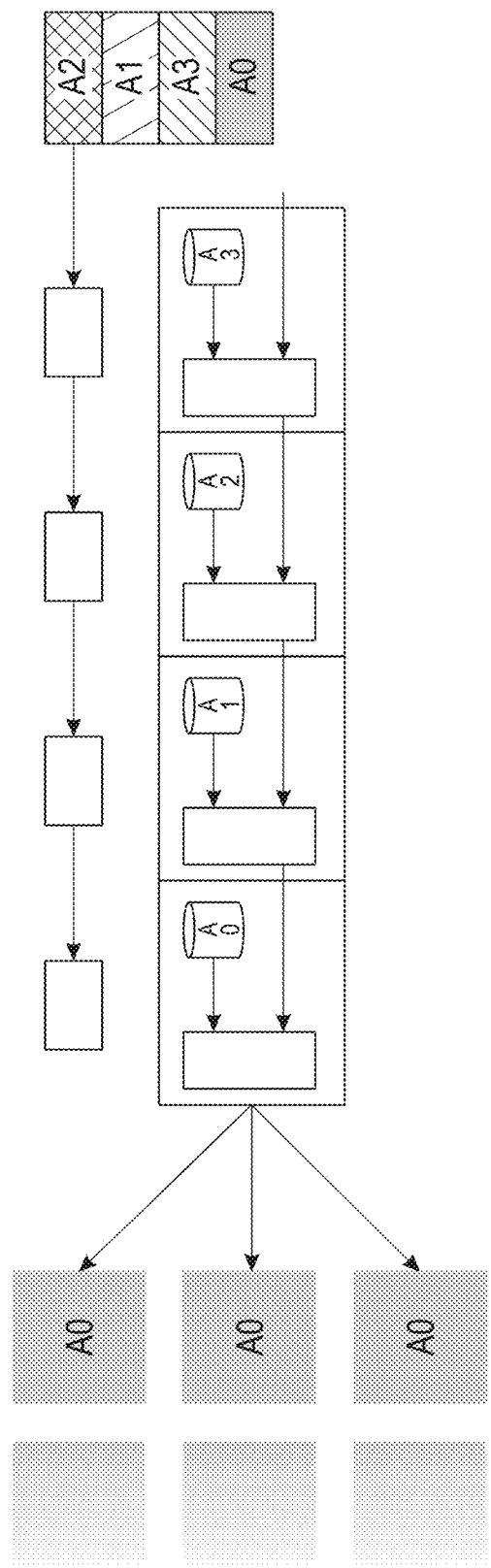

Referring to FIGS. 13A-I, the distribution of instructions and data is illustrated according to embodiments of the present disclosure. In this example, data is read in a random order, with each image depicting a cycle. In FIG. 13A, instruction A2 is issued, arriving in the instruction buffer. In FIG. 13B, the second instruction is issued, and both A2 and A1 are in instruction buffers, with A2 reaching its destination column. In FIG. 13C, the third instruction A3 is issued, instruction A1 advances, instruction A2 is executed, reading data into the data buffer. A1 and A3 are in the instruction buffers. In FIG. 12D, the fourth instruction A0 is issued, instruction A1 advances, data A2 advances through the data buffers, and instruction A3 is executed, reading data into the data buffer. A0 and A1 are in the instruction buffers. In FIG. 13E, instruction A0 advances, A1 executes, reading data from memory, and data A2 and A3 advance through the data buffers. In FIG. 13F, the data advances through the data buffers, with data A2 arriving at the core grid. In FIG. 13G, the data advances through the data buffers, with data A1 arriving at the core grid. In FIG. 13H, the data advances through the data buffers, with data A3 arriving at the core grid. Instruction A0 is executed, reading data into memory. In FIG. 13I, the data advances through the data buffers, with data A0 arriving at the core grid. Although data corresponding to the instructions are located at random memory elements, there were no network collisions because the sum of the number of cycles to advance the instructions and the number of cycles to advance data is constant. Additionally, the data is delivered to the core grid in the order of instructions, that is, A2, A1, A3 and A0.

Figure 14A:
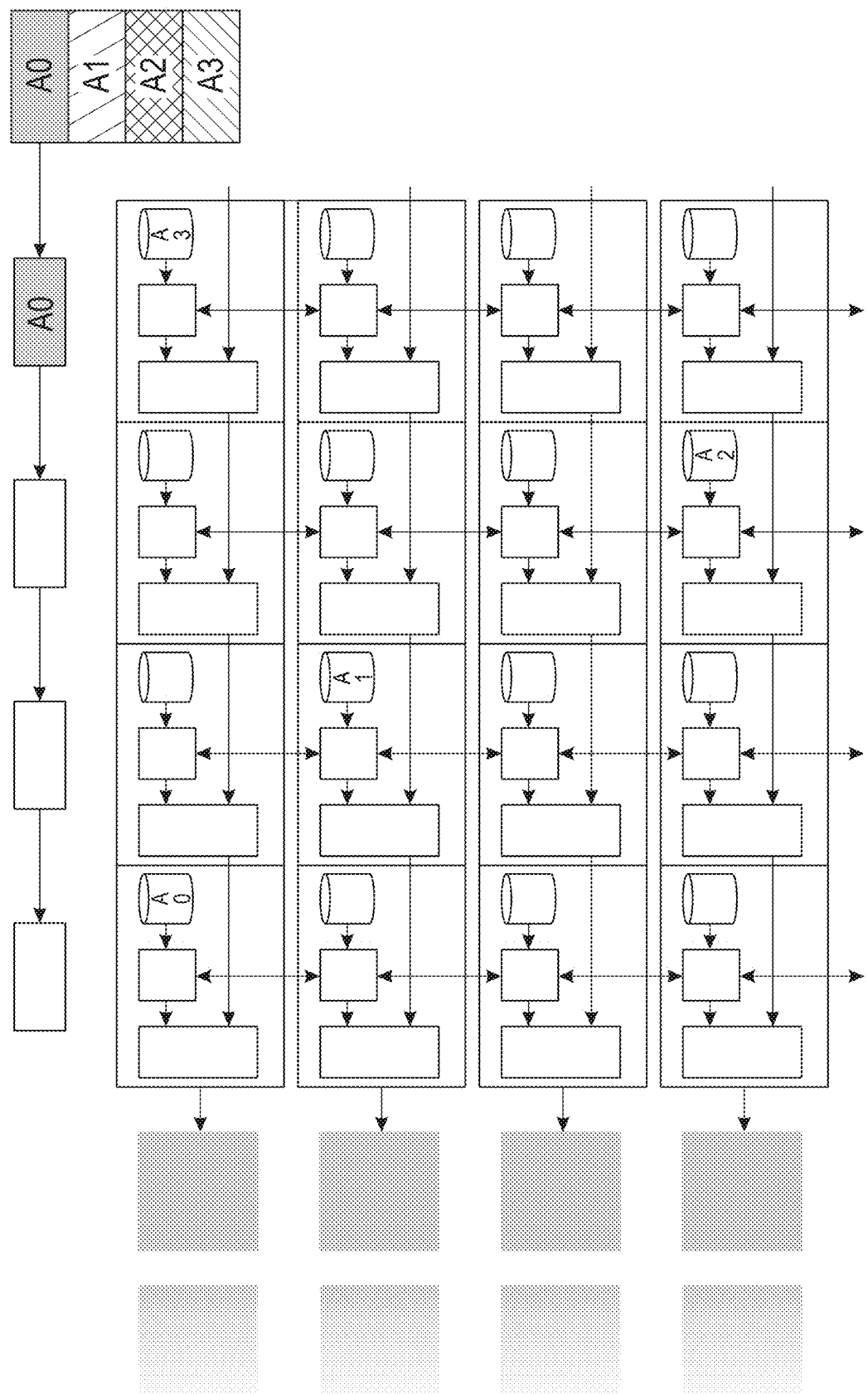
FIGS. 14A-M illustrate the distribution of instructions and sequential data with a two-dimensional weight memory array according to embodiments of the present disclosure.
Figure 14B:
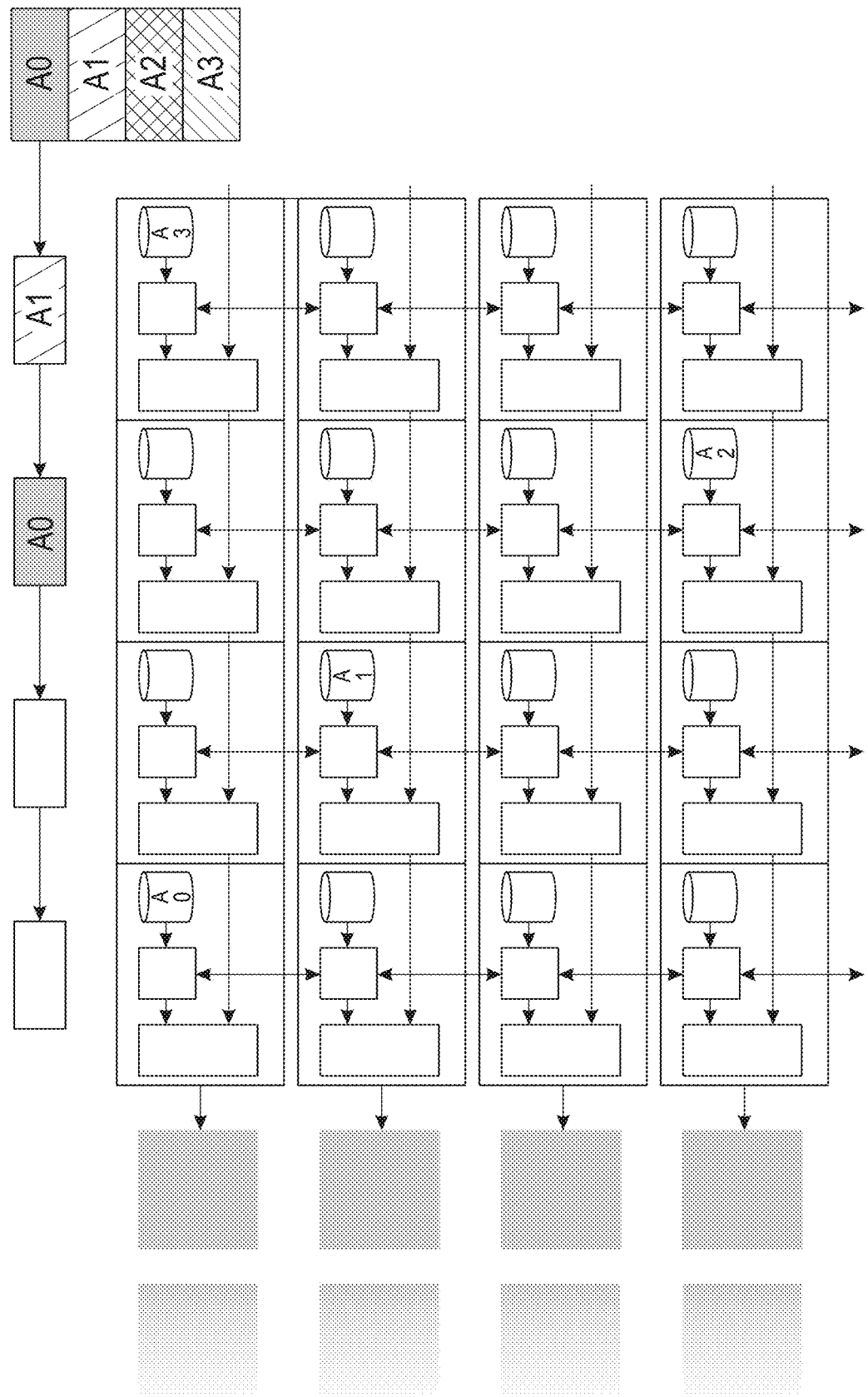
Figure 14C:
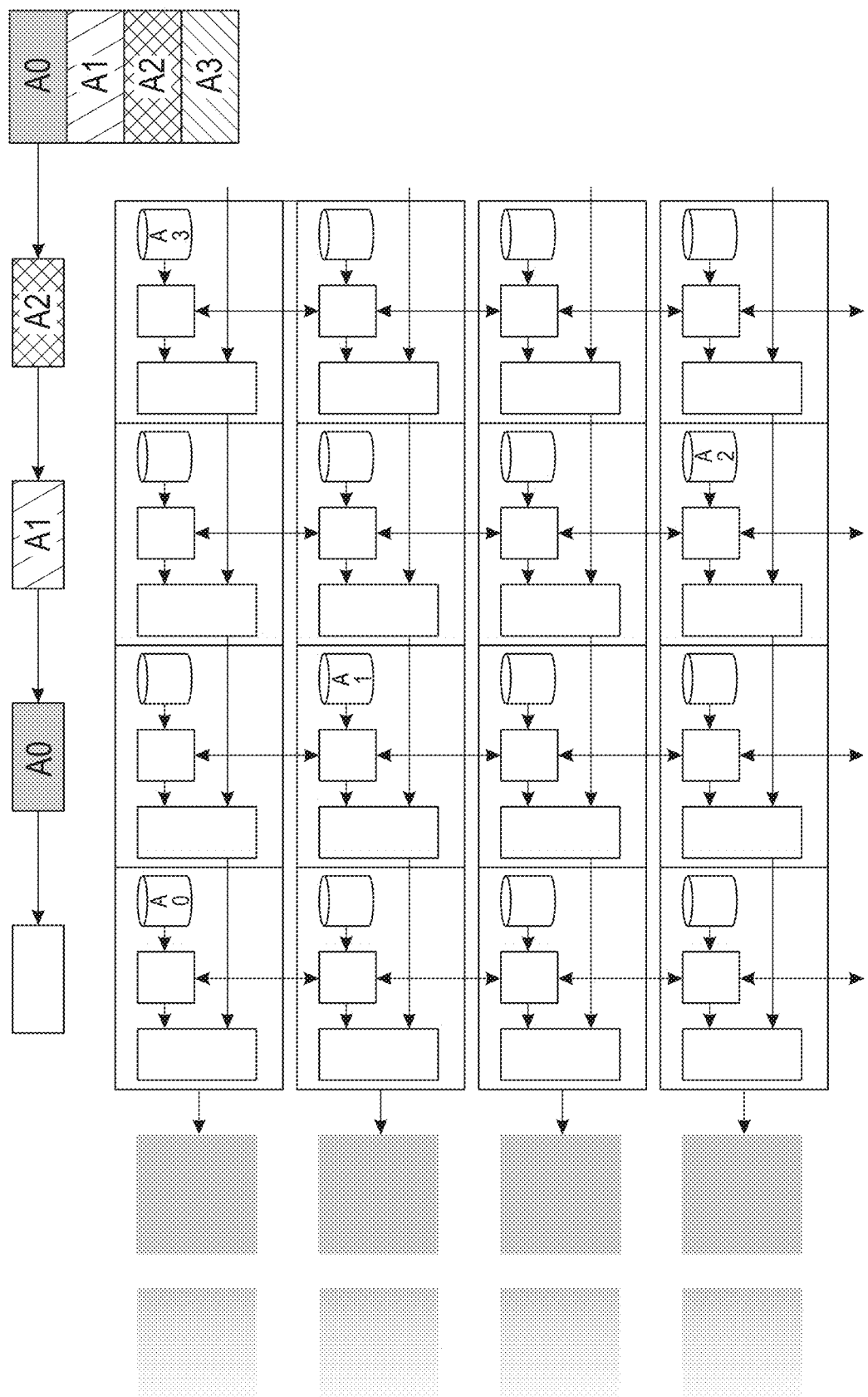
Figure 14D:
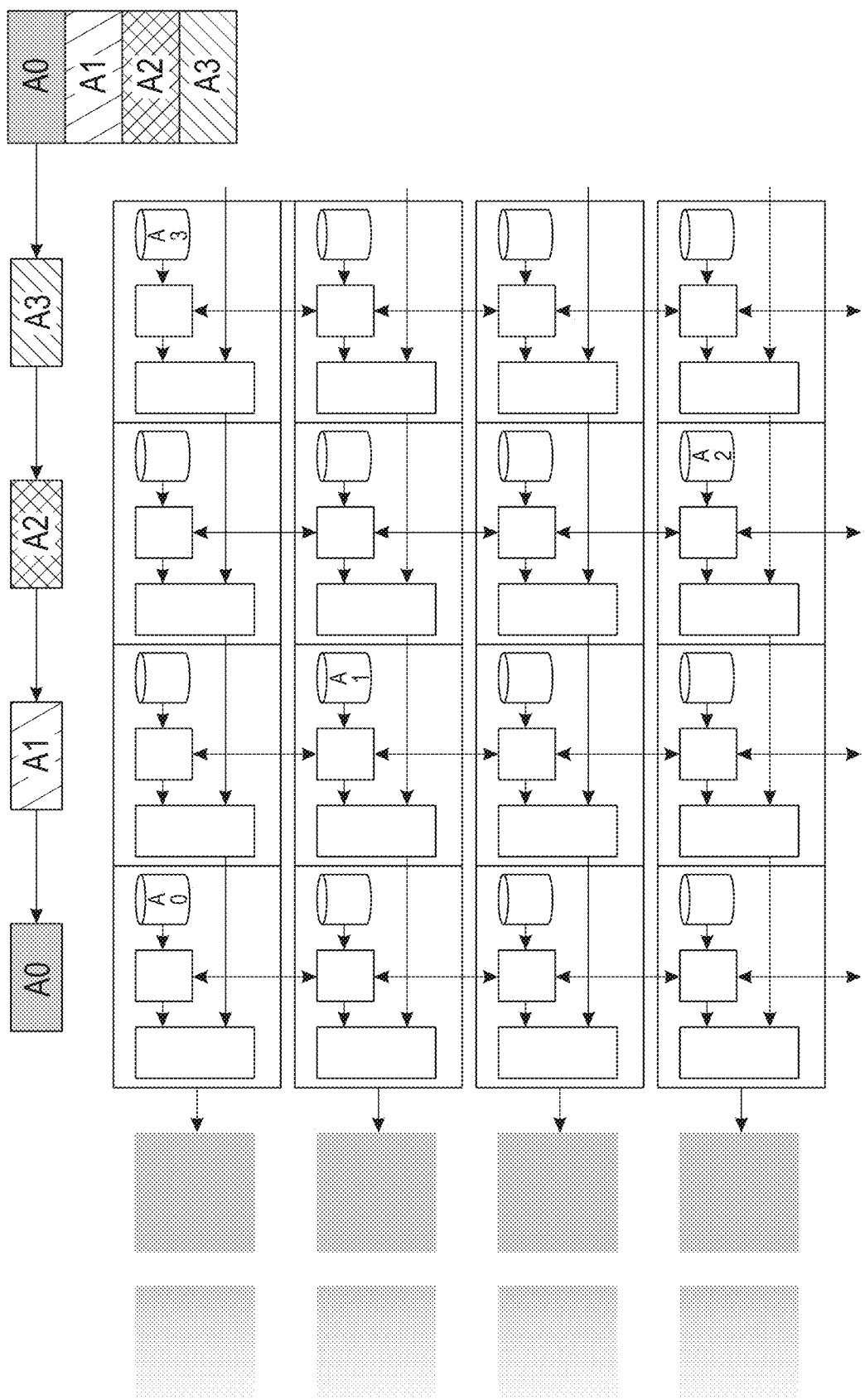
Figure 14E:
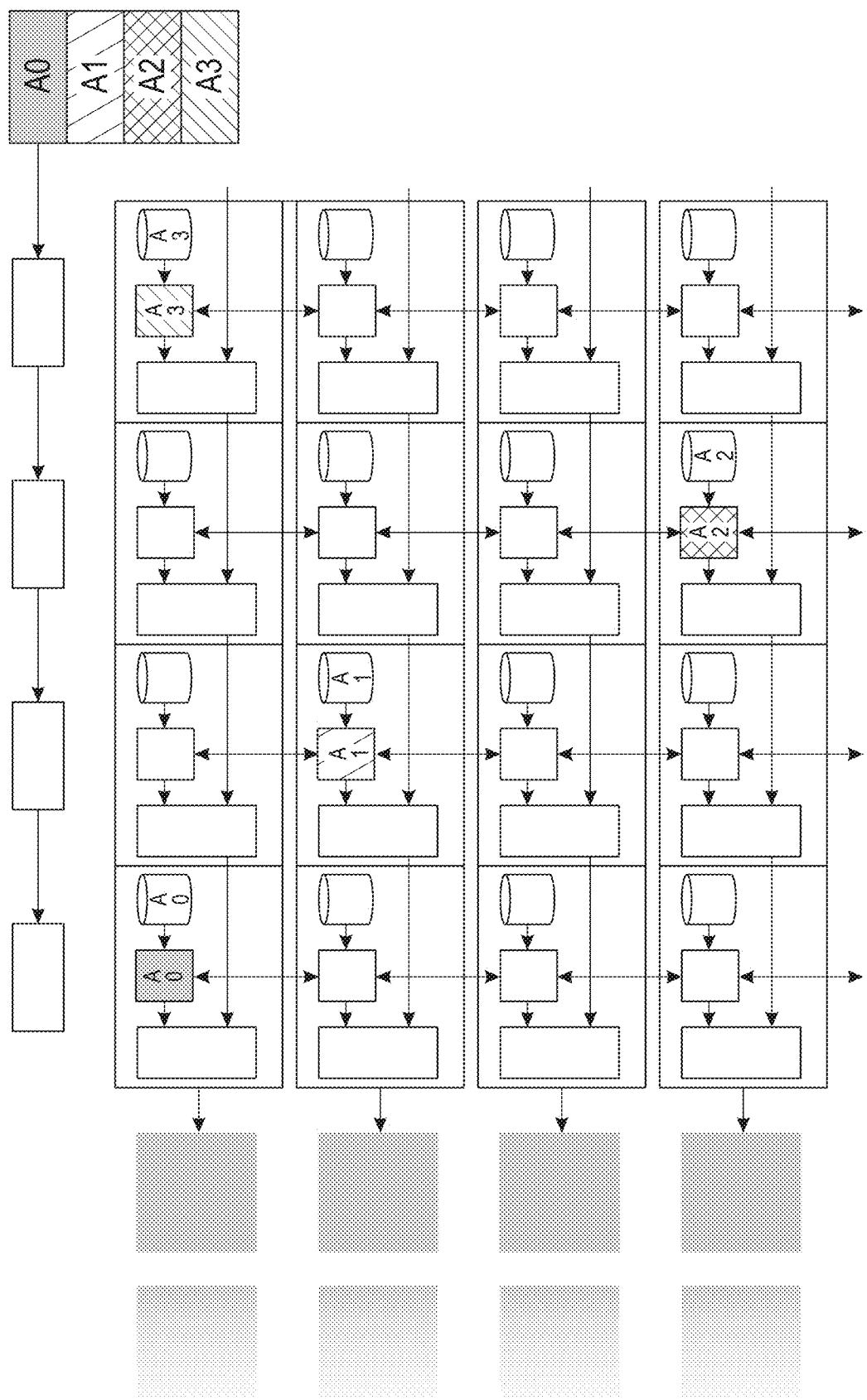
Figure 14F:
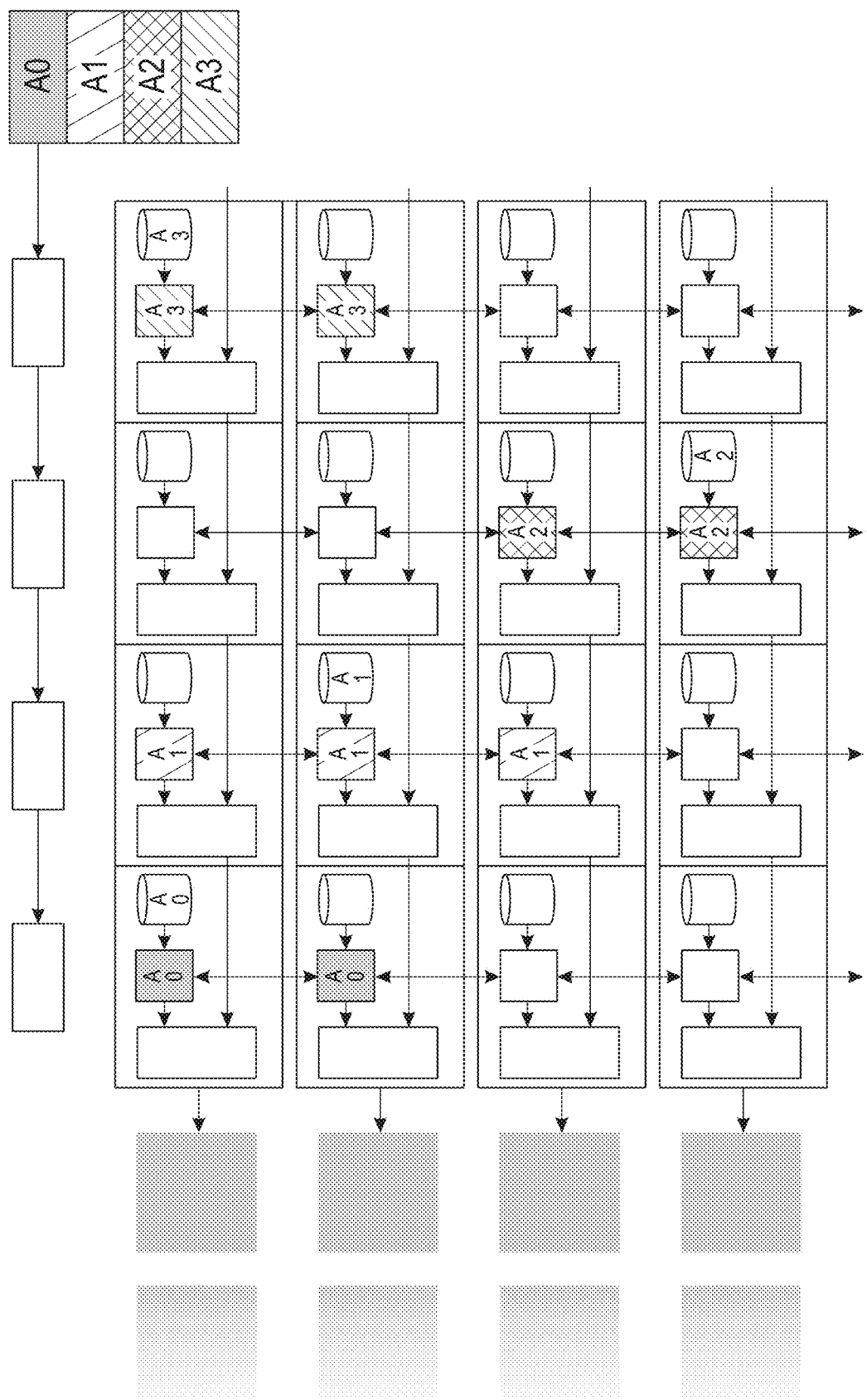
Figure 14G:
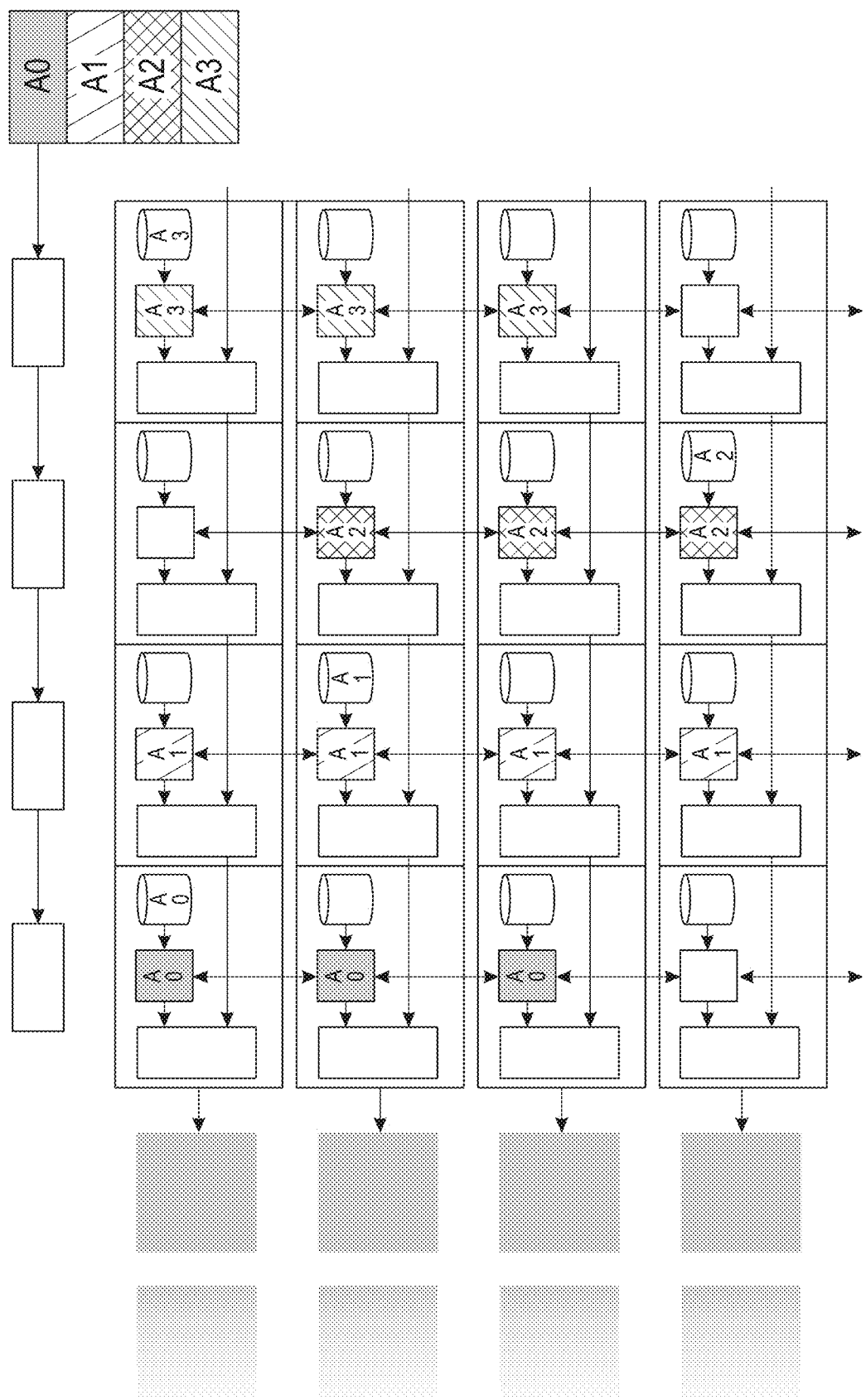
Figure 14H:
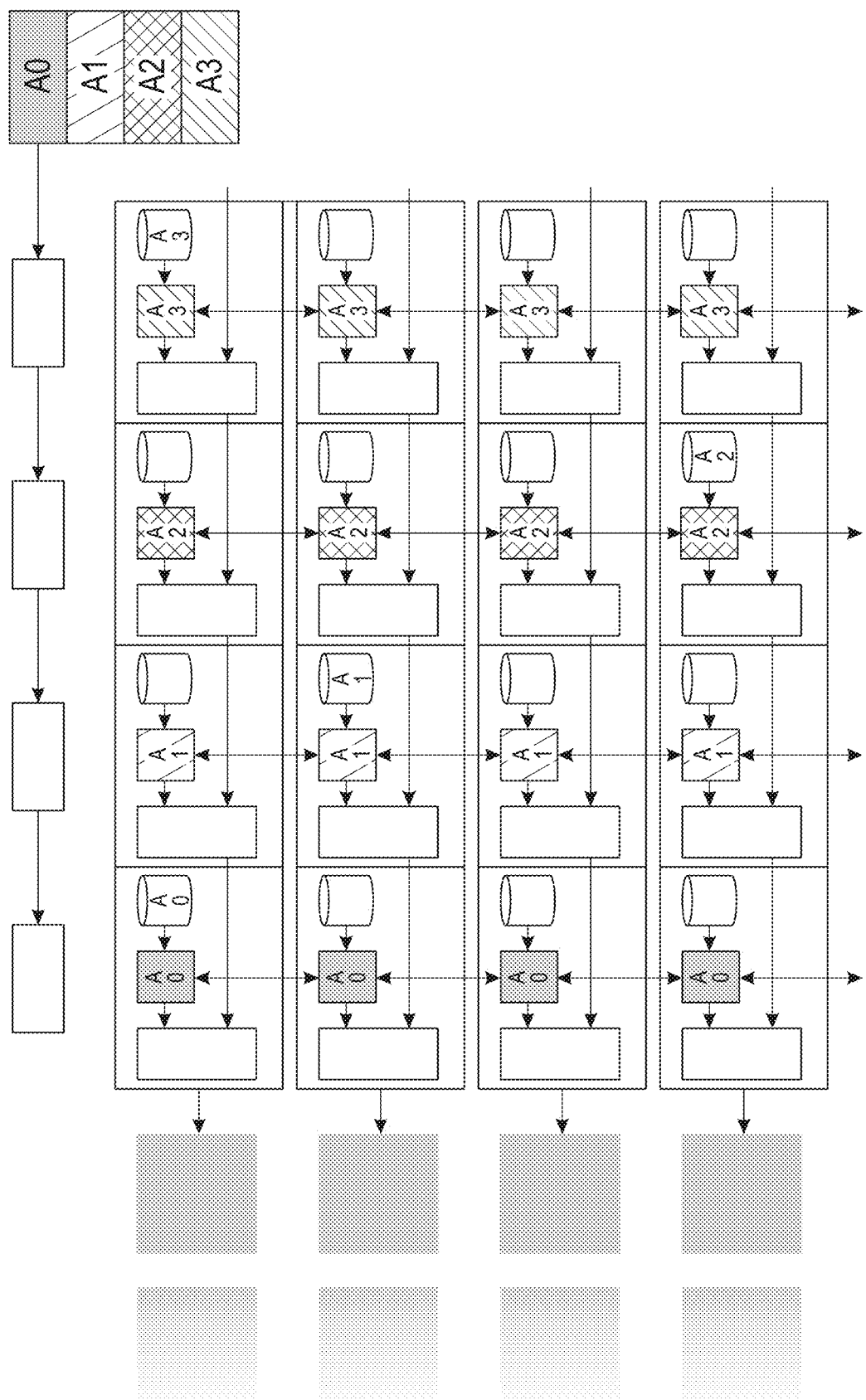
Figure 14I:
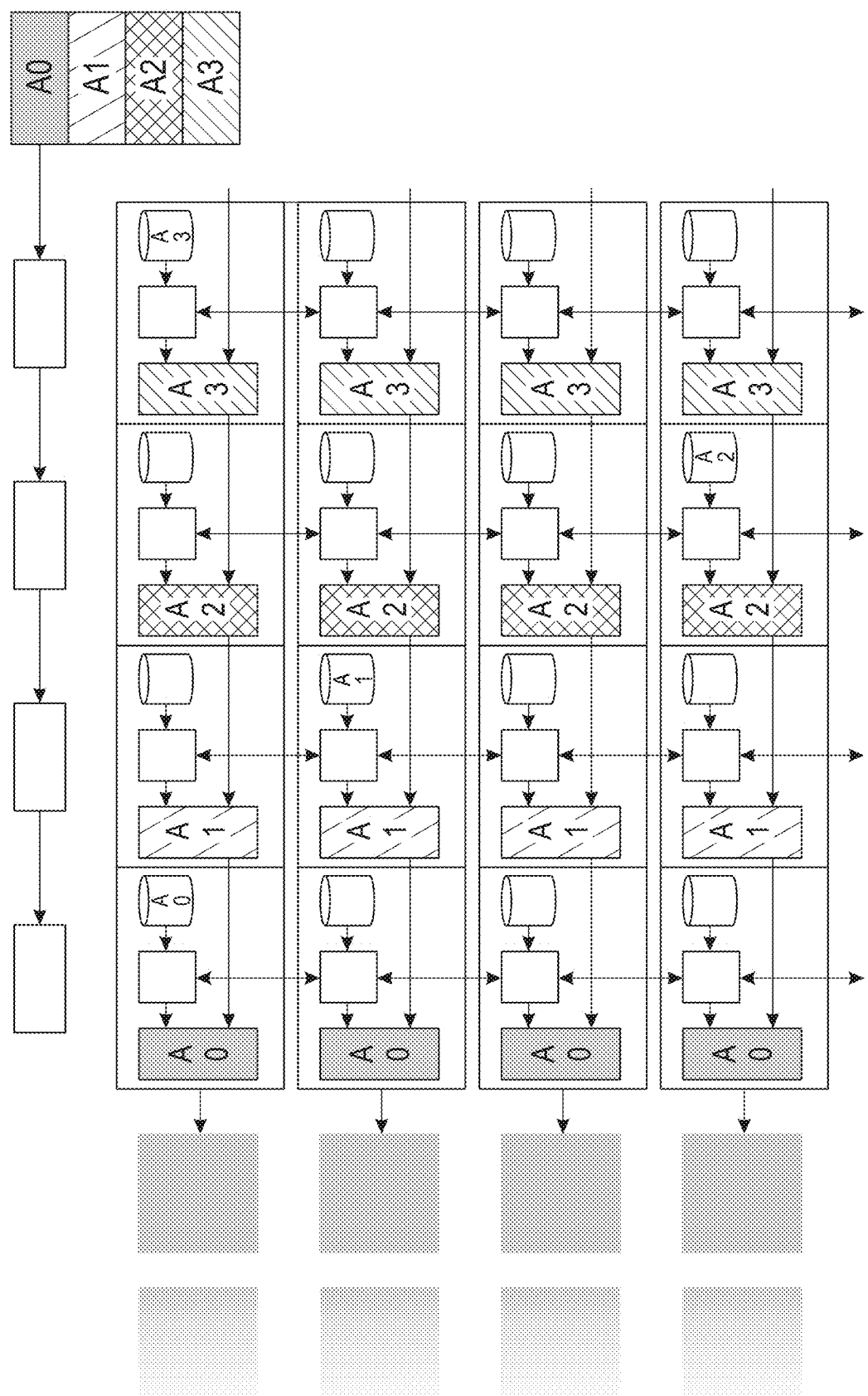
Figure 14J:
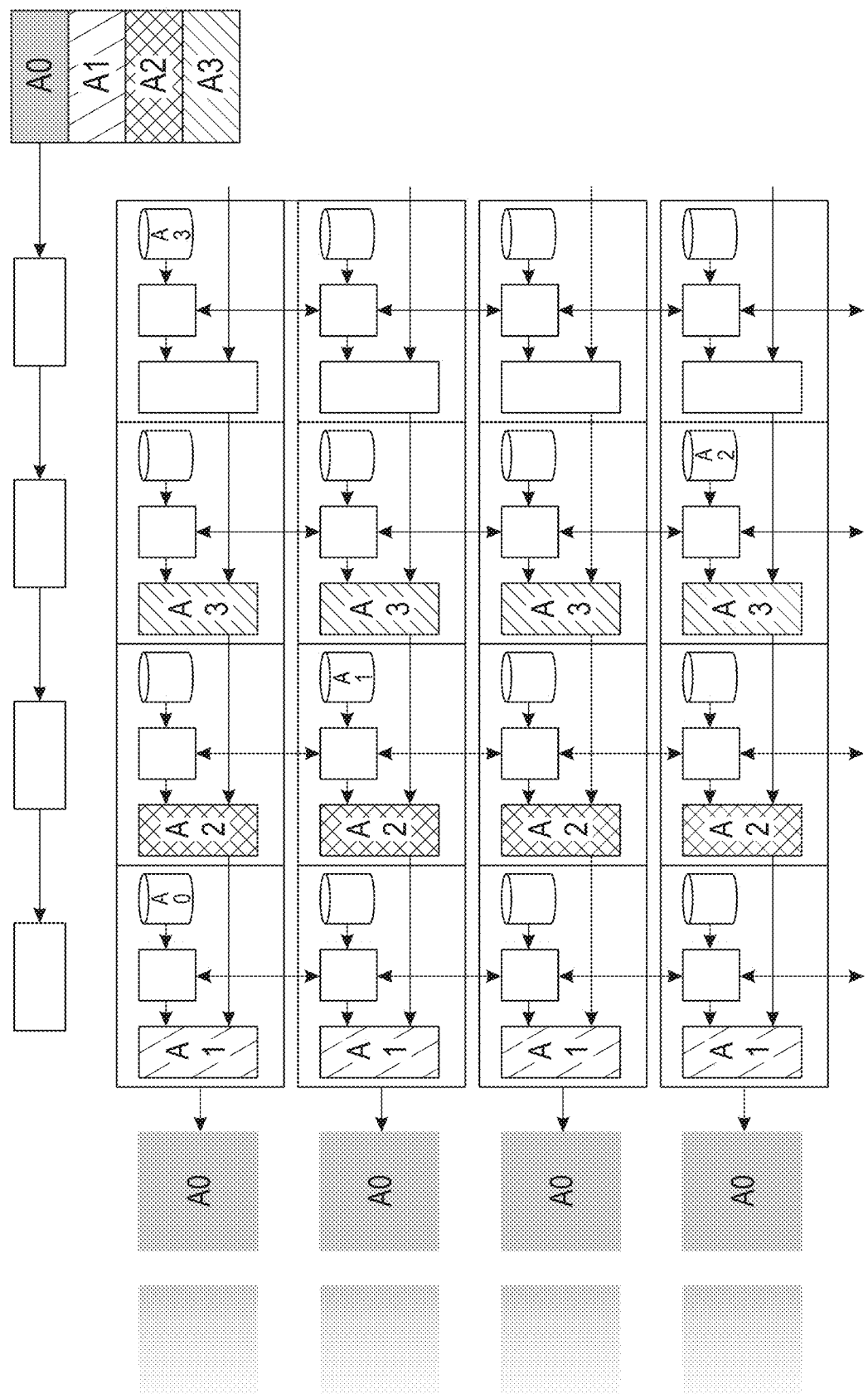
Figure 14K:
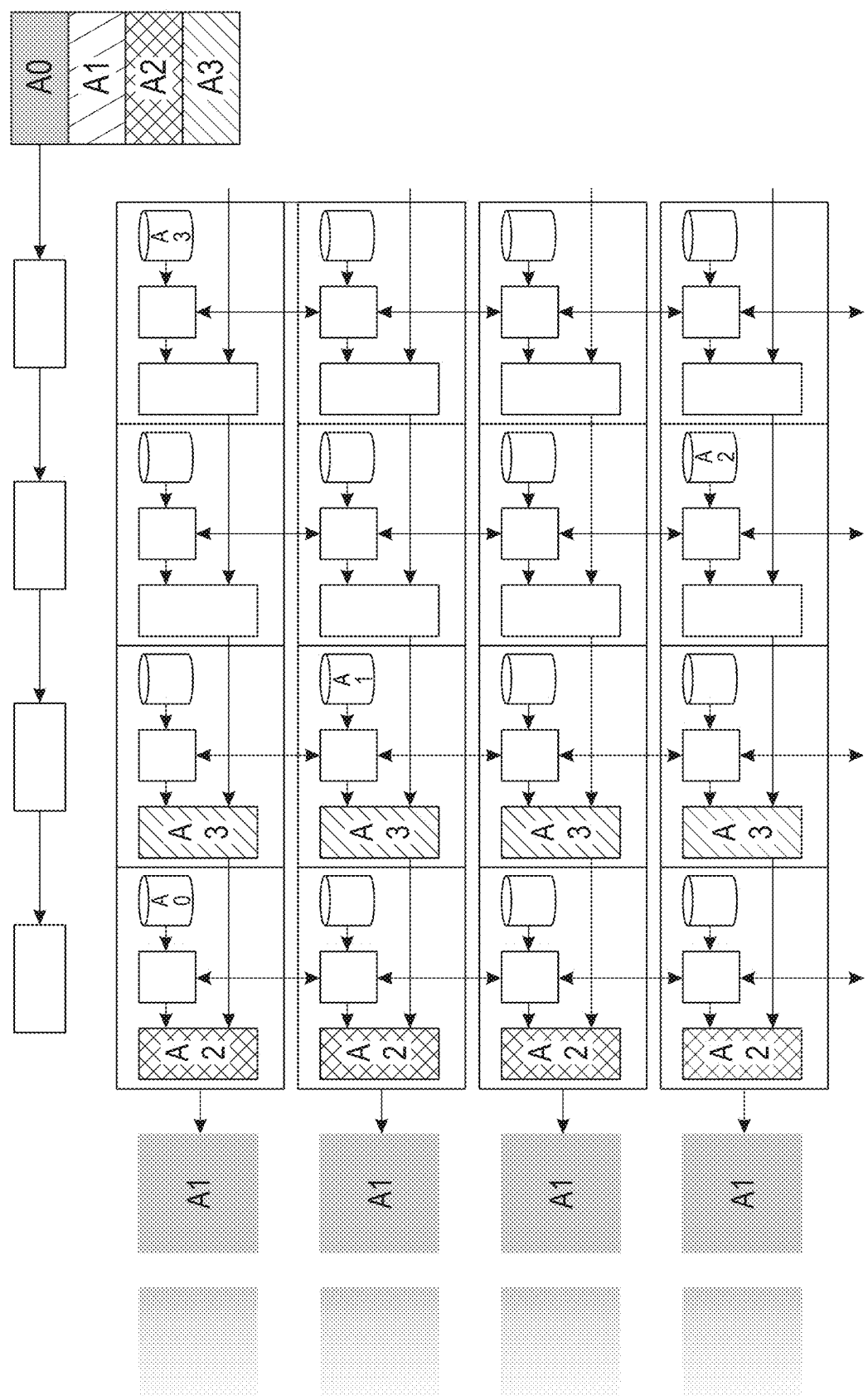
Figure 14L:
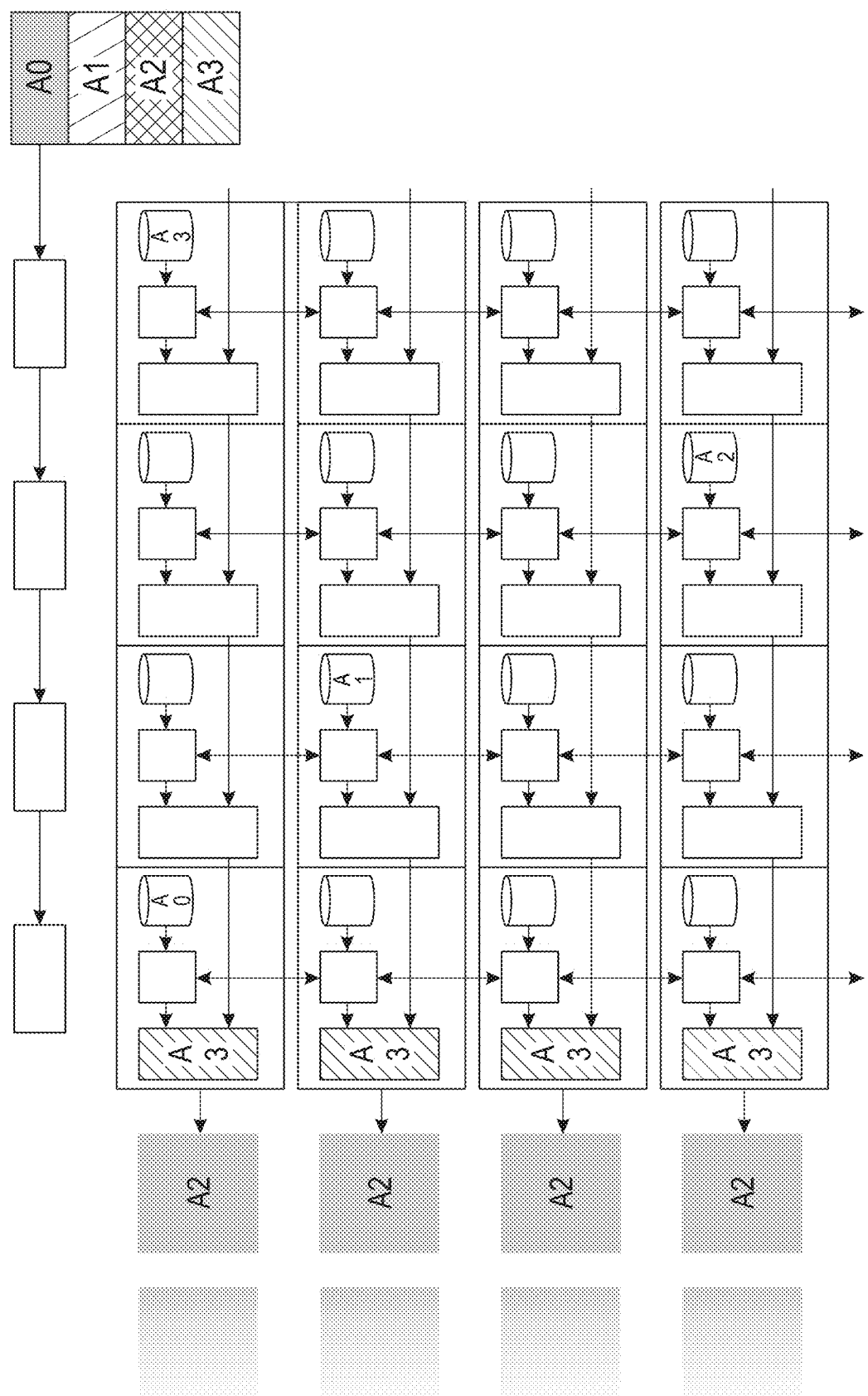
Figure 14M:
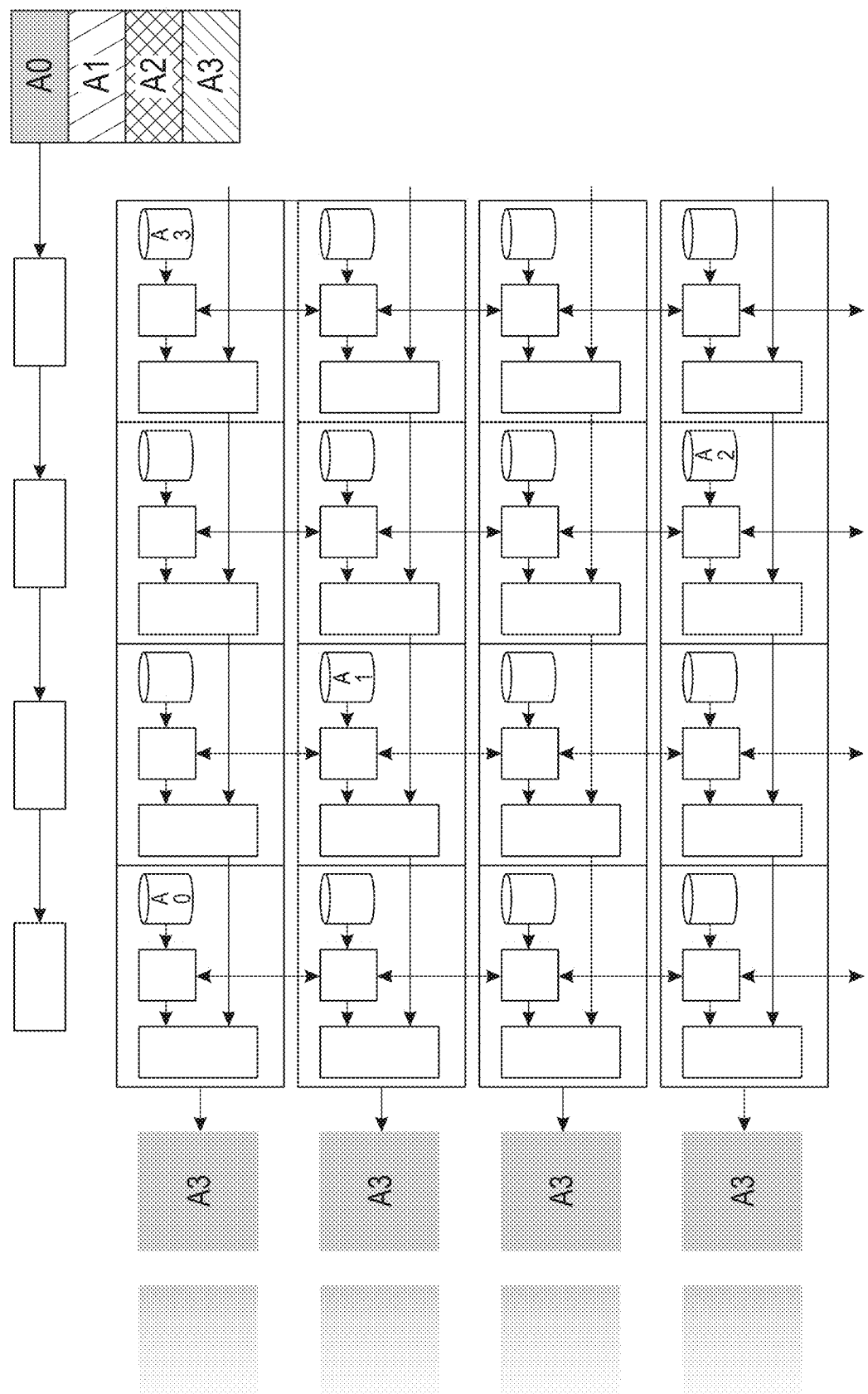

Referring to FIGS. 14A-M, the distribution of instructions and data is illustrated according to embodiments of the present disclosure. In this example, data is read from a two-dimensional weight memory array, with each image depicting a cycle. In FIG. 14A, instruction A0 is issued, arriving in the instruction buffer. In FIG. 14B, the second instruction is issued, and both A0 and A1 are in instruction buffers. In FIG. 14C, the third instruction A2 is issued, instructions A0 and A1 advance. A0, A1, and A2 are in the instruction buffers. In FIG. 14D, the fourth instruction A3 is issued and the prior instructions advance. A0, A1, A2, and A3 are in the instruction buffers. In FIG. 14E, all instructions execute on their corresponding columns, reading data from memory. In FIG. 14F, the vertical buffers start to propagate the data along each column. In FIG. 14G, vertical data propagation continues. The A1 column finished vertical distribution, but waits an additional cycle before starting horizontal propagation in order to equalize delay with the other columns. In FIG. 14H, vertical data propagation completes. In FIG. 14I, the data is copied to the horizontal buffers. In FIGS. 14J-M, the data advances through the horizontal buffers until all data have arrived at the core array.

Figure 15A:
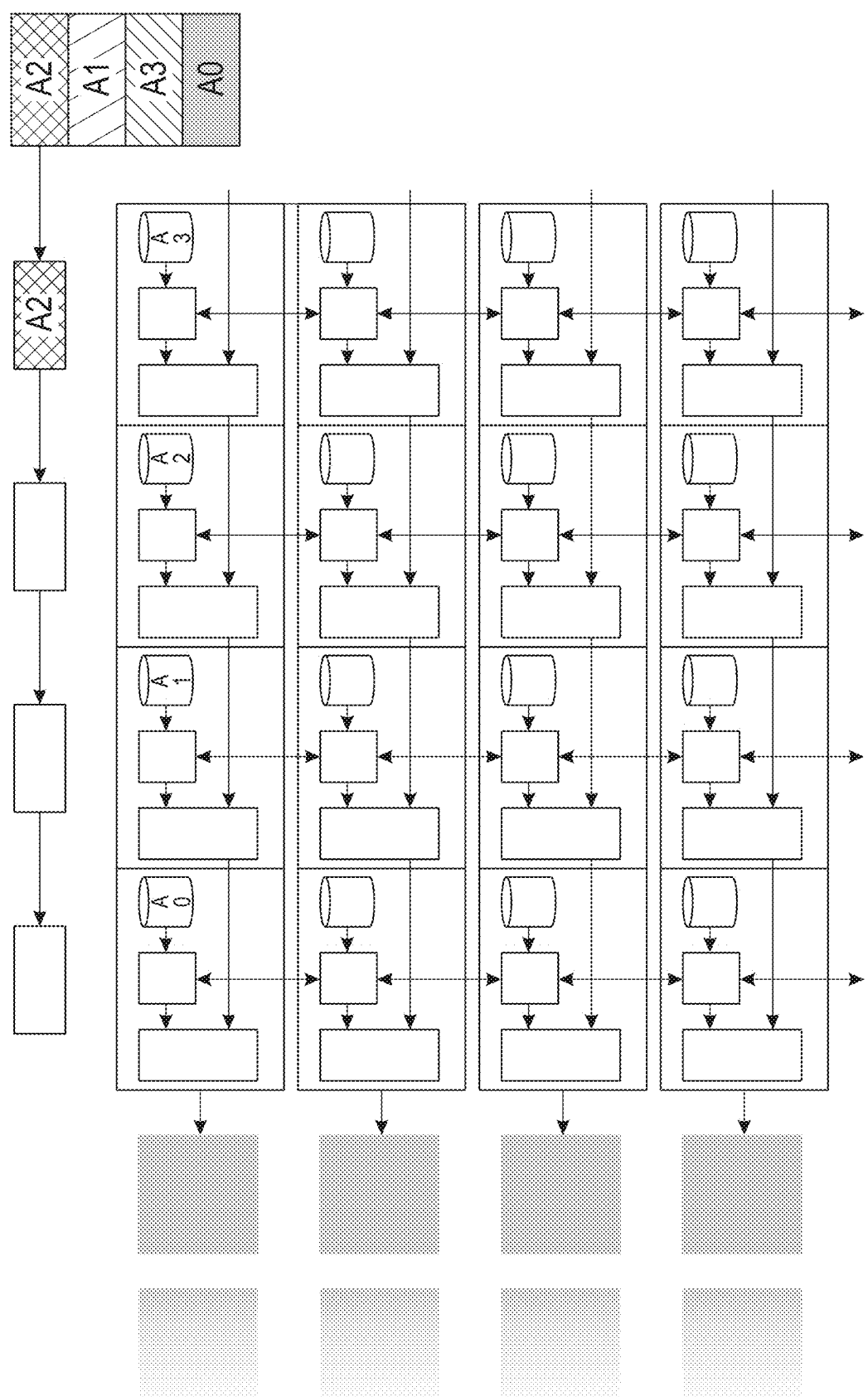
FIGS. 15A-M illustrate the distribution of instructions and randomly-accessed data with a two-dimensional weight memory array according to embodiments of the present disclosure.
Figure 15B:
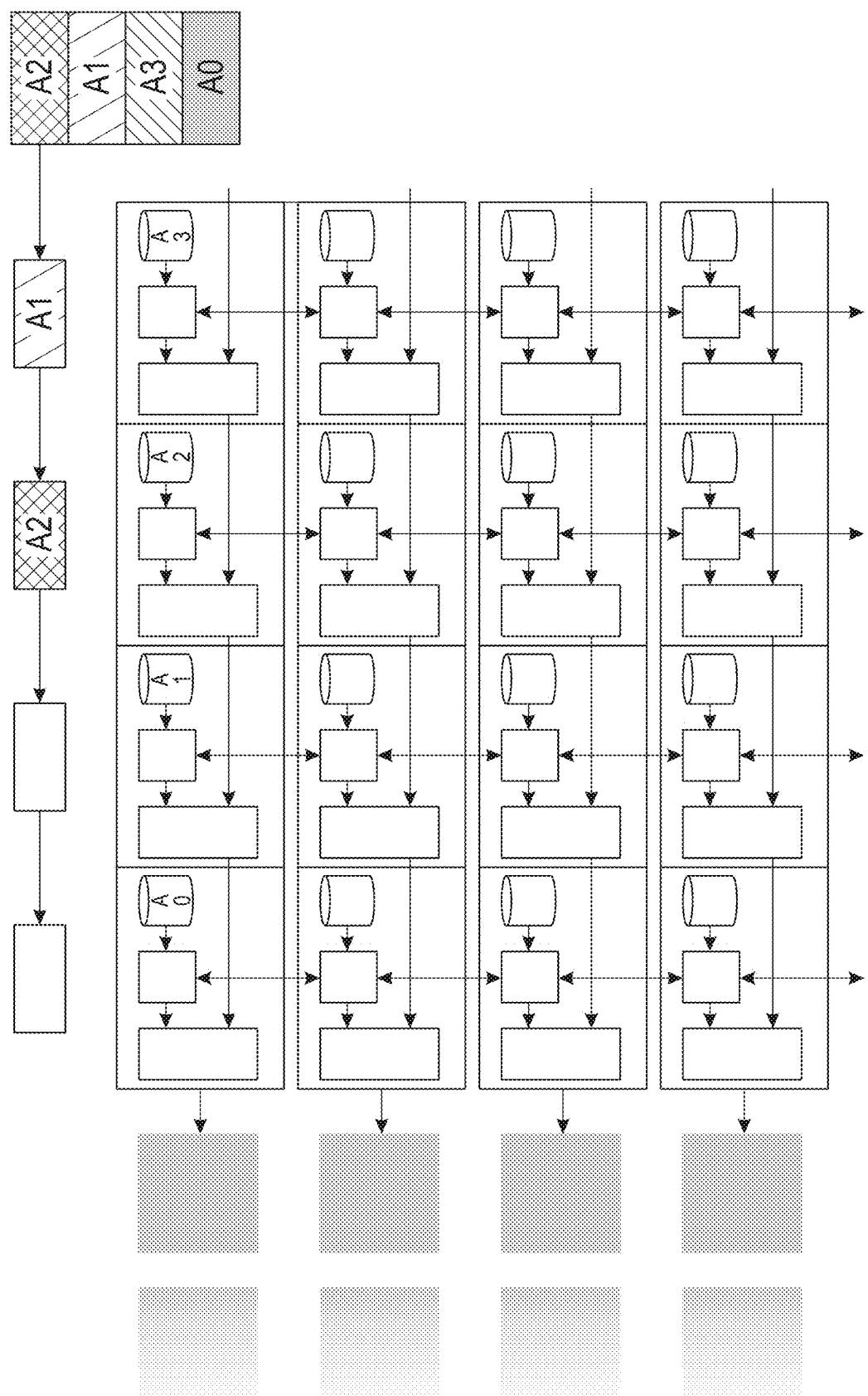
Figure 15C:
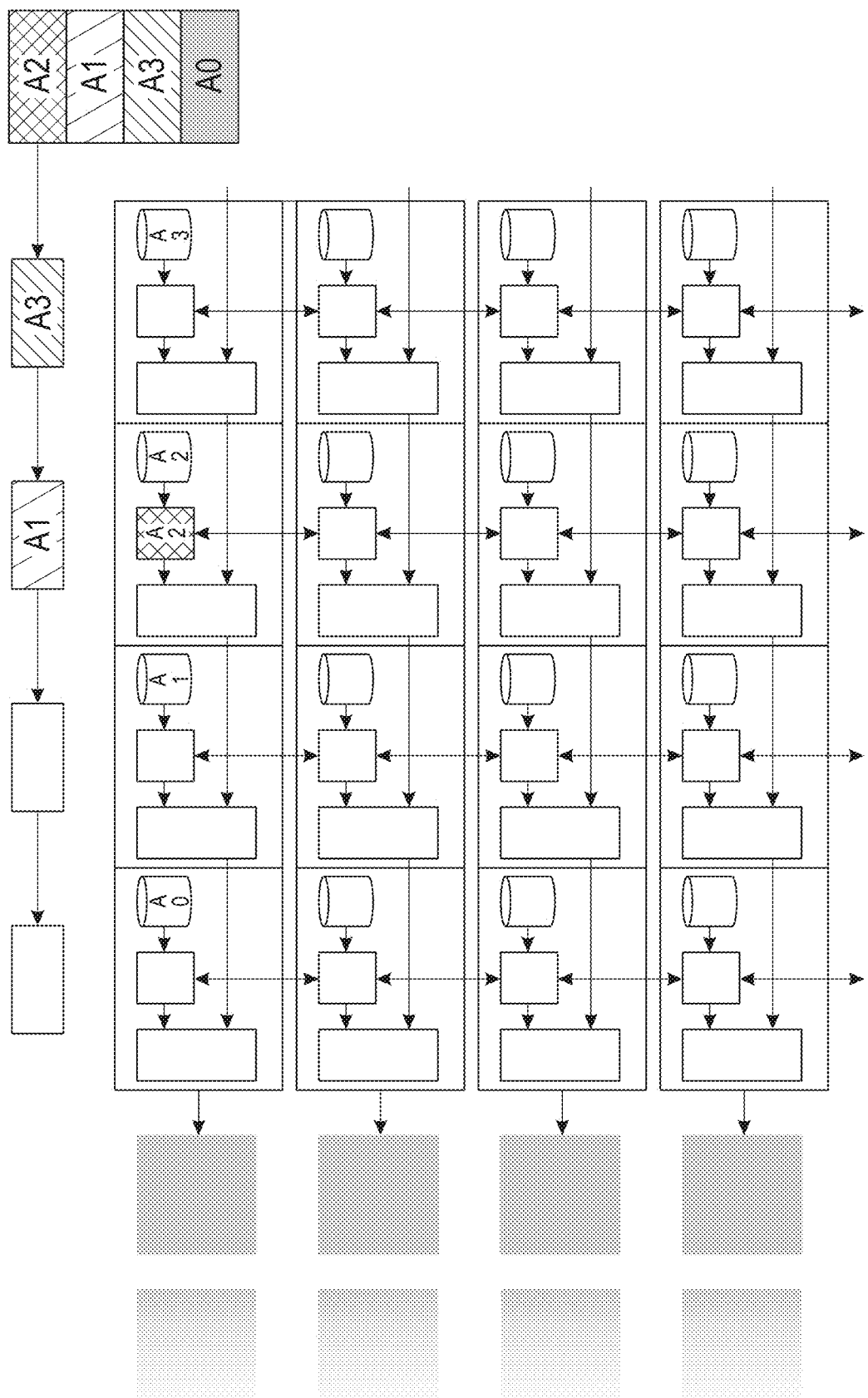
Figure 15D:
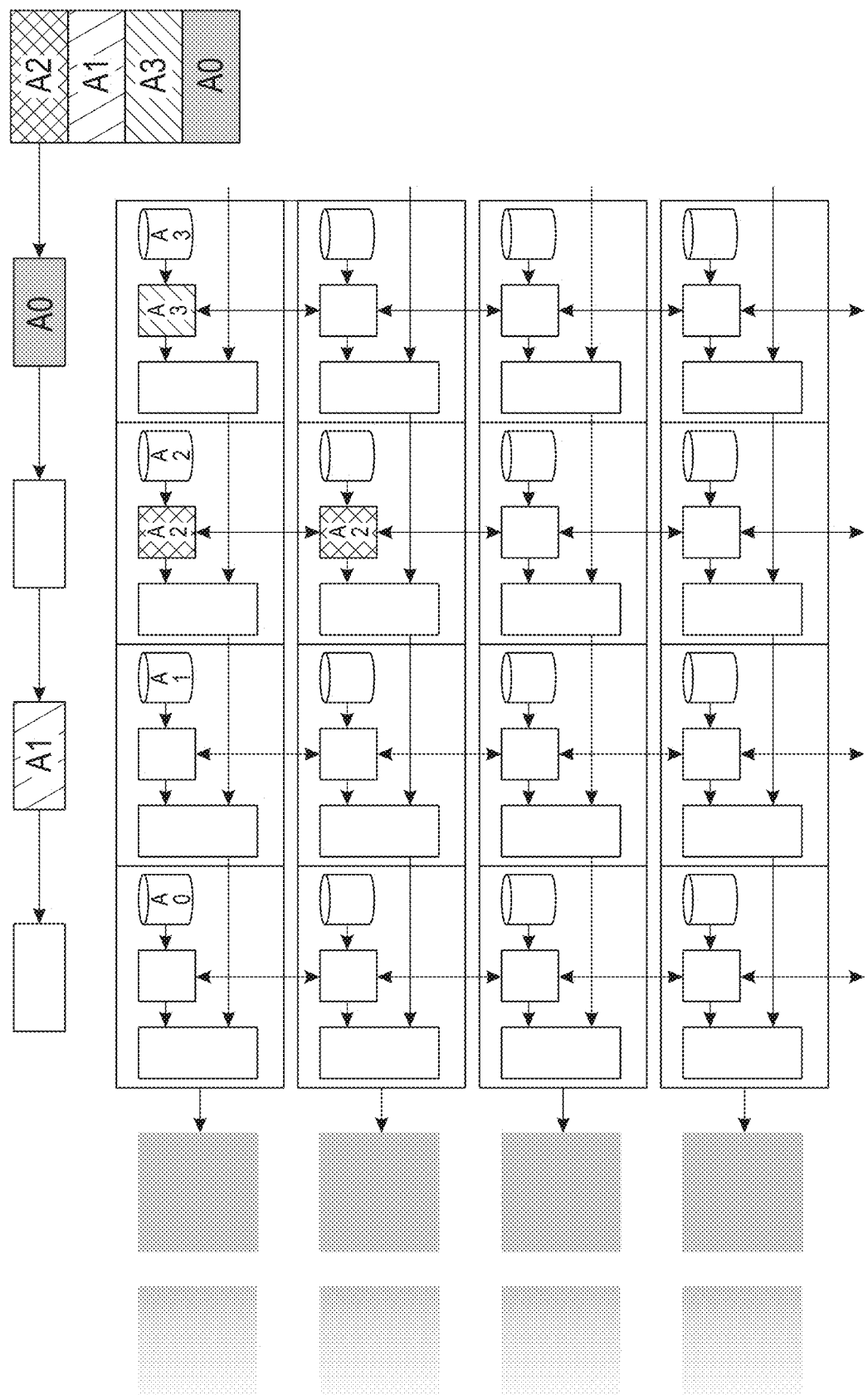
Figure 15E:
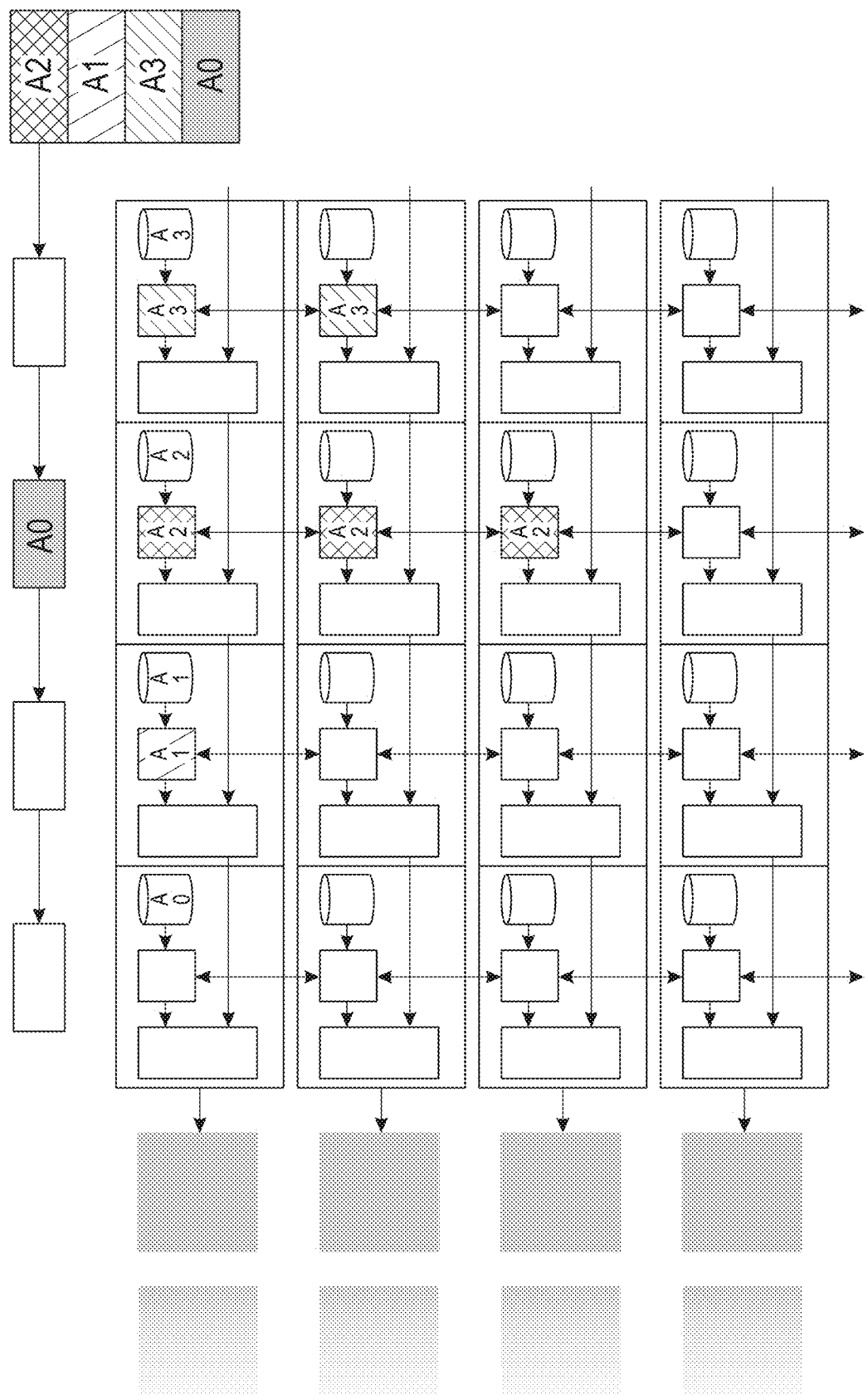
Figure 15F:
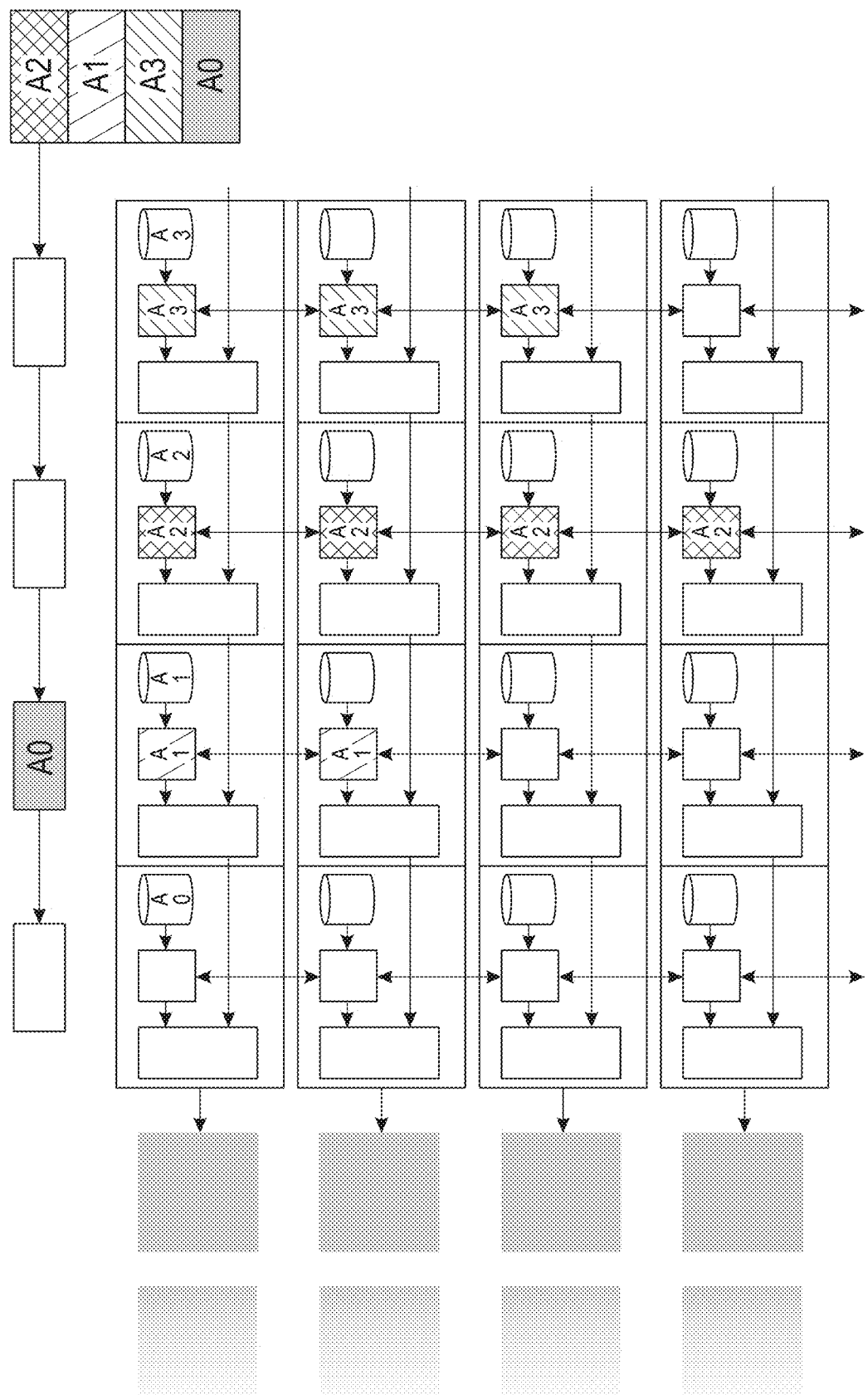
Figure 15G:
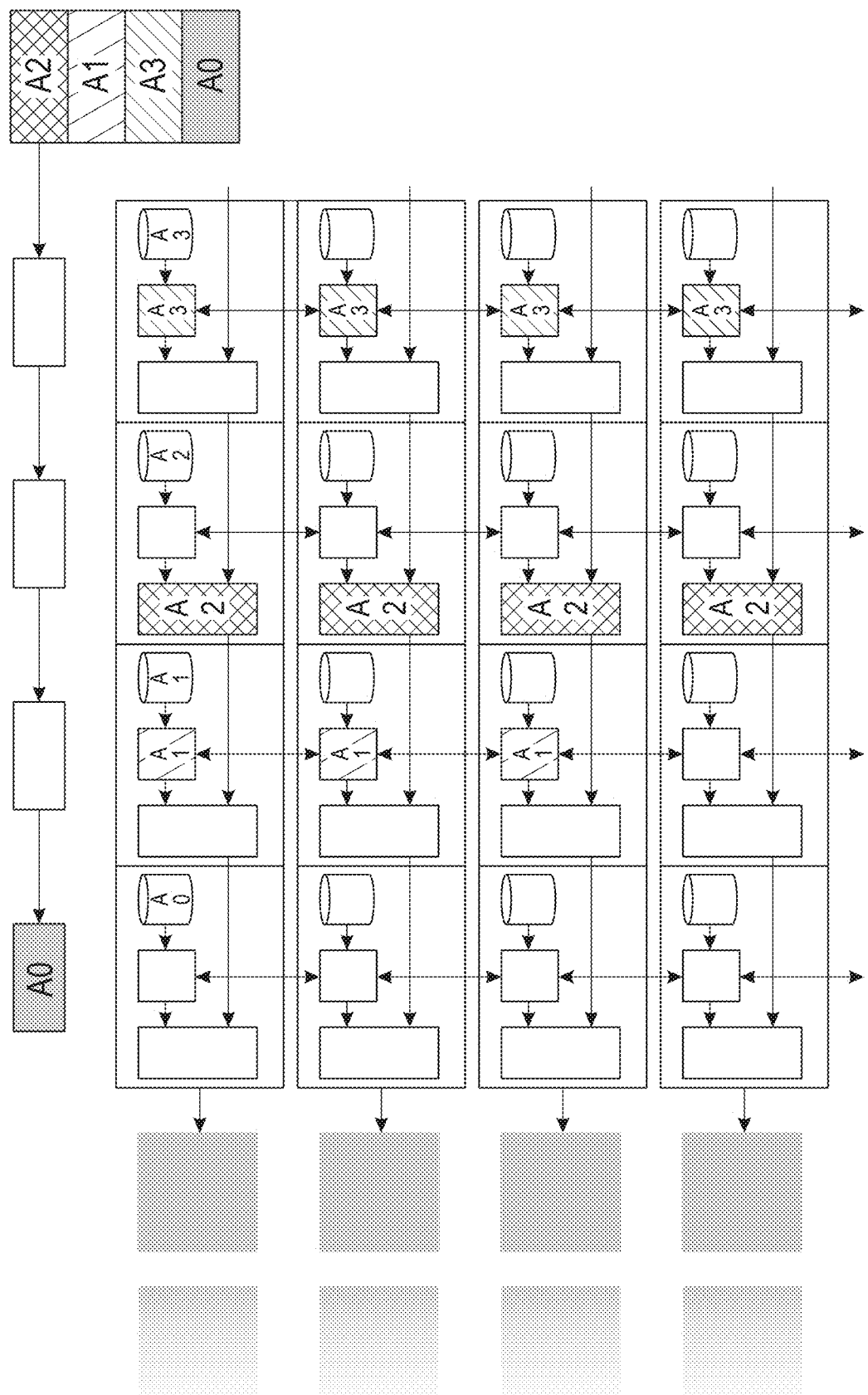
Figure 15H:
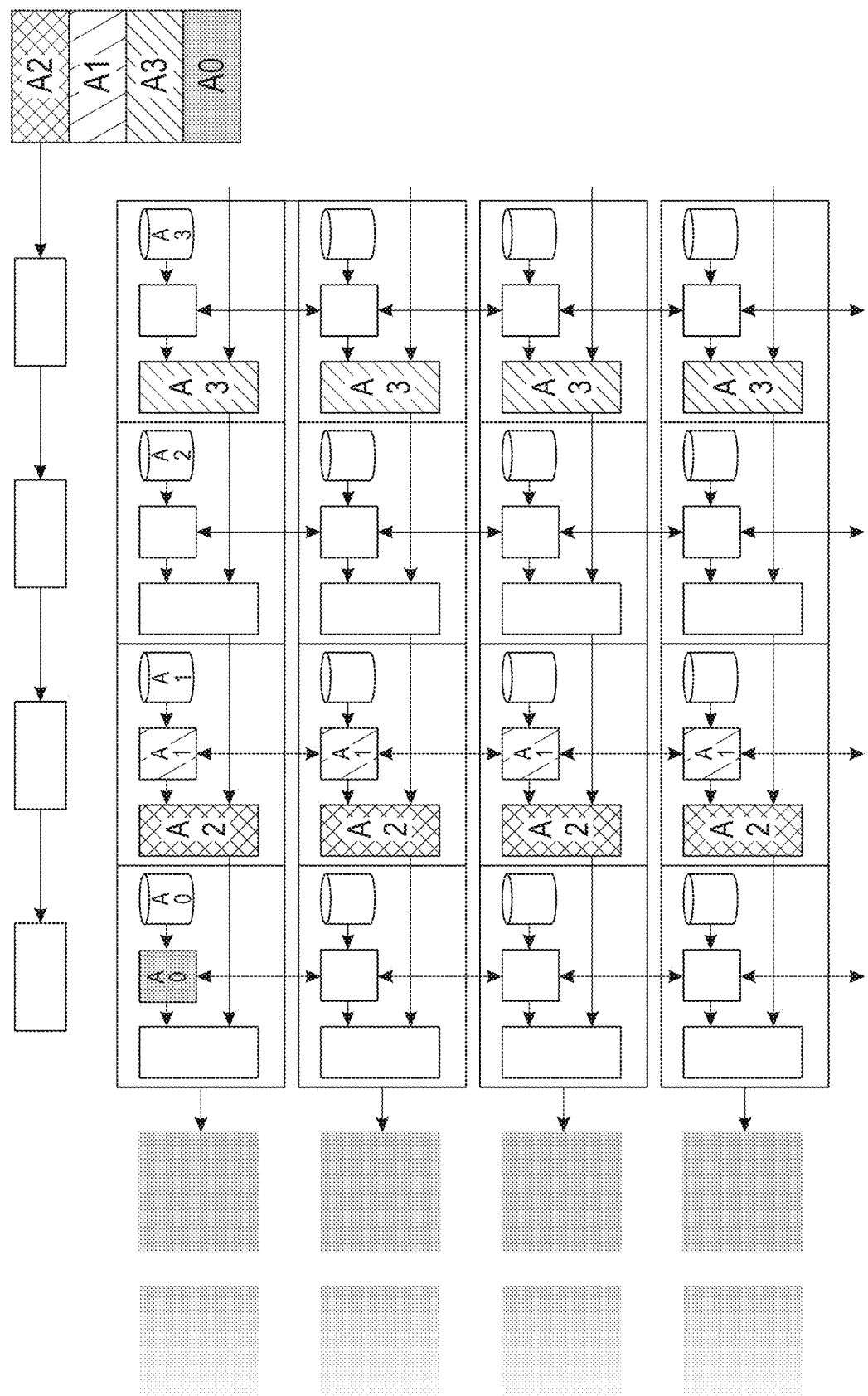
Figure 15I:
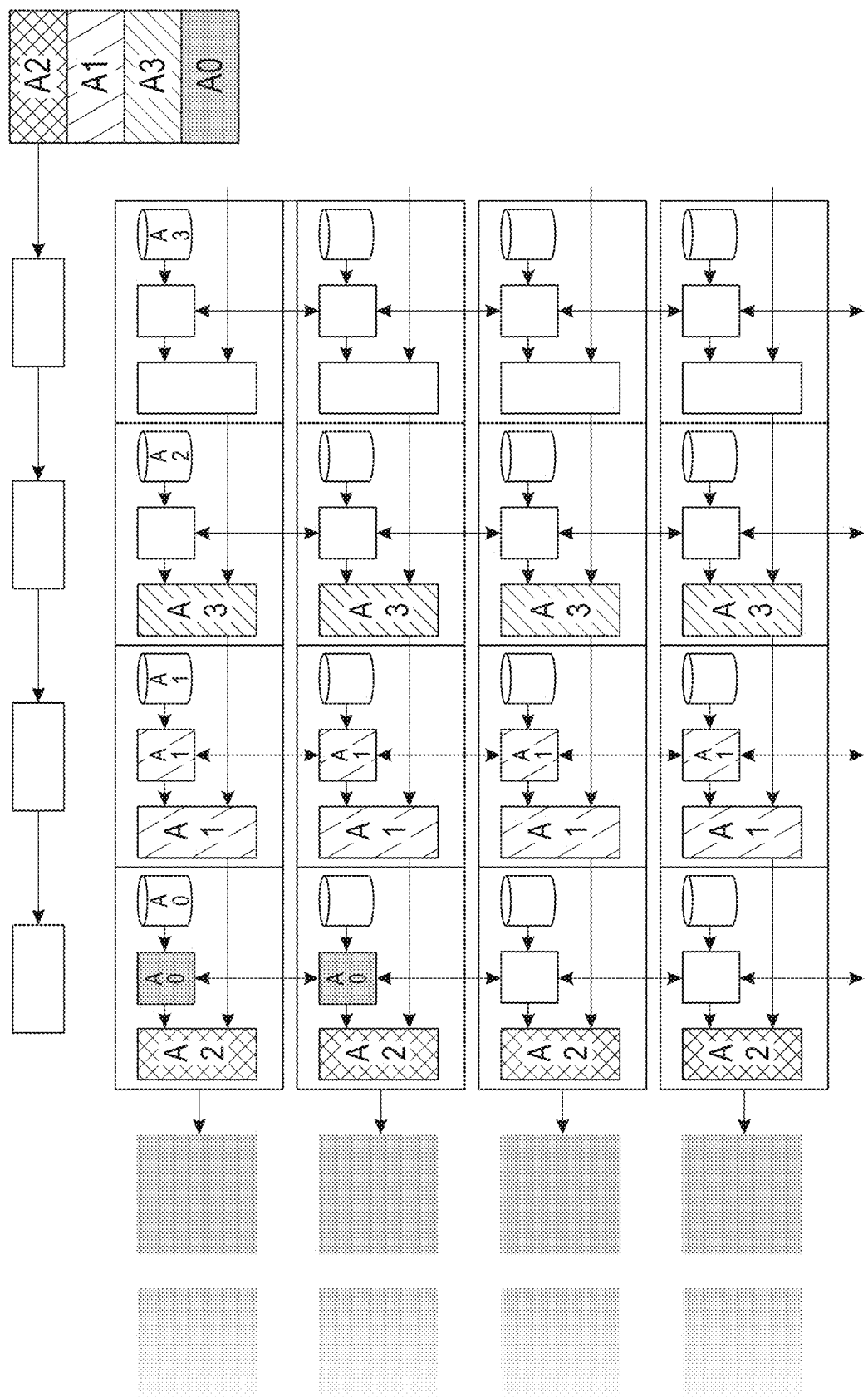
Figure 15J:
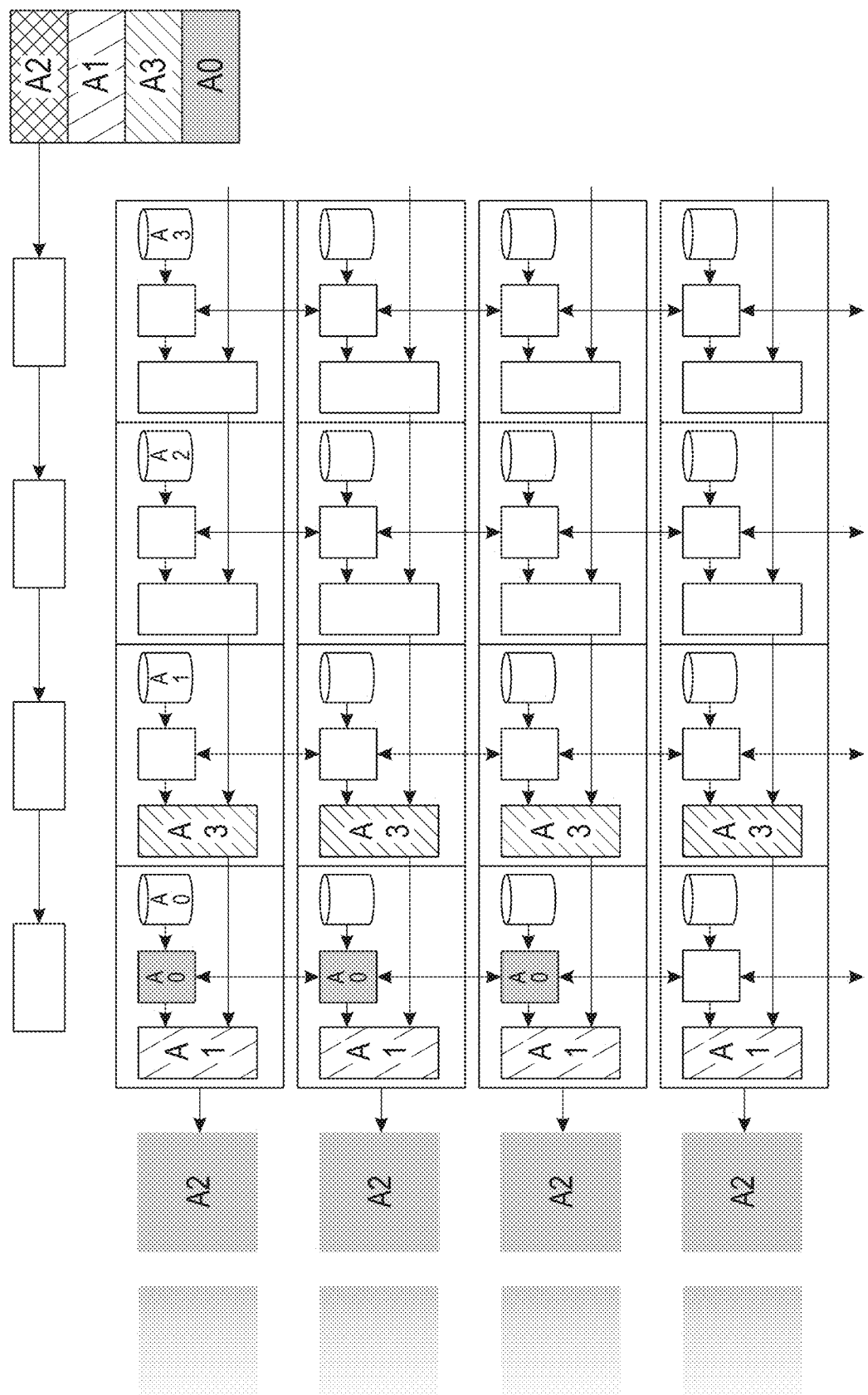
Figure 15K:
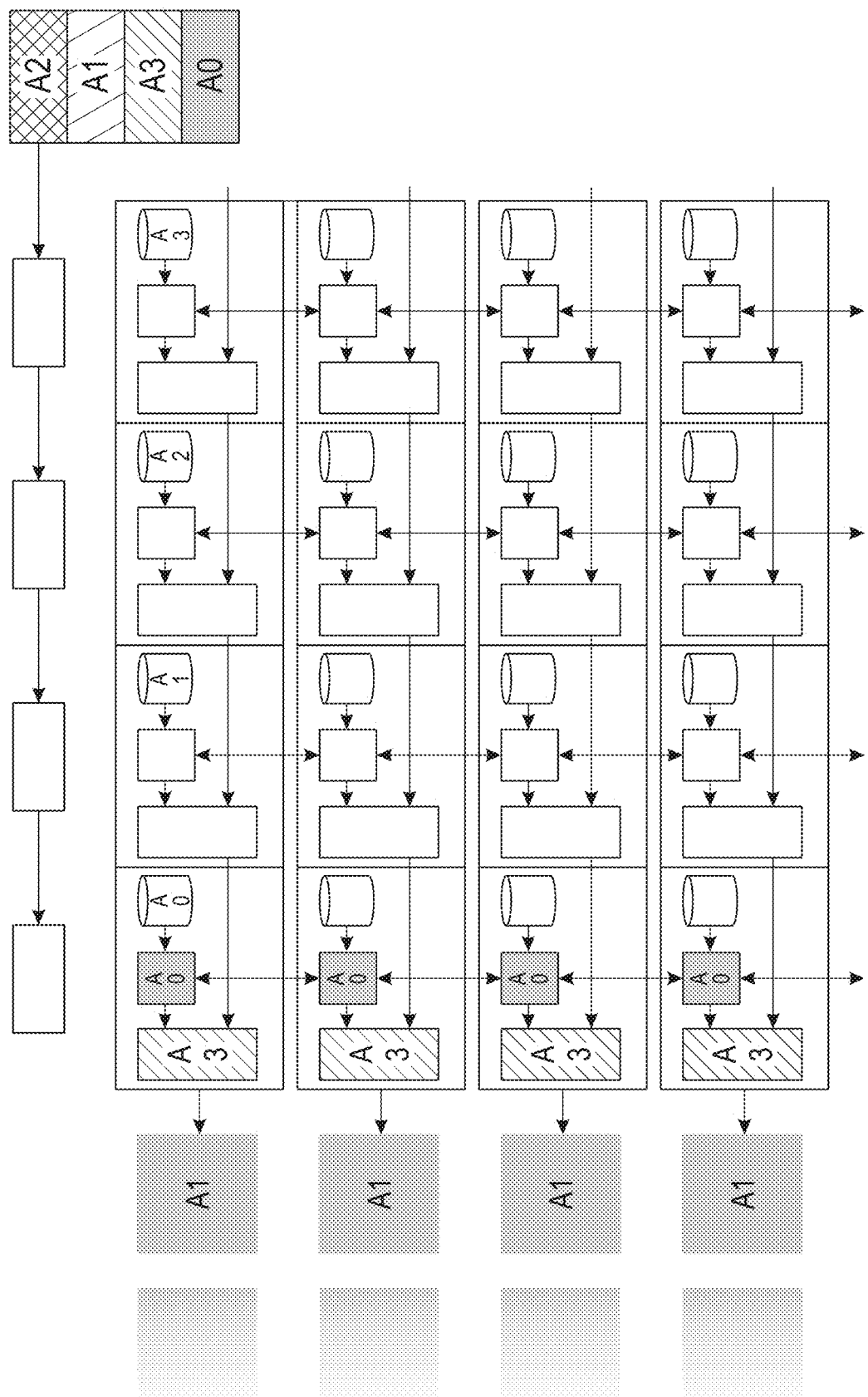
Figure 15L:
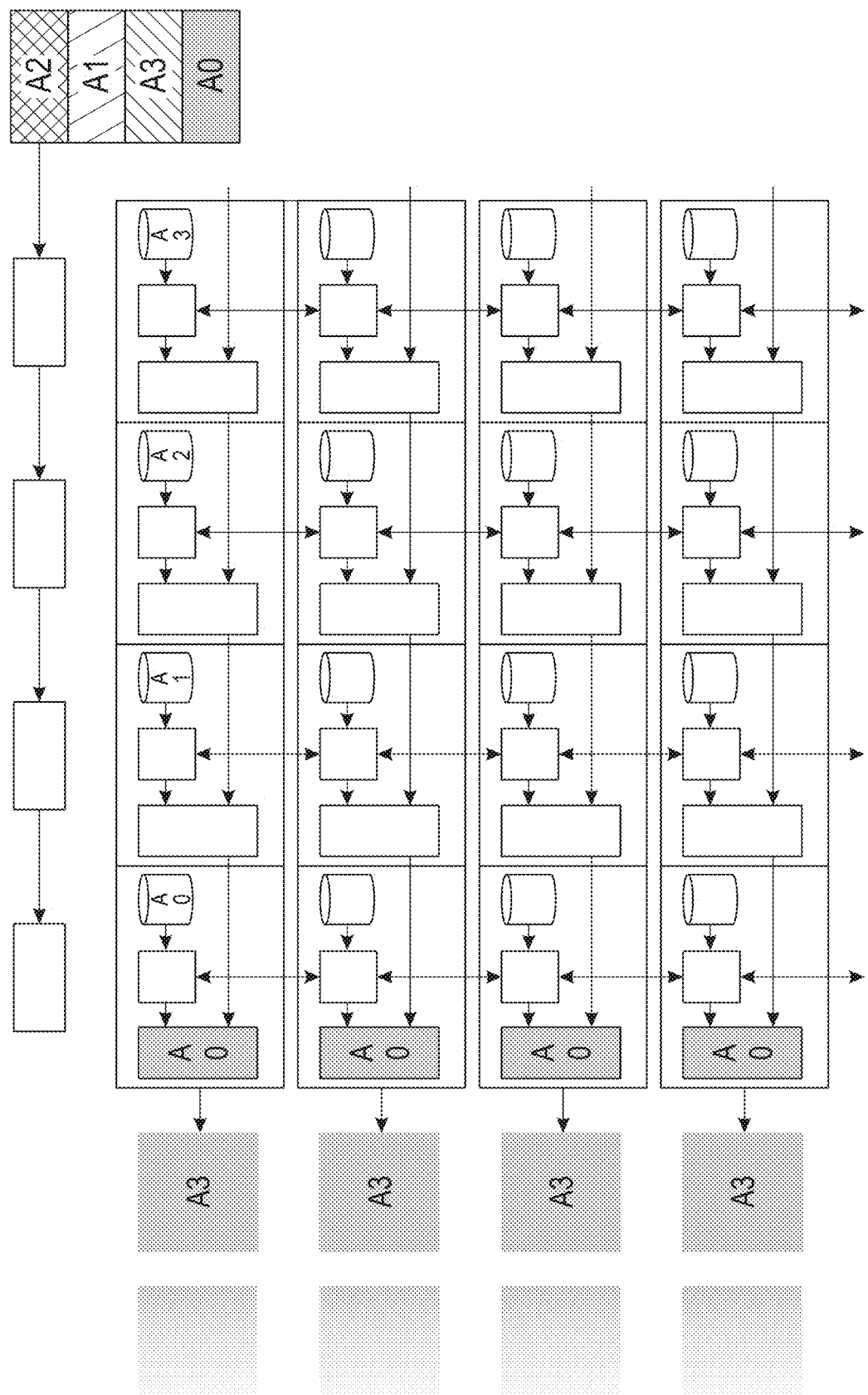
Figure 15M:
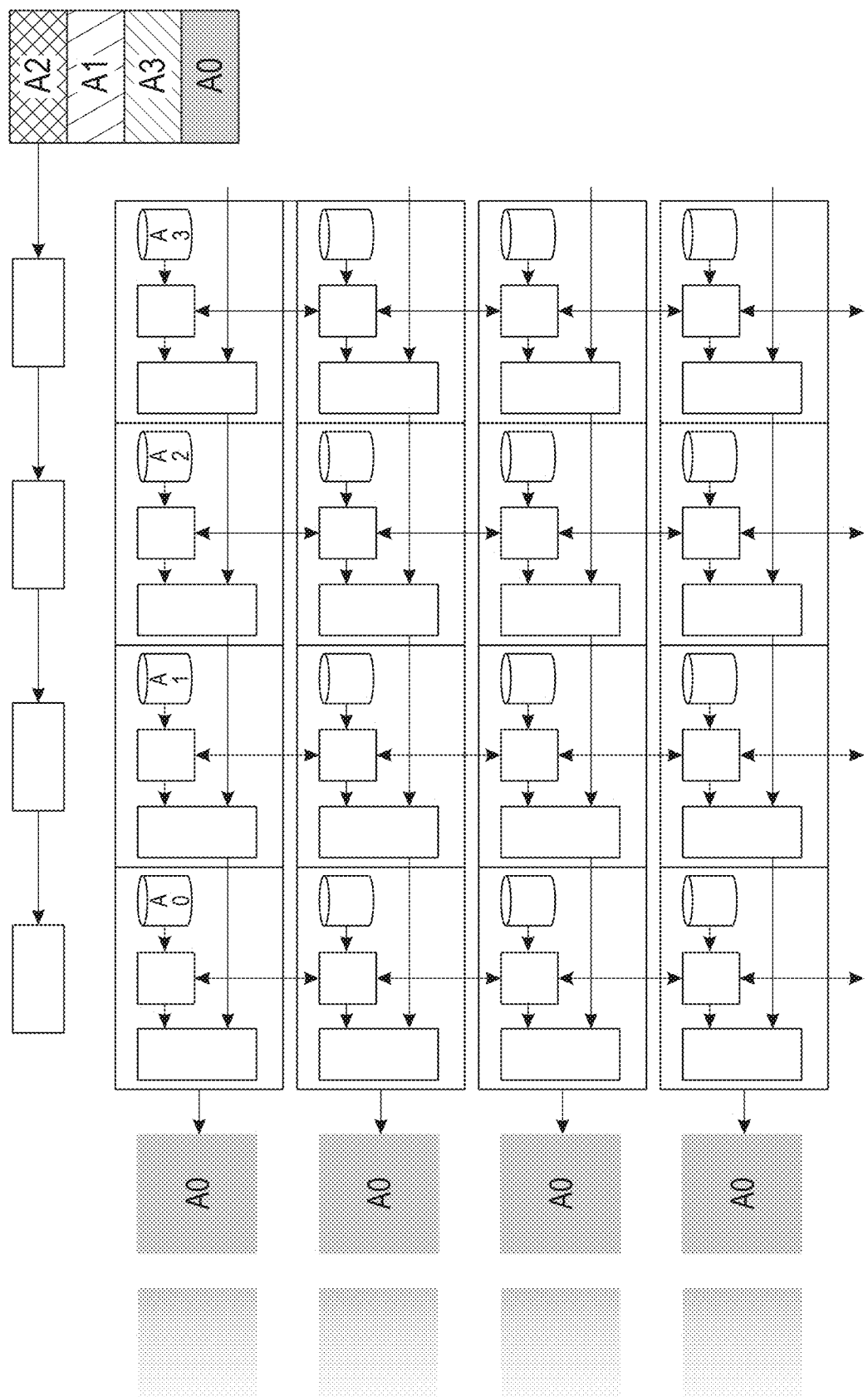

Referring to FIGS. 15A-M, the distribution of instructions and data is illustrated according to embodiments of the present disclosure. In this example, data is read in a random order from a two-dimensional weight memory array, with each image depicting a cycle. In FIG. 15A, instruction A2 is issued, arriving in the instruction buffer. In FIG. 15B, the second instruction A1 is issued, and both A2 and A1 are in instruction buffers, A2 reaching its target column. In FIG. 15C, the third instruction A3 is issued, and instruction A1 advances. A1 and A3 are in the instruction buffers, and data for A2 is read into the vertical buffer. In FIG. 14D, the fourth instruction A0 is issued and the prior instructions advance. A1 and A0 are in the instruction buffers. Data for A2 is vertically distributed. Data for A3 is read into the vertical buffer. In FIG. 15E, A0 advances. Data for A1 is read from memory. Data A2 and A3 are distributed advance along the vertical buffers. In FIG. 14F, the vertical buffers continue to propagate the data along each column. A0 advances along the instruction buffers. In FIG. 15G, vertical data propagation continues for A1 and A3. Instruction A0 reaches its target column. Its vertical distribution being complete, the data for A2 is copied to the horizontal buffers. In FIG. 15H, data A0 is read into the corresponding vertical buffer and vertical propagation continues for A1. Data A2 advances through the horizontal buffers. Data A3 is copied from the vertical buffers to corresponding horizontal buffers. In FIG. 15I, data A2 and A3 advances through the horizontal buffers. Data for A1 is copied into the horizontal buffers without conflict, between A2 and A3's data. In FIG. 15J, data for the first instruction A2 are delivered to the core grid. Data for A1 and A3 advance through the horizontal buffer, and data for A0 advance through the vertical buffer. In FIG. 15K, data for the second instruction A1 are delivered. The last instruction A0 completes vertical distribution. In FIG. 15L, data for A3 are delivered. Data for A0 is copied to the horizontal buffer. In FIG. 15M, data for A0 are delivered to the core array. Although the instructions read data from random location, the data advance without conflict and get delivered to the core grids in the instruction order. In order to avoid the network conflict in the vertical buffer, the instructions should not read from the same column of memory elements for the duration of vertical data propagation.

Referring to FIGS. 16A-K, the distribution of instructions and data is illustrated according to embodiments of the present disclosure. In this example, data is read from a two-dimensional weight memory array, with each image depicting a cycle. Pairs of instructions are issued in the same cycle. In this example, a first row memory element has Data A0, and a second row memory element has Data B0. Data A0 is distributed on all even numbered rows, and B0 on all odd numbered rows.

Figure 16A:
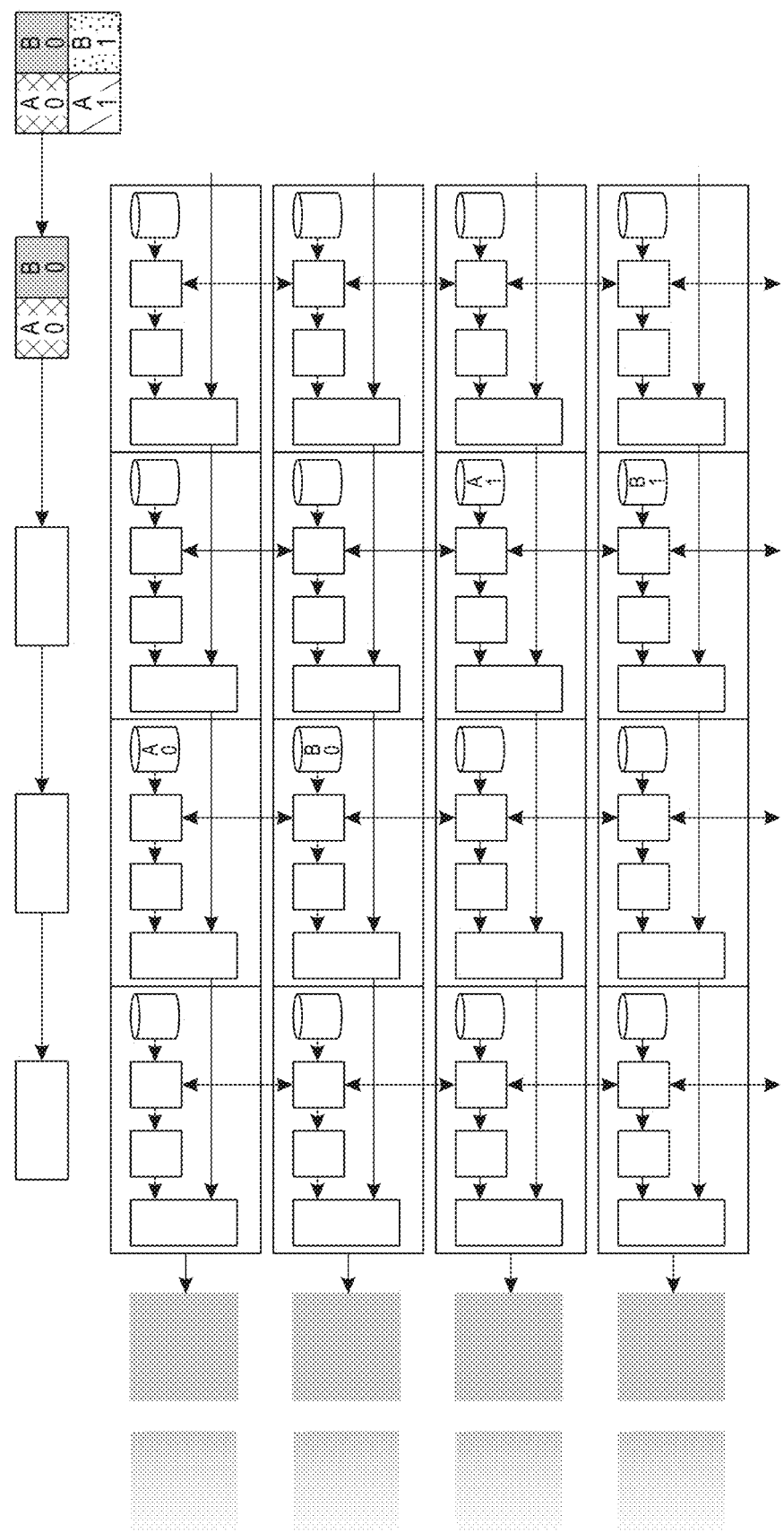
FIGS. 16A-K illustrate the distribution of instructions and data with a two dimensional memory array and a layover buffer according to embodiments of the present disclosure.
Figure 16B:
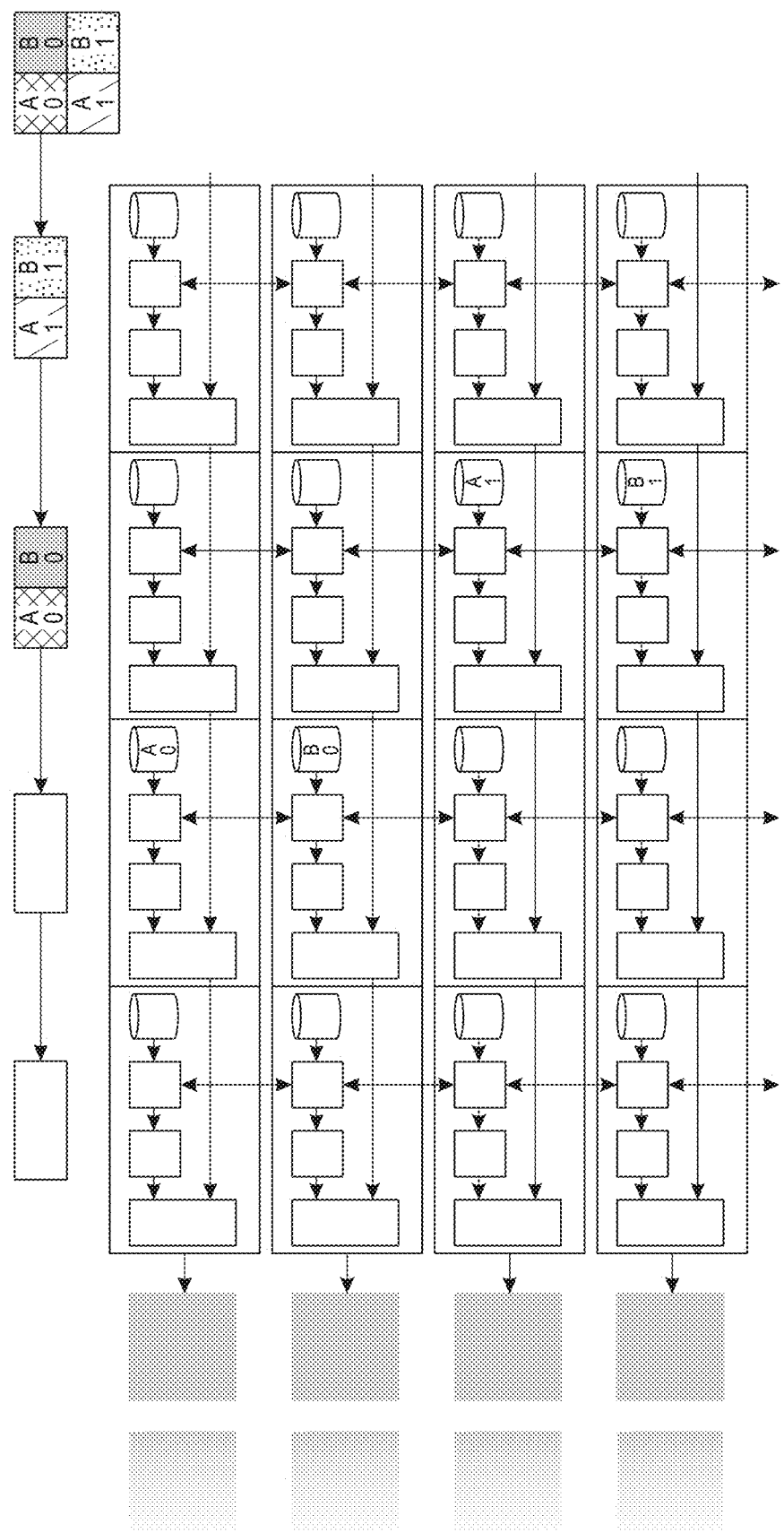
Figure 16C:
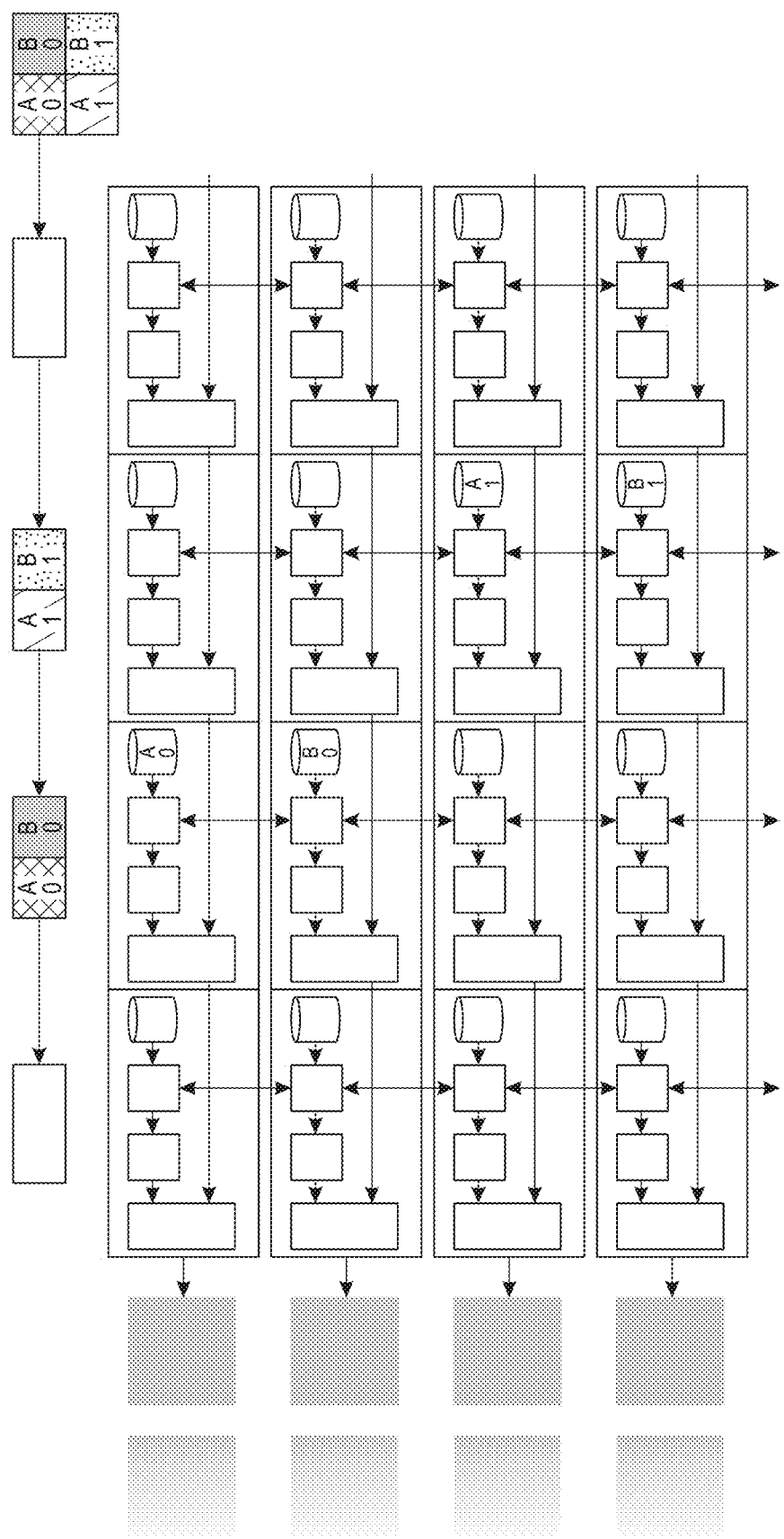
Figure 16D:
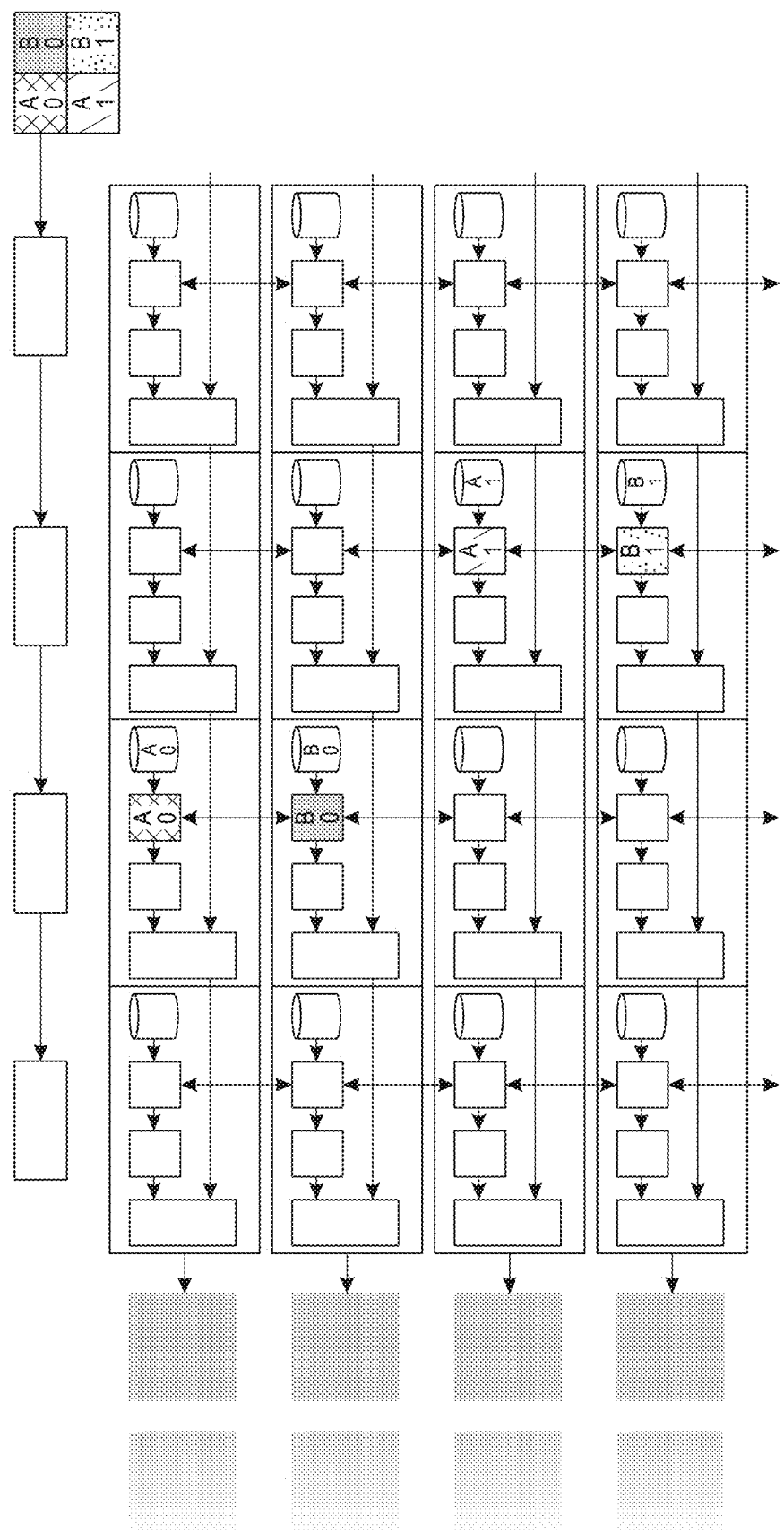
Figure 16E:
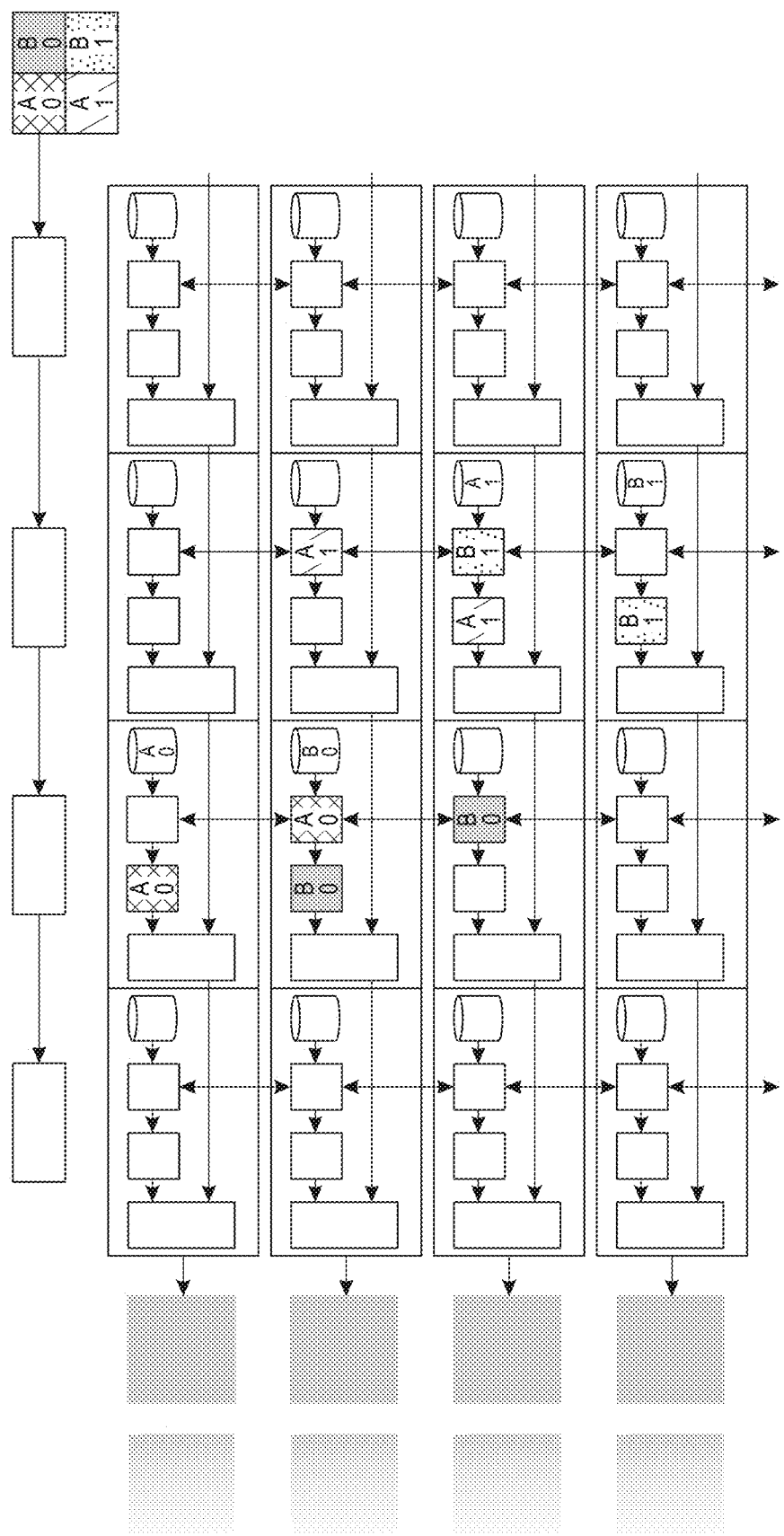
Figure 16F:
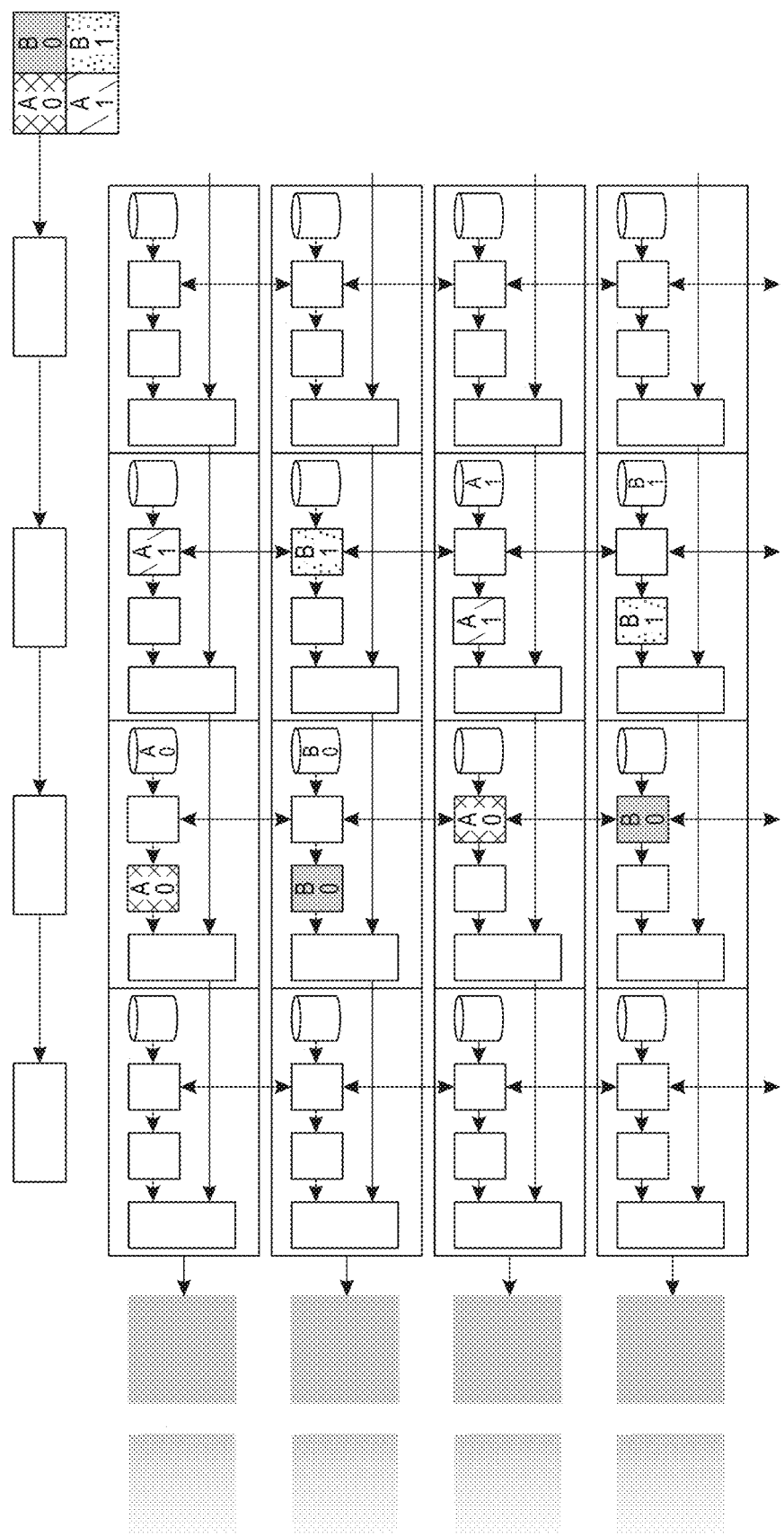
Figure 16G:
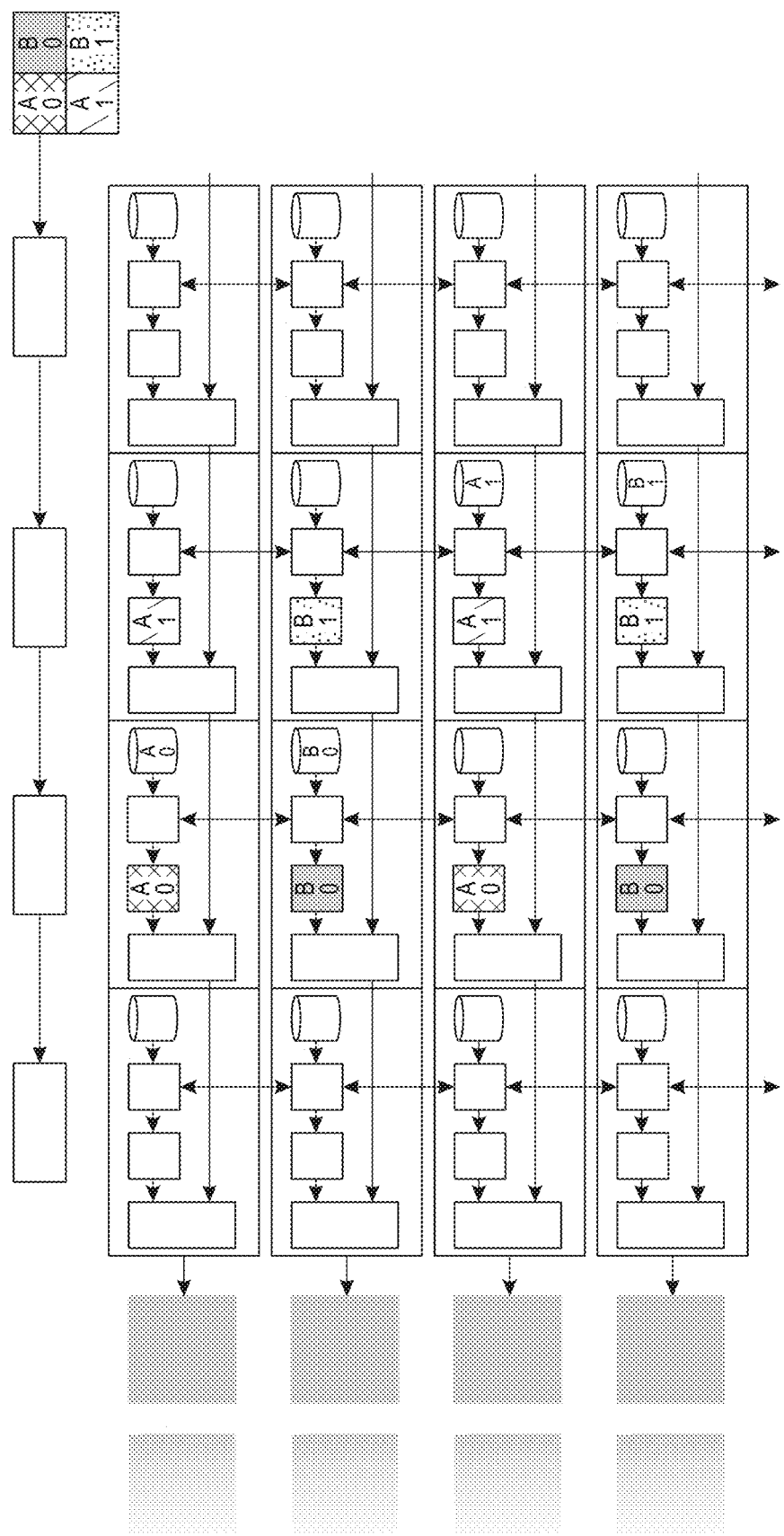
Figure 16H:
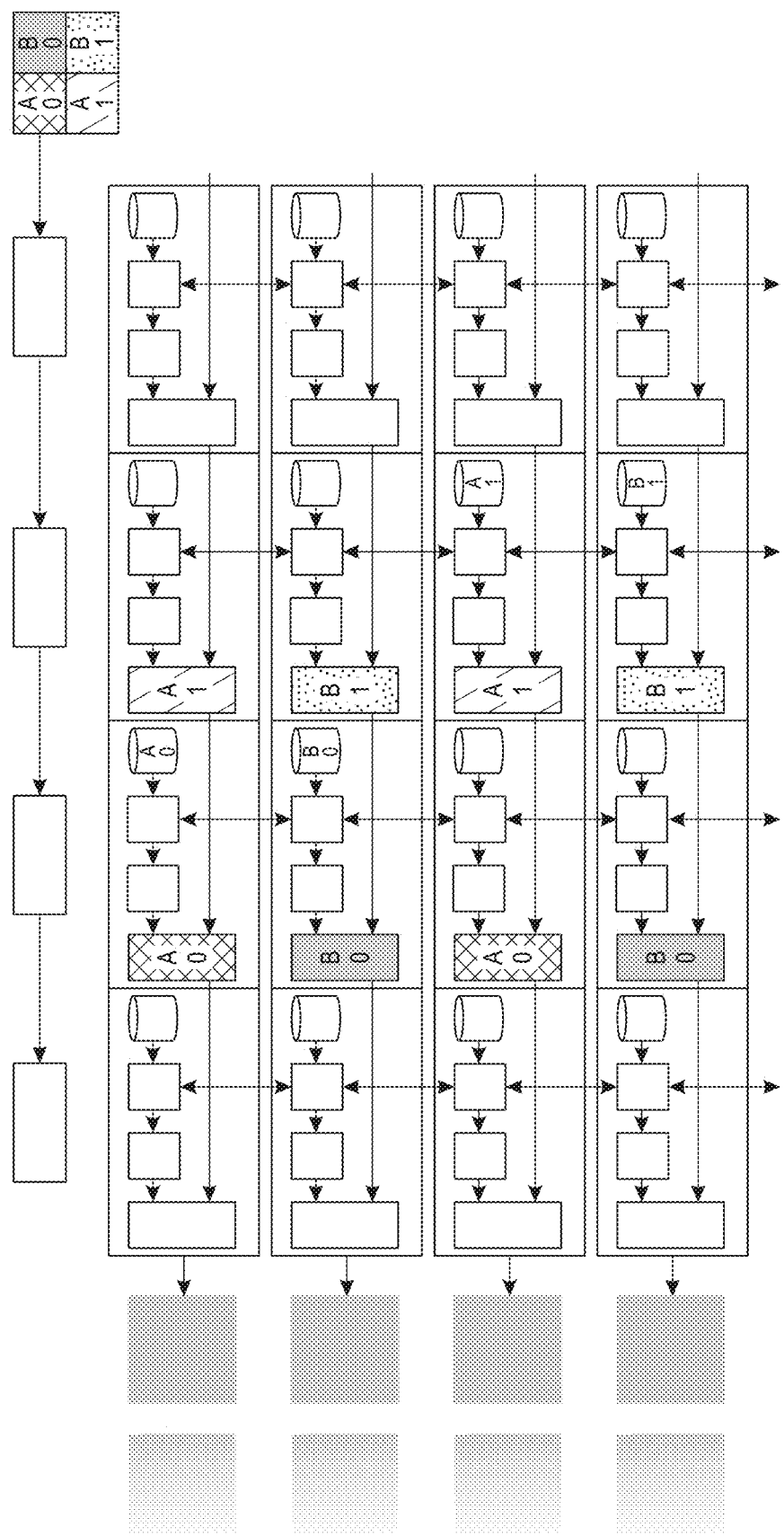
Figure 16I:
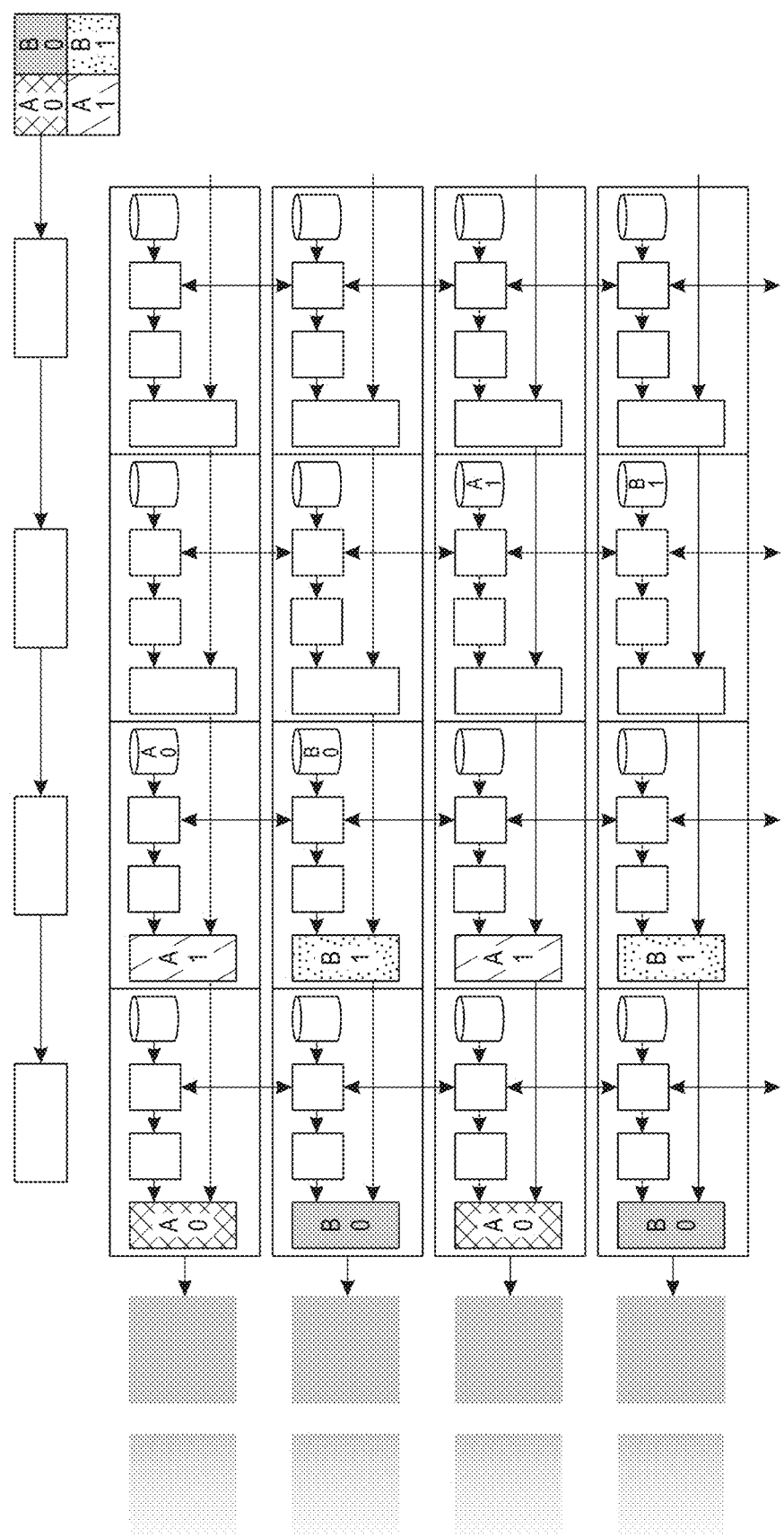
Figure 16J:
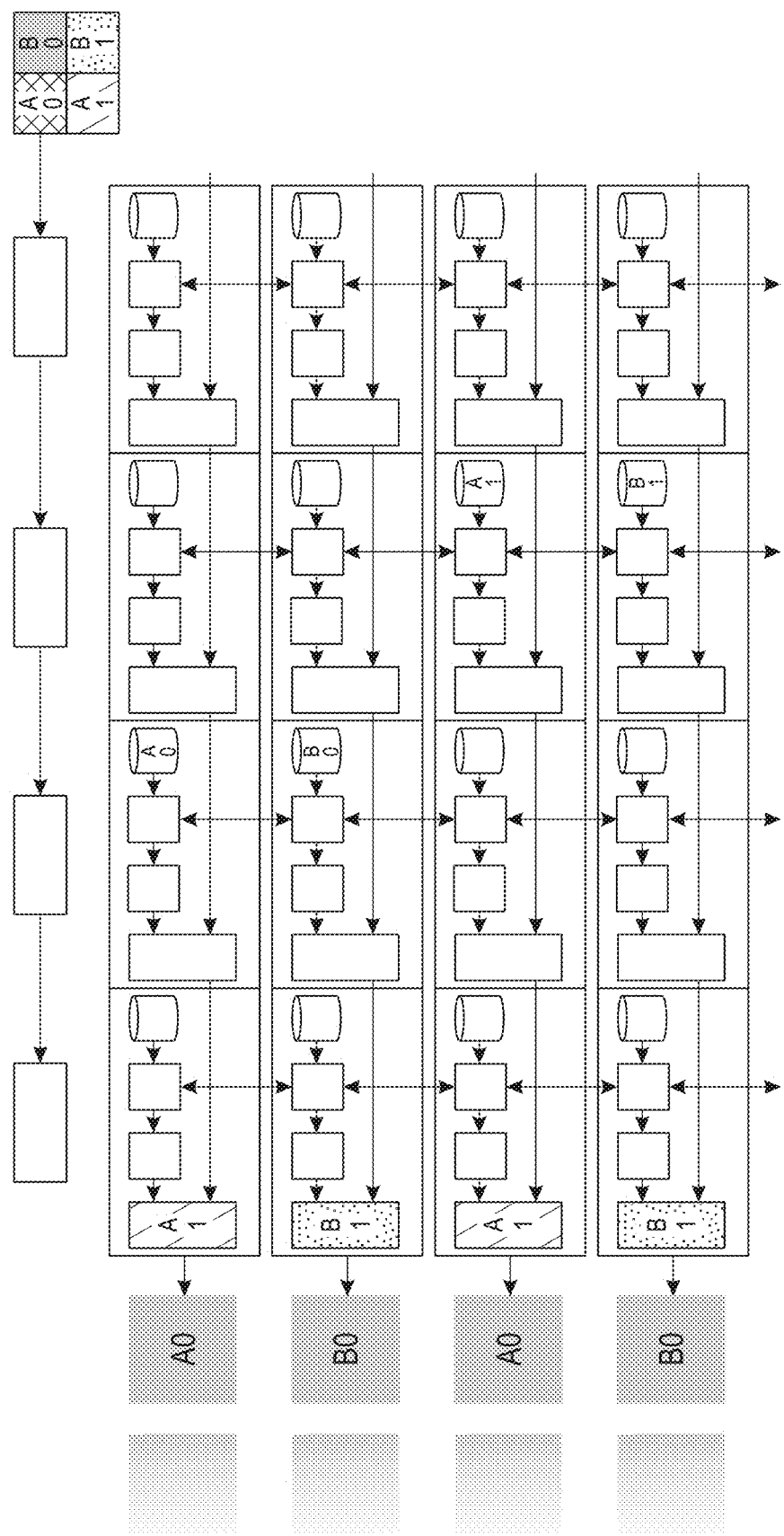
Figure 16K:
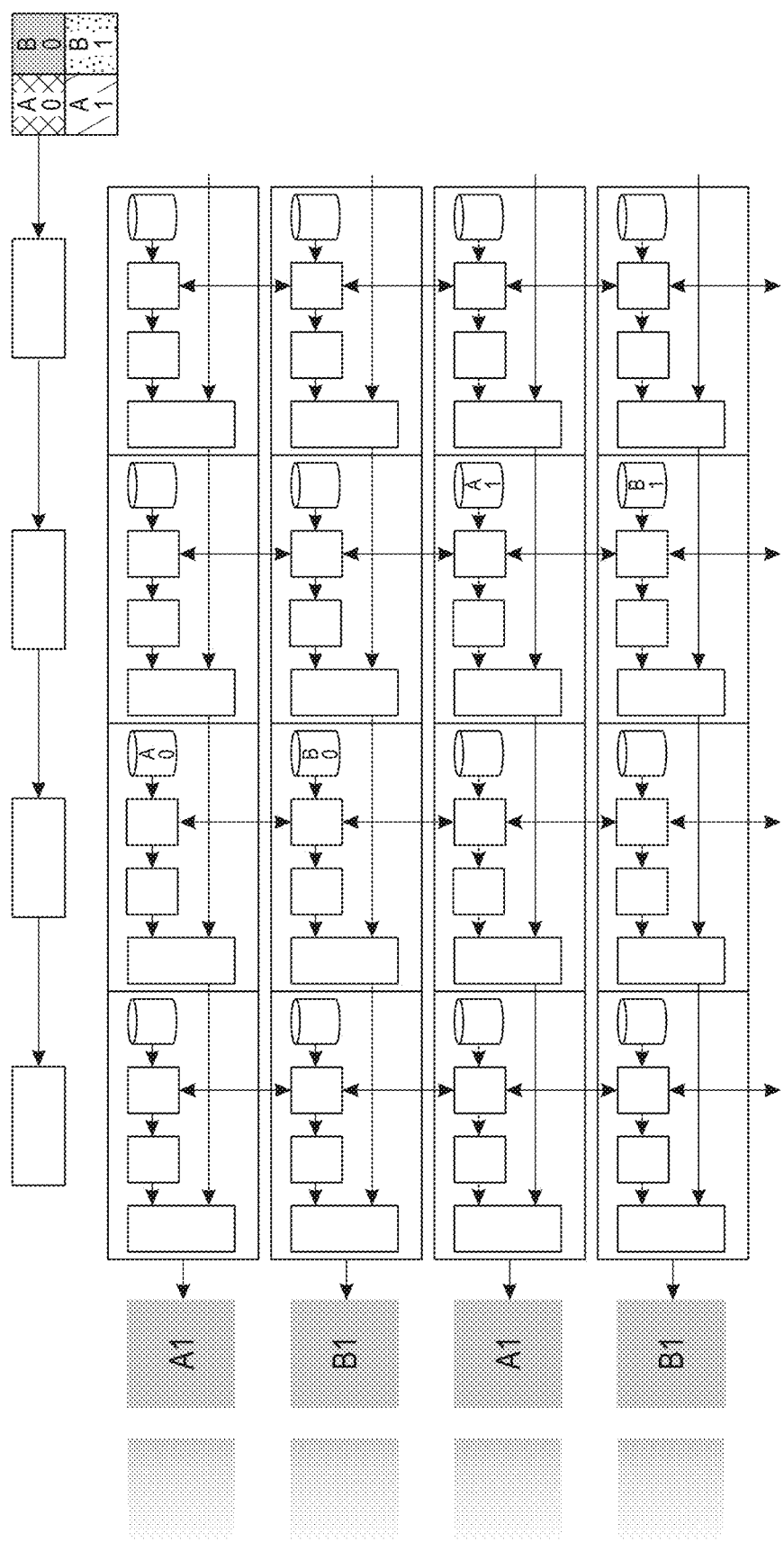

In FIG. 16A, instructions A0 and B0 are issued, arriving in the instruction buffer. In FIG. 16B, instructions A1 and B1 are issued, and A0 and B0 advance. In FIG. 14C, each pair of instructions advances to its destination column. In FIG. 16D, all instructions execute on their corresponding columns, reading data from memory into the corresponding vertical buffers. In FIG. 16E, the vertical buffers start to propagate the data along each column. The vertical buffers transfer data, while some data are stored in the layover buffers. The layover buffers are used when data has already reached its target row, and it needs to wait until the horizontal distribution starts. In FIG. 16F, vertical data propagation continues. In FIG. 16G, all data reaches its target row and is copied to the layover buffer. Stripe patterns are in the layover buffer. In FIG. 16H, the data are copied from the layover buffers to horizontal buffers. In FIG. 16I, the data advances through the data buffers. In FIG. 16J, the data advances through the data buffers, delivering a stripe of data A0 and B0 to the core grid. In FIG. 16J, the data advances through the data buffers, delivering a stripe of data A1 and B1 to the core grid.

Figure 17:
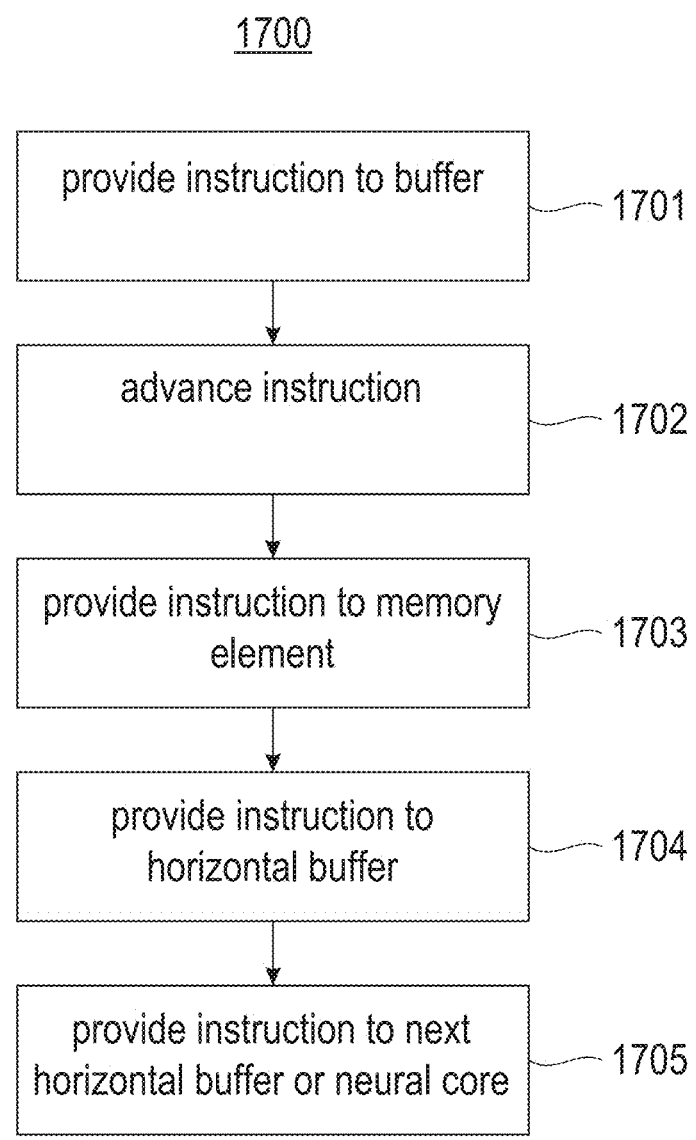
FIG. 17 illustrates a method for computing neural activations according to embodiments of the present disclosure.

Referring to FIG. 17, a method for computing neural activations is illustrated. At 1701, at least one instruction is provided to an instruction buffer from an instruction memory. At 1702, the at least one instruction is advanced between positions in the instruction buffer. At 1703, The at least one instruction is provided from the instruction buffer to at least one of a plurality of elements of a memory array when the memory of the at least one of the plurality of elements contains data associated with the at least one instruction. The memory array comprises the plurality of elements, each element comprising a memory and a horizontal buffer, the horizontal buffer of each element of the memory array being in communication with either the horizontal buffer of another of the elements of the memory array or to the at least one neural core. At 1704, a data block is provided from the memory to the horizontal buffer of the at least one of a plurality of elements in response to the arrival of the at least one instruction from the instruction buffer. At 1705, the data block is provided from the horizontal buffer of the at least one of a plurality of elements to the horizontal buffer of another of the elements of the memory array or to at least one neural core.

Various embodiments of the present disclosure use combinations of instruction buffers, horizontal buffers, vertical buffers, and layover buffers to provide instruction and data distribution in one or two dimensional memory arrays. It will be appreciated that the present disclosure is applicable to higher dimensional arrays with the addition of additional buffers. In these embodiments, the time from instruction issuance to data output from the data array is constant, even though each phase may take different amounts of time. Columns may be accessed in a random order. In cases with higher than one dimension, two instructions that access the same column should be separated by a vertical distribution time. In the one dimensional case, the vertical distribution time is zero, so there is no constraint.

In various embodiments, a system is provided that includes a memory array, instruction buffers, and horizontal data buffers. The sum of the number of cycles for instruction distribution and for memory distribution is constant for all instructions.

In various embodiments, a two-dimensional memory array is provided. Horizontal buffers are provided for each row of the memory array. Vertical buffers are provided for each column of the memory array. The sum of the number of cycles for instruction distribution, for the data distribution along the vertical buffers and for data distribution along the horizontal buffers is constant.

In various embodiments, a two-dimensional memory array is provided. Layover buffers are provided for each position in the memory array. The sum of the number of cycles for instruction distribution, for the data distribution along the vertical buffers, for data distribution along the horizontal buffers, and for data transit of the layover buffers is constant.

Figure 18:
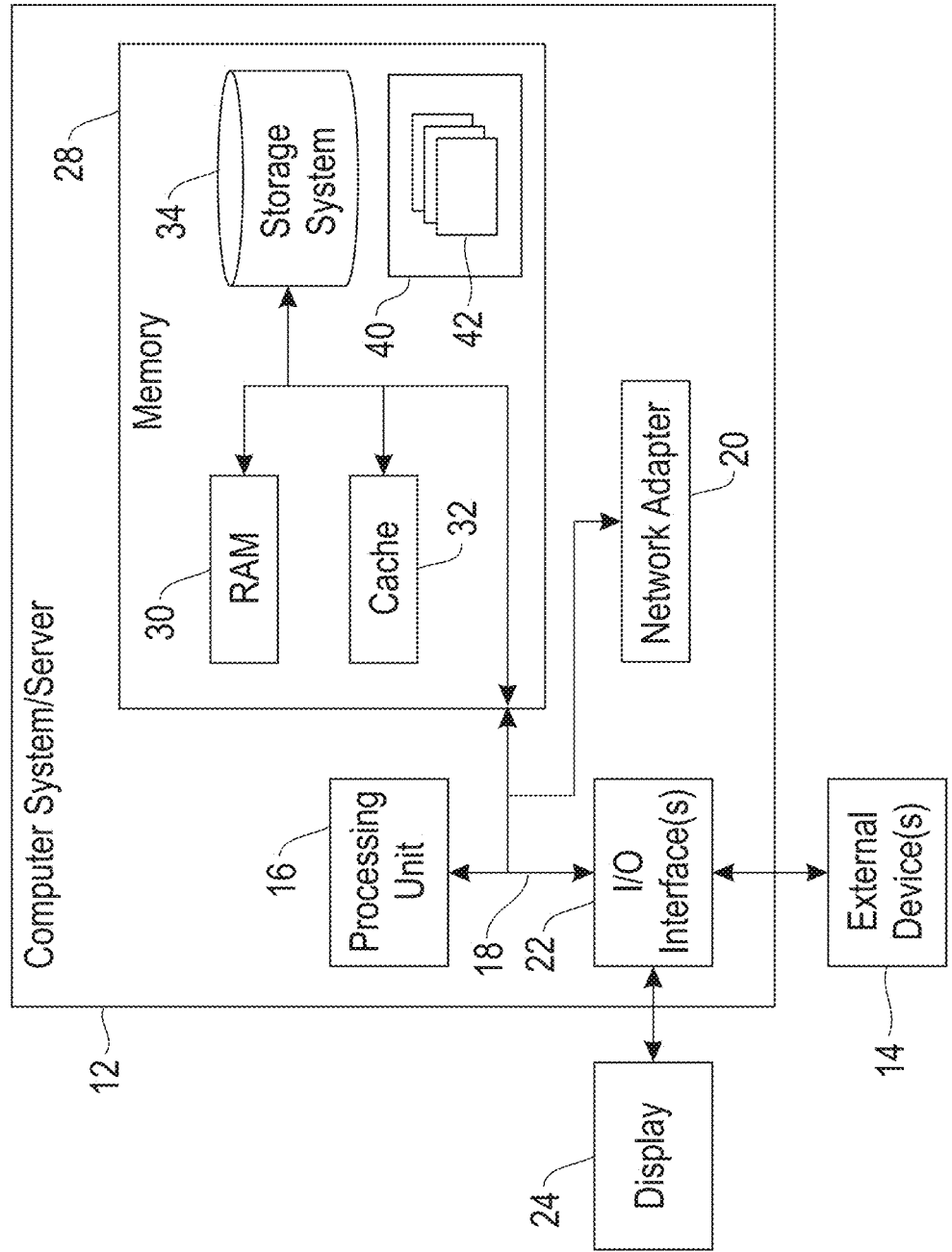
FIG. 18 depicts a computing node according to an embodiment of the present disclosure.

Referring now to FIG. 18, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip for computing neural activations, the neural inference chip comprising:
    at least one neural core;
    a memory array operatively coupled to the at least one neural core, the memory array comprising a plurality of elements, each element comprising a memory and a horizontal buffer, the horizontal buffer of each element of the memory array being in communication with either the horizontal buffer of another of the elements of the memory array or to the at least one neural core;
    an instruction buffer in communication with the memory array, the instruction buffer having a position corresponding to each of the plurality of elements of the memory array;
    an instruction memory in communication with the instruction buffer, wherein
        the instruction memory is adapted to provide at least one instruction to the instruction buffer,
        the instruction buffer is adapted to advance the at least one instruction between positions in the instruction buffer,
        the instruction buffer is adapted to provide the at least one instruction to at least one of the plurality of elements of the memory array from its associated position in the instruction buffer when the memory of the at least one of the plurality of elements contains data associated with the at least one instruction, each of the plurality of elements of the memory array is adapted to provide a data block from its memory to its horizontal buffer in response to the arrival of an associated instruction from the instruction buffer, the horizontal buffer of each element of the memory array is adapted to provide a data block to the horizontal buffer of another of the elements of the memory array or to the at least one neural core.

2. The neural inference chip of claim 1, wherein:

the instruction buffer is adapted to advance instructions between positions in the instruction buffer at a rate of one position per cycle, the horizontal buffer of each element of the memory array is adapted to provide a data block to the horizontal buffer of another of the elements of the memory array or to the at least one neural core at a rate of one data block per cycle.

3. The neural inference chip of claim 1, comprising an array of neural cores, the array of neural cores comprising the at least one neural core and having a plurality of rows.

4. The neural inference chip of claim 1, wherein the memory array is one-dimensional, the plurality of elements of the memory array being arranged in one row and a plurality of columns.

5. The neural inference chip of claim 1, wherein the memory array is two-dimensional, the plurality of elements of the memory array being arranged in a plurality of rows and a plurality of columns.

6. The neural inference chip of claim 5, wherein each element of the memory array further comprises a vertical buffer, the vertical buffer of each element of the memory array being in communication with the vertical buffer of another element of the memory array.

7. The neural inference chip of claim 6, wherein:

each of the plurality of elements of the memory array is adapted to provide a data block from its memory to its vertical buffer in response to the arrival of an associated instruction from the instruction buffer, each of the plurality of elements of the memory array is adapted to provide the data block from its vertical buffer to its horizontal buffer, the vertical buffer of each element of the memory array is adapted to provide the data block to the vertical buffer of another of the elements of the memory array.

8. The neural inference chip of claim 7, wherein:

the horizontal buffer of each element of the memory array is adapted to provide a data block to the horizontal buffer of another of the elements of the memory array or to the at least one neural core at a rate of one data block per cycle, the vertical buffer of each element of the memory array is adapted to provide a data block to the vertical buffer of another of the elements of the memory array at a rate of one data block per cycle.

9. The neural inference chip of claim 6, wherein each element of the memory array further comprises a layover buffer, the layover buffer of each element of the memory array being in communication with the horizontal buffer and the vertical buffer of that element of the memory array.

10. The neural inference chip of claim 9, wherein:

each of the plurality of elements of the memory array is adapted to provide a data block from its memory to its vertical buffer in response to the arrival of an associated instruction from the instruction buffer, each of the plurality of elements of the memory array is adapted to provide the data block from its vertical buffer to its layover buffer, each of the plurality of elements of the memory array is adapted to provide the data block from its layover buffer to its horizontal buffer, the vertical buffer of each element of the memory array is adapted to provide the data block to the vertical buffer of another of the elements of the memory array.

11. The neural inference chip of claim 10, wherein:

the horizontal buffer of each element of the memory array is adapted to provide a data block to the horizontal buffer of another of the elements of the memory array or to the at least one neural core at a rate of one data block per cycle, the vertical buffer of each element of the memory array is adapted to provide a data block to the vertical buffer of another of the elements of the memory array at a rate of one data block per cycle, the layover buffer of each element of the memory array is adapted to provide a data block to the horizontal buffer of that element of the memory array at a rate of one data block per cycle.

12. The neural inference chip of claim 10, wherein:

the instruction memory is adapted to provide a plurality of instructions to the instruction buffer per cycle, each position of the instruction buffer is adapted to store a plurality of instructions, and the instruction buffer is adapted to advance a plurality of instructions between positions in the instruction buffer per cycle.

13. A neural inference chip for computing neural activations, the neural inference chip comprising:

at least one neural core;

a memory array operatively coupled to the at least one neural core, the memory array comprising a plurality of elements, each element comprising a memory, a horizontal buffer, and a vertical buffer, the horizontal buffer of each element of the memory array being in communication with either the horizontal buffer of another of the elements of the memory array or to the at least one neural core and the vertical buffer of each element of the memory array being in communication with the vertical buffer of another element of the memory array;

a plurality of instruction buffers in communication with the memory array, each of plurality of instruction buffers having a position corresponding to one of the plurality of elements of the memory array;

a plurality of instruction memories, each in communication with one of the plurality of instruction buffers, wherein each instruction memory is adapted to provide at least one instruction to its instruction buffer, each instruction buffer is adapted to advance the at least one instruction between positions in that instruction buffer, each instruction buffer is adapted to provide the at least one instruction to at least one of the plurality of elements of the memory array from its associated position in that instruction buffer when the memory of the at least one of the plurality of elements contains data associated with the at least one instruction, each of the plurality of elements of the memory array is adapted to provide a data block from its memory to its vertical buffer in response to the arrival of an associated instruction from the instruction buffer,
each of the plurality of elements of the memory array is adapted to provide the data block from its vertical buffer to its horizontal buffer,
the vertical buffer of each element of the memory array is adapted to provide the data block to the vertical buffer of another of the elements of the memory array the horizontal buffer of each element of the memory array is adapted to provide a data block to the horizontal buffer of another of the elements of the memory array or to the at least one neural core.

14. The neural inference chip of claim 13, wherein:
each instruction buffer is adapted to advance instructions between positions therein at a rate of one position per cycle,
the horizontal buffer of each element of the memory array is adapted to provide a data block to the horizontal buffer of another of the elements of the memory array or to the at least one neural core at a rate of one data block per cycle.

15. The neural inference chip of claim 13, comprising an array of neural cores, the array of neural cores comprising the at least one neural core and having a plurality of rows.

16. The neural inference chip of claim 13, wherein the memory array is two-dimensional, the plurality of elements of the memory array being arranged in a plurality of rows and a plurality of columns.

17. The neural inference chip of claim 16, wherein each element of the memory array further comprises a vertical buffer, the vertical buffer of each element of the memory array being in communication with the vertical buffer of another element of the memory array.

18. The neural inference chip of claim 17, wherein:
each of the plurality of elements of the memory array is adapted to provide a data block from its memory to its vertical buffer in response to the arrival of an associated instruction from the instruction buffer,
each of the plurality of elements of the memory array is adapted to provide the data block from its vertical buffer to its horizontal buffer,
the vertical buffer of each element of the memory array is adapted to provide the data block to the vertical buffer of another of the elements of the memory array.

19. The neural inference chip of claim 18, wherein:
the horizontal buffer of each element of the memory array is adapted to provide a data block to the horizontal buffer of another of the elements of the memory array or to the at least one neural core at a rate of one data block per cycle,
the vertical buffer of each element of the memory array is adapted to provide a data block to the vertical buffer of another of the elements of the memory array at a rate of one data block per cycle.

20. The neural inference chip of claim 17, wherein each element of the memory array further comprises a layover buffer, the layover buffer of each element of the memory array being in communication with the horizontal buffer and the vertical buffer of that element of the memory array.

21. The neural inference chip of claim 20, wherein:
each of the plurality of elements of the memory array is adapted to provide a data block from its memory to its vertical buffer in response to the arrival of an associated instruction from the instruction buffer,
each of the plurality of elements of the memory array is adapted to provide the data block from its vertical buffer to its layover buffer,
each of the plurality of elements of the memory array is adapted to provide the data block from its layover buffer to its horizontal buffer,
the vertical buffer of each element of the memory array is adapted to provide the data block to the vertical buffer of another of the elements of the memory array.

22. The neural inference chip of claim 21, wherein:
the horizontal buffer of each element of the memory array is adapted to provide a data block to the horizontal buffer of another of the elements of the memory array or to the at least one neural core at a rate of one data block per cycle,
the vertical buffer of each element of the memory array is adapted to provide a data block to the vertical buffer of another of the elements of the memory array at a rate of one data block per cycle,
the layover buffer of each element of the memory array is adapted to provide a data block to the horizontal buffer of that element of the memory array at a rate of one data block per cycle.

23. The neural inference chip of claim 21, wherein:
the instruction memory is adapted to provide a plurality of instructions to the instruction buffer per cycle,
each position of the instruction buffer is adapted to store a plurality of instructions, and
the instruction buffer is adapted to advance a plurality of instructions between positions in the instruction buffer per cycle.

24. A method comprising:
providing at least one instruction to an instruction buffer from an instruction memory;
advancing the at least one instruction between positions in the instruction buffer;
providing the at least one instruction from the instruction buffer to at least one of a plurality of elements of a memory array when the memory of the at least one of the plurality of elements contains data associated with the at least one instruction,
the memory array comprising the plurality of elements, each element comprising a memory and a horizontal buffer, the horizontal buffer of each element of the memory array being in communication with either the horizontal buffer of another of the elements of the memory array or to the at least one neural core
providing a data block from the memory to the horizontal buffer of the at least one of a plurality of elements in response to the arrival of the at least one instruction from the instruction buffer;
providing the data block from the horizontal buffer of the at least one of a plurality of elements to the horizontal buffer of another of the elements of the memory array or to at least one neural core.

* * * * *